United States Patent
Audet et al.

(10) Patent No.: US 11,080,465 B2
(45) Date of Patent: Aug. 3, 2021

(54) METHOD OF EXPANDING STACKED ELEMENTS

(71) Applicant: 9224-5489 QUEBEC INC., Sherbrooke (CA)

(72) Inventors: Mathieu Audet, Orford (CA); Francois Cassistat, Montreal (CA)

(73) Assignee: 9224-5489 QUEBEC INC.

( * ) Notice: Subject to any disclaimer, the term of this patent is extended or adjusted under 35 U.S.C. 154(b) by 0 days.

(21) Appl. No.: 16/724,337

(22) Filed: Dec. 22, 2019

(65) Prior Publication Data
US 2020/0134253 A1    Apr. 30, 2020

Related U.S. Application Data

(63) Continuation of application No. 15/434,184, filed on Feb. 16, 2017, now Pat. No. 10,558,733, which is a (Continued)

(51) Int. Cl.
*G06F 40/106* (2020.01)
*G06F 3/0481* (2013.01)
(Continued)

(52) U.S. Cl.
CPC .......... *G06F 40/106* (2020.01); *G06F 3/0481* (2013.01); *G06F 3/0482* (2013.01);
(Continued)

(58) Field of Classification Search
CPC .... G06F 40/106; G06F 16/904; G06F 40/103; G06F 3/0481; G06F 3/04817;
(Continued)

(56) References Cited

U.S. PATENT DOCUMENTS 4,616,336 A    10/1986  Robertson
4,653,021 A     3/1987  Takagi
(Continued)

FOREIGN PATENT DOCUMENTS

CA    2323268    4/2002
CA    2666016    7/2014
(Continued)

OTHER PUBLICATIONS

The lifestream approach to reorganizing the information world; Nicolas Carriero; Scott Fertig; Eric Freeman and David Gelernter; Apr. 1995; Yale University; United States.
(Continued)

*Primary Examiner* — Wilson W Tsui
(74) *Attorney, Agent, or Firm* — Mathieu Audet

(57) ABSTRACT

The present invention provides a method of displaying a plurality of elements on an axis of elements on a display area of a user's device, the method comprising assigning a collation function to the axis of elements, the collation function including a time-based order, receiving a plurality of elements from another user, the plurality of elements being transmitted through a network, the elements including a timestamp respectively associated thereto, associating the plurality of elements with respective collation positions on the axis of elements, displaying the plurality of elements in a substantially rectilinear and vertical orientation on the display in an overlapping stacked configuration of elements on the axis of elements and displaying a notification indicating an identity of the another user adding the plurality of elements, wherein the plurality of stacked elements is unstacked and elements are individually displayed on the axis on a basis of an action performed by the user.

20 Claims, 31 Drawing Sheets

Related U.S. Application Data continuation of application No. 13/626,692, filed on Sep. 25, 2012, now Pat. No. 9,613,167.

(60) Provisional application No. 61/538,879, filed on Sep. 25, 2011.

(51) Int. Cl.

| | | |
|---|---|---|
| *G06F 3/0482* | (2013.01) | |
| *G06F 16/904* | (2019.01) | |
| *G06F 40/103* | (2020.01) | |
| *G06F 3/0485* | (2013.01) | |

(52) U.S. Cl.
CPC ........ *G06F 3/04817* (2013.01); *G06F 16/904* (2019.01); *G06F 40/103* (2020.01); *G06F 3/0485* (2013.01)

(58) Field of Classification Search
CPC .... G06F 3/0482; G06F 3/0485; G06F 16/168; G06F 16/447; G06F 16/58; G06F 16/93; G06F 16/16; G06F 16/54; G06F 16/954; G06F 16/489

See application file for complete search history.

(56) References Cited

U.S. PATENT DOCUMENTS

| | | | |
|---|---|---|---|
| 4,817,036 A | 3/1989 | Millett |
| 5,101,500 A | 3/1992 | Marui |
| 5,115,504 A | 5/1992 | Belove |
| 5,148,154 A | 9/1992 | MacKay |
| 5,241,624 A | 8/1993 | Torres |
| 5,261,087 A | 11/1993 | Mukaino |
| 5,312,478 A | 5/1994 | Reed |
| 5,337,405 A | 8/1994 | Lindauer |
| 5,353,391 A | 10/1994 | Cohen |
| 5,388,197 A | 2/1995 | Rayner |
| 5,398,074 A | 3/1995 | Duffield |
| 5,414,811 A | 5/1995 | Parulski |
| 5,499,330 A | 3/1996 | Lucas |
| 5,519,828 A | 5/1996 | Rayner |
| 5,524,195 A | 6/1996 | Clanton, III |
| 5,535,063 A | 7/1996 | Lamming |
| 5,537,524 A | 7/1996 | Aprile |
| 5,546,528 A | 8/1996 | Johnston |
| 5,581,752 A | 12/1996 | Inoue |
| 5,598,519 A | 1/1997 | Narayanan |
| 5,602,596 A | 2/1997 | Claussen |
| 5,606,374 A | 2/1997 | Bertram |
| 5,621,456 A | 4/1997 | Florin |
| 5,621,874 A | 4/1997 | Lucas |
| 5,623,613 A | 4/1997 | Rowe |
| 5,634,064 A | 5/1997 | Warnock |
| 5,649,182 A | 7/1997 | Reitz |
| 5,659,742 A | 8/1997 | Beattie |
| 5,663,757 A | 9/1997 | Morales |
| 5,671,381 A | 9/1997 | Strasnick |
| 5,673,401 A | 9/1997 | Volk |
| 5,677,708 A | 10/1997 | Matthews, III |
| 5,680,605 A | 10/1997 | Torres |
| 5,682,511 A | 10/1997 | Sposato |
| 5,689,287 A | 11/1997 | Mackinlay |
| 5,701,500 A | 12/1997 | Ikeo |
| 5,713,031 A | 1/1998 | Saito |
| 5,740,815 A | 4/1998 | Alpins |
| 5,751,280 A | 5/1998 | Abbott |
| 5,754,183 A | 5/1998 | Berend |
| 5,760,772 A | 6/1998 | Austin |
| 5,781,188 A | 7/1998 | Amiot |
| 5,781,785 A | 7/1998 | Rowe |
| 5,786,816 A | 7/1998 | Macrae |
| 5,794,178 A | 8/1998 | Caid |
| 5,798,766 A | 8/1998 | Hayashi |
| 5,812,124 A | 9/1998 | Eick |
| 5,822,751 A | 10/1998 | Gray |
| 5,832,504 A | 11/1998 | Tripathi |
| 5,838,317 A | 11/1998 | Bolnick |
| 5,838,320 A | 11/1998 | Matthews, III |
| 5,838,326 A | 11/1998 | Card |
| 5,838,966 A | 11/1998 | Harlan |
| 5,847,707 A | 12/1998 | Hayashida |
| 5,850,218 A | 12/1998 | LaJoie |
| 5,878,410 A | 3/1999 | Zbikowski |
| 5,880,729 A | 3/1999 | Johnston, Jr. |
| 5,900,879 A | 5/1999 | Berry |
| 5,903,271 A | 5/1999 | Bardon |
| 5,905,992 A | 5/1999 | Lucas |
| 5,920,859 A | 7/1999 | Li |
| 5,926,824 A | 7/1999 | Hashimoto |
| 5,933,843 A | 8/1999 | Takai |
| 5,956,708 A | 9/1999 | Dyko |
| 5,966,127 A | 10/1999 | Yajima |
| 5,974,391 A | 10/1999 | Hongawa |
| 5,977,974 A | 11/1999 | Hatori |
| 5,980,096 A | 11/1999 | Thalhammer-Reyero |
| 5,982,369 A | 11/1999 | Sciammarella |
| 5,999,173 A | 12/1999 | Ubillos |
| 6,003,034 A | 12/1999 | Tuli |
| 6,005,601 A | 12/1999 | Ohkura |
| 6,006,227 A | 12/1999 | Freeman |
| 6,009,442 A | 12/1999 | Chen |
| 6,012,072 A | 1/2000 | Lucas |
| 6,020,930 A | 2/2000 | Legrand |
| 6,023,703 A | 2/2000 | Hill |
| 6,028,600 A | 2/2000 | Rosin |
| 6,029,164 A | 2/2000 | Birrell |
| 6,037,933 A | 3/2000 | Blonstein |
| 6,038,522 A | 3/2000 | Manson |
| 6,061,062 A | 5/2000 | Venolia |
| 6,064,384 A | 5/2000 | Ho |
| 6,067,554 A | 5/2000 | Hohensee |
| 6,078,924 A | 6/2000 | Ainsbury |
| 6,081,817 A | 6/2000 | Taguchi |
| 6,088,032 A | 7/2000 | Mackinlay |
| 6,100,887 A | 8/2000 | Bormann |
| 6,108,657 A | 8/2000 | Shoup |
| 6,111,578 A | 8/2000 | Tesler |
| 6,119,120 A | 9/2000 | Miller |
| 6,149,519 A | 11/2000 | Osaki |
| 6,151,059 A | 11/2000 | Schein |
| 6,151,604 A | 11/2000 | Wlaschin |
| 6,151,702 A | 11/2000 | Overturf |
| 6,163,345 A | 12/2000 | Noguchi |
| 6,174,845 B1 | 1/2001 | Rattinger |
| 6,175,362 B1 | 1/2001 | Harms |
| 6,175,845 B1 | 1/2001 | Smith |
| 6,185,551 B1 | 2/2001 | Birrell |
| 6,188,406 B1 | 2/2001 | Fong |
| 6,189,012 B1 | 2/2001 | Mital |
| 6,202,068 B1 | 3/2001 | Kraay |
| 6,211,873 B1 | 4/2001 | Moyer |
| 6,236,994 B1 | 5/2001 | Swartz |
| 6,237,004 B1 | 5/2001 | Dodson |
| 6,240,421 B1 | 5/2001 | Stolarz |
| 6,243,093 B1 | 6/2001 | Czerwinski |
| 6,243,724 B1 | 6/2001 | Mander |
| 6,253,218 B1 | 6/2001 | Aoki |
| 6,253,518 B1 | 7/2001 | Azar |
| 6,262,722 B1 | 7/2001 | Allison |
| 6,266,059 B1 | 7/2001 | Matthews, III |
| 6,266,098 B1 | 7/2001 | Cove |
| 6,275,229 B1 | 8/2001 | Weiner |
| 6,281,898 B1 | 8/2001 | Nikolovska |
| 6,281,940 B1 | 8/2001 | Sciammarella |
| 6,289,362 B1 | 9/2001 | Van Der Meer |
| 6,295,639 B1 | 9/2001 | Van Der Meer |
| 6,308,187 B1 | 10/2001 | DeStefano |
| 6,310,622 B1 | 10/2001 | Asente |
| 6,313,851 B1 | 11/2001 | Matthews, III |
| 6,317,761 B1 | 11/2001 | Landsman |
| 6,335,742 B1 | 1/2002 | Takemoto |
| 6,337,698 B1 | 1/2002 | Keely, Jr. |
| 6,338,044 B1 | 1/2002 | Cook |

(56) References Cited

U.S. PATENT DOCUMENTS

| | | |
|---|---|---|
| 6,344,880 B1 | 2/2002 | Takahashi |
| 6,351,765 B1 | 2/2002 | Pietropaolo |
| 6,353,436 B1 | 3/2002 | Reichlen |
| 6,353,831 B1 | 3/2002 | Gustman |
| 6,366,299 B1 | 4/2002 | Lanning |
| 6,380,953 B1 | 4/2002 | Mizuno |
| 6,381,362 B1 | 4/2002 | Deshpande |
| 6,388,665 B1 | 5/2002 | Linnett |
| 6,392,651 B1 | 5/2002 | Stradley |
| 6,418,556 B1 | 7/2002 | Bennington |
| 6,421,828 B1 | 7/2002 | Wakisaka |
| 6,425,129 B1 | 7/2002 | Sciammarella |
| 6,434,545 B1 | 8/2002 | MacLeod |
| 6,434,598 B1 | 8/2002 | Gish |
| 6,456,938 B1 | 9/2002 | Barnard |
| 6,457,006 B1 | 9/2002 | Gruenwald |
| 6,457,017 B2 | 9/2002 | Watkins |
| 6,463,431 B1 | 10/2002 | Schmitt |
| 6,466,237 B1 | 10/2002 | Miyao |
| 6,487,557 B1 | 11/2002 | Nagatomo |
| 6,491,585 B1 | 12/2002 | Miyamoto |
| 6,501,469 B1 | 12/2002 | MacPhail |
| 6,507,858 B1 | 1/2003 | Kanerva |
| 6,538,672 B1 | 3/2003 | Dobbelaar |
| 6,542,896 B1 | 4/2003 | Gruenwald |
| 6,553,310 B1 | 4/2003 | Lopke |
| 6,556,225 B1 | 4/2003 | MacPhail |
| 6,577,350 B1 | 6/2003 | Proehl |
| 6,581,068 B1 | 6/2003 | Bensoussan |
| 6,587,106 B1 | 7/2003 | Suzuki |
| 6,594,673 B1 | 7/2003 | Smith |
| 6,598,043 B1 | 7/2003 | Baclawski |
| 6,600,501 B1 | 7/2003 | Israel |
| D478,090 S | 8/2003 | Nguyen |
| 6,604,144 B1 | 8/2003 | Anders |
| 6,606,411 B1 | 8/2003 | Loui |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,661,438 B1 * | 12/2003 | Shiraishi ............ G06F 1/1626 715/781 |
| 6,662,357 B1 | 12/2003 | Bowman-Amuah |
| 6,668,102 B2 | 12/2003 | Chiba |
| 6,671,692 B1 | 12/2003 | Marpe |
| 6,671,693 B1 | 12/2003 | Marpe |
| 6,671,694 B2 | 12/2003 | Baskins |
| 6,675,158 B1 | 1/2004 | Rising, III |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs |
| 6,690,391 B1 | 2/2004 | Proehl |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,721,760 B1 | 4/2004 | Ono |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,744,447 B2 | 6/2004 | Estrada |
| 6,744,967 B2 | 6/2004 | Kaminski |
| 6,754,660 B1 | 6/2004 | MacPhail |
| 6,760,721 B1 | 7/2004 | Chasen |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright |
| 6,879,946 B2 | 4/2005 | Rong |
| 6,889,220 B2 | 5/2005 | Wolff |
| 6,895,552 B1 * | 5/2005 | Balabanovic ......... G06F 16/583 715/209 |
| 6,900,807 B1 | 5/2005 | Liongosari |
| 6,901,558 B1 | 5/2005 | Andreas |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording |
| 6,934,916 B1 | 8/2005 | Webb |
| 6,948,124 B2 | 9/2005 | Combs |
| 6,950,989 B2 | 9/2005 | Athsani |
| 6,961,900 B1 | 11/2005 | Sprague |
| 6,965,380 B1 | 11/2005 | Kumata |
| 6,973,628 B2 | 12/2005 | Asami |
| 6,983,227 B1 | 1/2006 | Thalhammer-Reyero |
| 6,985,948 B2 | 1/2006 | Taguchi |
| 6,987,220 B2 | 1/2006 | Holcombe |
| 6,990,637 B2 | 1/2006 | Anthony |
| 7,003,737 B2 | 2/2006 | Chiu |
| 7,007,034 B1 | 2/2006 | Hartman, Jr. |
| 7,010,744 B1 | 3/2006 | Torgerson |
| 7,013,258 B1 | 3/2006 | Su |
| 7,019,741 B2 | 3/2006 | Kelly |
| 7,020,848 B2 | 3/2006 | Rosenzweig |
| 7,054,878 B2 | 5/2006 | Gottsman |
| 7,055,104 B1 | 5/2006 | Billmaier |
| 7,075,550 B2 | 7/2006 | Bonadio |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,218,325 B1 | 5/2007 | Buck |
| 7,220,910 B2 | 5/2007 | Plastina |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski |
| 7,293,228 B1 | 11/2007 | Lessing |
| 7,302,649 B2 | 11/2007 | Ohnishi |
| 7,318,196 B2 | 1/2008 | Crow |
| 7,334,191 B1 | 2/2008 | Sivan |
| 7,336,279 B1 | 2/2008 | Takiguchi |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,363,591 B2 | 4/2008 | Goldthwaite |
| 7,366,994 B2 | 4/2008 | Loui |
| 7,372,473 B2 | 5/2008 | Venolia |
| 7,380,260 B1 | 5/2008 | Billmaier |
| 7,418,671 B2 | 8/2008 | Hama |
| 7,418,674 B2 | 8/2008 | Robbins |
| 7,426,057 B2 | 9/2008 | Mori |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi |
| 7,461,088 B2 | 12/2008 | Thorman |
| 7,502,819 B2 | 3/2009 | Alonso |
| 7,594,246 B1 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,639,943 B1 * | 12/2009 | Kalajan ............... G03B 29/00 396/429 |
| 7,650,569 B1 | 1/2010 | Allen |
| 7,661,075 B2 | 2/2010 | Lahdesmaki |
| 7,680,817 B2 | 3/2010 | Audet |

(56) References Cited

U.S. PATENT DOCUMENTS

| | | |
|---|---|---|
| 7,681,128 B2 | 3/2010 | Yamamoto |
| 7,681,149 B2 | 3/2010 | Lahdesmaki |
| D614,197 S | 4/2010 | Casagrande |
| 7,703,040 B2 | 4/2010 | Cutrell |
| 7,710,423 B2 | 5/2010 | Drucker |
| 7,714,859 B2 | 5/2010 | Shoemaker |
| 7,716,194 B2 | 5/2010 | Williams |
| 7,716,604 B2 | 5/2010 | Kataoka |
| 7,735,102 B1 | 6/2010 | Billmaier |
| 7,739,598 B2 | 6/2010 | Porter |
| 7,739,622 B2 | 6/2010 | DeLine |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,770,217 B2 | 8/2010 | Pueblas |
| 7,788,247 B2 | 8/2010 | Wang |
| 7,788,592 B2 | 8/2010 | Williams |
| 7,792,328 B2 | 9/2010 | Albertson |
| 7,818,378 B2 | 10/2010 | Buchheit |
| 7,822,735 B2 | 10/2010 | Suda |
| 7,831,599 B2 | 11/2010 | Das |
| 7,844,074 B2 | 11/2010 | Moskowitz |
| 7,856,424 B2 | 12/2010 | Cisler |
| 7,870,489 B2 | 1/2011 | Serita |
| 7,899,818 B2 | 3/2011 | Stonehocker |
| 7,902,741 B2 | 3/2011 | Iwanaga |
| 7,949,691 B1 | 5/2011 | Franciscus de Heer |
| 7,962,522 B2 | 6/2011 | Norris, III |
| 7,991,720 B2 | 8/2011 | Mander |
| 8,001,481 B2 | 8/2011 | Chakra |
| 8,010,508 B2 | 8/2011 | Audet |
| 8,010,892 B2 | 8/2011 | Audet |
| 8,010,903 B2 | 8/2011 | Dieberger |
| 8,069,404 B2 | 11/2011 | Audet |
| 8,078,966 B2 | 12/2011 | Audet |
| 8,091,033 B2 | 1/2012 | von Sichart |
| 8,099,680 B1 | 1/2012 | Kolde |
| 8,136,030 B2 | 3/2012 | Audet |
| 8,151,185 B2 | 4/2012 | Audet |
| 8,306,982 B2 | 11/2012 | Audet |
| 8,307,355 B2 | 11/2012 | Capomassi |
| 8,316,306 B2 | 11/2012 | Audet |
| 8,341,194 B2 | 12/2012 | Gottsman |
| 8,438,188 B2 | 5/2013 | Norris, III |
| 8,468,467 B2 | 6/2013 | Yamashita |
| 8,601,392 B2 | 12/2013 | Audet |
| 8,607,155 B2 | 12/2013 | Audet |
| 8,701,039 B2 | 4/2014 | Audet |
| 8,707,169 B2 | 4/2014 | Morita |
| 8,739,050 B2 | 5/2014 | Audet |
| 8,762,380 B2 | 6/2014 | Shirai |
| 8,788,937 B2 | 7/2014 | Audet |
| 8,826,123 B2 | 9/2014 | Audet |
| 8,930,895 B2 | 1/2015 | Drukman |
| 8,935,237 B2 | 1/2015 | Andersson |
| 8,984,417 B2 | 3/2015 | Audet |
| 9,058,093 B2 | 6/2015 | Audet |
| 9,081,498 B2 | 7/2015 | Thorsander |
| 9,122,374 B2 | 9/2015 | Audet |
| 9,189,129 B2 | 11/2015 | Cassistat |
| 9,262,381 B2 | 2/2016 | Audet |
| 9,348,800 B2 | 5/2016 | Audet |
| 9,519,693 B2 | 12/2016 | Audet |
| 9,529,495 B2 | 12/2016 | Cassistat |
| 9,588,646 B2 | 3/2017 | Cassistat |
| 2001/0003186 A1 | 6/2001 | DeStefano |
| 2001/0025288 A1 | 9/2001 | Yanase |
| 2001/0034766 A1 | 10/2001 | Morimoto |
| 2001/0055017 A1 | 12/2001 | Ording |
| 2002/0011990 A1 | 1/2002 | Anwar |
| 2002/0032696 A1 | 3/2002 | Takiguchi |
| 2002/0033848 A1 | 3/2002 | Sciammarella |
| 2002/0035563 A1 | 3/2002 | Suda |
| 2002/0052721 A1 | 5/2002 | Ruff |
| 2002/0056129 A1 | 5/2002 | Blackketter |
| 2002/0059215 A1 | 5/2002 | Kotani |
| 2002/0063737 A1 | 5/2002 | Feig |
| 2002/0070958 A1 | 6/2002 | Yeo |
| 2002/0078440 A1 | 6/2002 | Feinberg |
| 2002/0087530 A1 | 7/2002 | Smith |
| 2002/0091739 A1 | 7/2002 | Ferlitsch |
| 2002/0096831 A1 | 7/2002 | Nakayama |
| 2002/0101458 A1 | 8/2002 | SanGiovanni |
| 2002/0105541 A1 | 8/2002 | Endou |
| 2002/0140719 A1 | 10/2002 | Amir |
| 2002/0140740 A1 | 10/2002 | Chen |
| 2002/0143772 A1 | 10/2002 | Gottsman |
| 2002/0152474 A1 | 10/2002 | Dudkiewicz |
| 2002/0180795 A1 | 12/2002 | Wright |
| 2003/0001898 A1 | 1/2003 | Bernhardson |
| 2003/0001901 A1 | 1/2003 | Crinon |
| 2003/0030664 A1 | 2/2003 | Parry |
| 2003/0037051 A1 | 2/2003 | Gruenwald |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0069893 A1 | 4/2003 | Kanai |
| 2003/0090504 A1 | 5/2003 | Brook |
| 2003/0090524 A1 | 5/2003 | Segerberg |
| 2003/0093260 A1 | 5/2003 | Dagtas |
| 2003/0093792 A1 | 5/2003 | Labeeb |
| 2003/0095149 A1 | 5/2003 | Fredriksson |
| 2003/0120681 A1 | 6/2003 | Baclawski |
| 2003/0120737 A1 | 6/2003 | Lytle |
| 2003/0121055 A1 | 6/2003 | Kaminski |
| 2003/0128228 A1 | 7/2003 | Crow |
| 2003/0132971 A1 | 7/2003 | Billmaier |
| 2003/0140023 A1 | 7/2003 | Ferguson |
| 2003/0142136 A1 | 7/2003 | Carter |
| 2003/0149939 A1 | 8/2003 | Hubel |
| 2003/0156119 A1 | 8/2003 | Bonadio |
| 2003/0163468 A1 | 8/2003 | Freeman |
| 2003/0167902 A1 | 9/2003 | Hiner |
| 2003/0190950 A1 | 10/2003 | Matsumoto |
| 2003/0206201 A1 | 11/2003 | Ly |
| 2003/0237047 A1 | 12/2003 | Borson |
| 2004/0003398 A1 | 1/2004 | Donian |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0095376 A1 | 5/2004 | Graham |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0143598 A1 | 7/2004 | Drucker |
| 2004/0150657 A1 | 8/2004 | Wittenburg |
| 2004/0160416 A1 | 8/2004 | Venolia |
| 2004/0163049 A1 | 8/2004 | Mori |
| 2004/0172593 A1 | 9/2004 | Wong |
| 2004/0177319 A1 | 9/2004 | Horn |
| 2004/0189827 A1 | 9/2004 | Kim |
| 2004/0233238 A1 | 11/2004 | Lahdesmaki |
| 2004/0233239 A1 | 11/2004 | Lahdesmaki |
| 2004/0263519 A1 | 12/2004 | Andrews |
| 2005/0022132 A1 | 1/2005 | Herzberg |
| 2005/0060343 A1 | 3/2005 | Gottsman |
| 2005/0060667 A1 | 3/2005 | Robbins |
| 2005/0091596 A1 | 4/2005 | Anthony |
| 2005/0108644 A1 | 5/2005 | Finke-Anlauff |
| 2005/0119936 A1 | 6/2005 | Buchanan |
| 2005/0131959 A1 | 6/2005 | Thorman |
| 2005/0138066 A1 | 6/2005 | Finke-Anlauff |
| 2005/0187943 A1* | 8/2005 | Finke-Anlauff ...... G06F 16/447 |
| 2005/0210410 A1 | 9/2005 | Ohwa |
| 2005/0234843 A1 | 10/2005 | Beckius |
| 2005/0262533 A1 | 11/2005 | Hart |
| 2005/0268254 A1 | 12/2005 | Abramson |
| 2005/0289482 A1 | 12/2005 | Anthony |

(56) References Cited

U.S. PATENT DOCUMENTS

| | | |
|---|---|---|
| 2006/0000484 A1 | 1/2006 | Romanchik |
| 2006/0004848 A1 | 1/2006 | Williams |
| 2006/0013554 A1 | 1/2006 | Poslinski |
| 2006/0013555 A1 | 1/2006 | Poslinski |
| 2006/0013556 A1 | 1/2006 | Poslinski |
| 2006/0013557 A1 | 1/2006 | Poslinski |
| 2006/0020966 A1 | 1/2006 | Poslinski |
| 2006/0020971 A1 | 1/2006 | Poslinski |
| 2006/0026170 A1 | 2/2006 | Kreitler |
| 2006/0041521 A1 | 2/2006 | Oral |
| 2006/0045470 A1 | 3/2006 | Poslinski |
| 2006/0048043 A1 | 3/2006 | Kikuchi |
| 2006/0048076 A1 | 3/2006 | Vronay |
| 2006/0075338 A1 | 4/2006 | Kusakabe |
| 2006/0095857 A1 | 5/2006 | Torvinen |
| 2006/0107096 A1 | 5/2006 | Findleton |
| 2006/0116994 A1 | 6/2006 | Jonker |
| 2006/0136246 A1 | 6/2006 | Tu |
| 2006/0136466 A1 | 6/2006 | Weiner |
| 2006/0136839 A1 | 6/2006 | Makela |
| 2006/0143574 A1 | 6/2006 | Ito |
| 2006/0155757 A1 | 7/2006 | Williams |
| 2006/0156237 A1* | 7/2006 | Williams .............. G06F 16/447 715/720 |
| 2006/0156246 A1 | 7/2006 | Williams |
| 2006/0161867 A1 | 7/2006 | Drucker |
| 2006/0197782 A1 | 9/2006 | Sellers |
| 2006/0200475 A1 | 9/2006 | Das |
| 2006/0209069 A1 | 9/2006 | Bacigalupi |
| 2006/0236251 A1 | 10/2006 | Kataoka |
| 2006/0241952 A1 | 10/2006 | Loduha |
| 2006/0242178 A1 | 10/2006 | Butterfield |
| 2006/0248129 A1 | 11/2006 | Carnes |
| 2006/0259511 A1 | 11/2006 | Boerries |
| 2006/0271884 A1 | 11/2006 | Hurst |
| 2006/0277478 A1 | 12/2006 | Seraji |
| 2006/0277496 A1 | 12/2006 | Bier |
| 2007/0005576 A1 | 1/2007 | Cutrell |
| 2007/0007884 A1 | 1/2007 | Iwanaga |
| 2007/0011150 A1 | 1/2007 | Frank |
| 2007/0024722 A1 | 2/2007 | Eura |
| 2007/0061745 A1 | 3/2007 | Anthony |
| 2007/0061855 A1 | 3/2007 | Serita |
| 2007/0067290 A1 | 3/2007 | Makela |
| 2007/0070066 A1* | 3/2007 | Bakhash .............. G06F 3/04815 345/419 |
| 2007/0270985 A1 | 3/2007 | Shellshear |
| 2007/0076984 A1 | 4/2007 | Takahashi |
| 2007/0083505 A1 | 4/2007 | Ferrari |
| 2007/0083527 A1 | 4/2007 | Wadler |
| 2007/0094615 A1 | 4/2007 | Endo |
| 2007/0100842 A1 | 5/2007 | Wykes |
| 2007/0118520 A1 | 5/2007 | Bliss |
| 2007/0120856 A1 | 5/2007 | De Ruyter |
| 2007/0136687 A1 | 6/2007 | Pak |
| 2007/0143803 A1 | 6/2007 | Lim |
| 2007/0156654 A1 | 7/2007 | Ravinarayanan |
| 2007/0168877 A1 | 7/2007 | Jain |
| 2007/0171224 A1 | 7/2007 | MacPherson |
| 2007/0185826 A1 | 8/2007 | Brice |
| 2007/0192749 A1 | 8/2007 | Baudisch |
| 2007/0204218 A1 | 8/2007 | Weber |
| 2007/0208679 A1 | 9/2007 | Tseng |
| 2007/0214169 A1 | 9/2007 | Audet |
| 2007/0216694 A1 | 9/2007 | Audet |
| 2007/0220209 A1 | 9/2007 | Maeda |
| 2007/0239676 A1 | 10/2007 | Stonehocker |
| 2007/0268522 A1 | 11/2007 | Miyamoto |
| 2007/0271508 A1 | 11/2007 | Audet |
| 2007/0272508 A1 | 11/2007 | Toya |
| 2008/0000126 A1 | 1/2008 | Teza |
| 2008/0010605 A1 | 1/2008 | Frank |
| 2008/0015911 A1 | 1/2008 | Wang |
| 2008/0016142 A1 | 1/2008 | Schneider |
| 2008/0019371 A1 | 1/2008 | Anschutz |
| 2008/0022199 A1 | 1/2008 | Sako |
| 2008/0024444 A1 | 1/2008 | Abe |
| 2008/0040665 A1 | 2/2008 | Waldeck |
| 2008/0046844 A1 | 2/2008 | Sugie |
| 2008/0058106 A1 | 3/2008 | Audet |
| 2008/0059897 A1 | 3/2008 | Dilorenzo |
| 2008/0065995 A1 | 3/2008 | Bell |
| 2008/0071822 A1 | 3/2008 | Audet |
| 2008/0072169 A1 | 3/2008 | Audet |
| 2008/0077756 A1 | 3/2008 | Shibata |
| 2008/0092038 A1 | 4/2008 | Audet |
| 2008/0098323 A1 | 4/2008 | Vallone |
| 2008/0104227 A1 | 5/2008 | Birnie |
| 2008/0104534 A1 | 5/2008 | Park |
| 2008/0111826 A1 | 5/2008 | Endrikhovski |
| 2008/0118219 A1 | 5/2008 | Chang |
| 2008/0120571 A1 | 5/2008 | Chang |
| 2008/0133579 A1 | 6/2008 | Lim |
| 2008/0134013 A1 | 6/2008 | Audet |
| 2008/0134022 A1 | 6/2008 | Audet |
| 2008/0140448 A1 | 6/2008 | Hernandez |
| 2008/0141115 A1 | 6/2008 | Audet |
| 2008/0155474 A1 | 6/2008 | Duhig |
| 2008/0163048 A1 | 7/2008 | Gossweiler, III |
| 2008/0174790 A1 | 7/2008 | Noguchi |
| 2008/0184285 A1 | 7/2008 | Park |
| 2008/0186305 A1 | 8/2008 | Carter |
| 2008/0243778 A1 | 10/2008 | Behnen |
| 2008/0244437 A1 | 10/2008 | Fischer |
| 2008/0256473 A1 | 10/2008 | Chakra |
| 2008/0256474 A1 | 10/2008 | Chakra |
| 2008/0270361 A1 | 10/2008 | Meyer |
| 2008/0270928 A1 | 10/2008 | Chakra |
| 2008/0276178 A1 | 11/2008 | Fadell |
| 2008/0282198 A1 | 11/2008 | Brooks |
| 2008/0294651 A1 | 11/2008 | Masuyama |
| 2008/0295016 A1 | 11/2008 | Audet |
| 2008/0295036 A1 | 11/2008 | Ikeda |
| 2008/0298697 A1 | 12/2008 | Lee |
| 2008/0299989 A1 | 12/2008 | King |
| 2008/0301562 A1 | 12/2008 | Berger |
| 2008/0307343 A1 | 12/2008 | Robert |
| 2008/0307348 A1 | 12/2008 | Jones |
| 2009/0018996 A1 | 1/2009 | Hunt |
| 2009/0019371 A1 | 1/2009 | Audet |
| 2009/0031208 A1* | 1/2009 | Robinson .............. G06F 40/177 715/227 |
| 2009/0033664 A1 | 2/2009 | Hao |
| 2009/0048981 A1 | 2/2009 | McBain Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1 | 2/2009 | Audet |
| 2009/0055776 A1 | 2/2009 | Audet |
| 2009/0063552 A1 | 3/2009 | Jones |
| 2009/0064029 A1 | 3/2009 | Corkran |
| 2009/0064143 A1 | 3/2009 | Bhogal |
| 2009/0070662 A1 | 3/2009 | Audet |
| 2009/0070699 A1 | 3/2009 | Birkill |
| 2009/0083260 A1 | 3/2009 | Artom |
| 2009/0083859 A1 | 3/2009 | Roth |
| 2009/0106684 A1 | 4/2009 | Chakra |
| 2009/0106685 A1 | 4/2009 | Care |
| 2009/0113334 A1 | 4/2009 | Chakra |
| 2009/0116817 A1 | 5/2009 | Kim |
| 2009/0132952 A1 | 5/2009 | Wong |
| 2009/0150832 A1 | 6/2009 | Keller |
| 2009/0164933 A1 | 6/2009 | Pederson |
| 2009/0177754 A1 | 7/2009 | Brezina |
| 2009/0199119 A1 | 8/2009 | Park |
| 2009/0199302 A1 | 8/2009 | So |
| 2009/0210862 A1 | 8/2009 | Viswanadha |
| 2009/0217204 A1 | 8/2009 | Yamashita |
| 2009/0228774 A1 | 9/2009 | Matheny |
| 2009/0228788 A1 | 9/2009 | Audet |
| 2009/0235194 A1 | 9/2009 | Arndt |
| 2009/0254850 A1 | 10/2009 | Almeida |
| 2009/0265372 A1 | 10/2009 | Esmann-Jensen |
| 2009/0276733 A1 | 11/2009 | Manyam |

(56) References Cited

U.S. PATENT DOCUMENTS

| | | |
|---|---|---|
| 2009/0284658 A1 | 11/2009 | Cho |
| 2009/0287693 A1 | 11/2009 | Audet |
| 2009/0288006 A1 | 11/2009 | Audet |
| 2009/0307629 A1 | 12/2009 | Horiuchi |
| 2009/0319933 A1 | 12/2009 | Zaika |
| 2009/0322756 A1 | 12/2009 | Robertson |
| 2010/0023500 A1 | 1/2010 | Bascom |
| 2010/0057576 A1 | 3/2010 | Brodersen |
| 2010/0058226 A1 | 3/2010 | Flake |
| 2010/0070919 A1 | 3/2010 | Araumi |
| 2010/0077355 A1 | 3/2010 | Belinsky |
| 2010/0082427 A1 | 4/2010 | Burgener |
| 2010/0082653 A1 | 4/2010 | Nair |
| 2010/0083159 A1 | 4/2010 | Mountain |
| 2010/0094890 A1 | 4/2010 | Bokor |
| 2010/0110228 A1 | 5/2010 | Ozawa |
| 2010/0145976 A1 | 6/2010 | Higgins |
| 2010/0146380 A1 | 6/2010 | Rousso |
| 2010/0150522 A1 | 6/2010 | Schmehl |
| 2010/0325568 A1 | 6/2010 | Pedersen |
| 2010/0169823 A1* | 7/2010 | Audet ............ G06Q 10/10 715/784 |
| 2010/0171861 A1 | 7/2010 | Ota |
| 2010/0185509 A1 | 7/2010 | Higgins |
| 2010/0205563 A1 | 8/2010 | Haapsaari |
| 2010/0313158 A1 | 12/2010 | Lee |
| 2010/0313159 A1 | 12/2010 | Decker |
| 2010/0318200 A1 | 12/2010 | Foslien |
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0010667 A1 | 1/2011 | Sakai |
| 2011/0012927 A1 | 1/2011 | Lin |
| 2011/0029925 A1 | 2/2011 | Robert |
| 2011/0035700 A1 | 2/2011 | Meaney |
| 2011/0061082 A1 | 3/2011 | Heo |
| 2011/0078166 A1 | 3/2011 | Oliver |
| 2011/0086675 A1 | 4/2011 | Brinda |
| 2011/0145745 A1 | 6/2011 | Hyeon |
| 2011/0154213 A1 | 6/2011 | Wheatley |
| 2011/0219297 A1 | 9/2011 | Oda |
| 2011/0239149 A1 | 9/2011 | Lazo |
| 2011/0246926 A1 | 10/2011 | Newton |
| 2011/0302556 A1 | 12/2011 | Drukman |
| 2011/0307814 A1 | 12/2011 | Audet |
| 2012/0114296 A1 | 5/2012 | Luo |
| 2012/0131500 A1 | 5/2012 | Fujisawa |
| 2012/0159320 A1 | 6/2012 | Audet |
| 2012/0159393 A1 | 6/2012 | Sethi |
| 2012/0183273 A1 | 7/2012 | Utsuki |
| 2012/0192086 A1* | 7/2012 | Ghods ............ H04L 12/1859 715/753 |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2012/0262398 A1 | 10/2012 | Kim |
| 2013/0080880 A1 | 3/2013 | Cassistat |
| 2013/0080888 A1 | 3/2013 | Audet |
| 2013/0179777 A1 | 7/2013 | Cassistat |
| 2013/0179801 A1 | 7/2013 | Audet |
| 2013/0198190 A1 | 8/2013 | Cassistat |
| 2013/0198782 A1 | 8/2013 | Arruda |
| 2013/0218894 A1 | 8/2013 | Audet |
| 2013/0227470 A1 | 8/2013 | Thorsander |
| 2013/0227487 A1 | 8/2013 | Cassistat |
| 2013/0263050 A1 | 10/2013 | Audet |
| 2013/0290891 A1 | 10/2013 | Audet |
| 2013/0290897 A1 | 10/2013 | Audet |
| 2013/0332453 A1 | 12/2013 | Audet |
| 2013/0332459 A1 | 12/2013 | Audet |
| 2013/0346106 A1 | 12/2013 | Xiao |
| 2014/0181649 A1 | 6/2014 | Audet |
| 2014/0223297 A1 | 8/2014 | Audet |
| 2014/0244625 A1 | 8/2014 | Seghezzi |
| 2014/0245228 A1 | 8/2014 | Audet |
| 2015/0019252 A1 | 1/2015 | Dawson |
| 2015/0324071 A1 | 11/2015 | Audet |
| 2016/0077689 A1 | 3/2016 | Audet |
| 2016/0085390 A1 | 3/2016 | Audet |
| 2016/0092043 A1 | 3/2016 | Missig |
| 2017/0255368 A1 | 9/2017 | Audet |
| 2019/0302977 A1 | 10/2019 | Pendergast |

FOREIGN PATENT DOCUMENTS

| | | |
|---|---|---|
| CA | 2780828 | 10/2015 |
| CA | 2601154 | 9/2016 |
| CA | 2602831 | 9/2016 |
| CA | 2677921 | 6/2017 |
| CA | 2657835 | 9/2017 |
| EP | 2568369 | 3/2013 |
| JP | 07-013971 | 1/1995 |
| JP | 07-085080 | 3/1995 |
| JP | 09-016809 | 6/1995 |
| JP | 08-016612 | 1/1996 |
| JP | 09-265480 | 3/1996 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO-9903271 | 1/1999 |
| WO | WO-2000/65429 | 11/2000 |
| WO | WO 2001-22194 | 3/2001 |
| WO | WO-2001/63378 | 8/2001 |
| WO | WO-2001/98881 | 12/2001 |
| WO | WO-2002/099241 | 12/2002 |
| WO | WO-2003/001345 | 1/2003 |
| WO | WO-2003/032199 | 4/2003 |
| WO | WO-2005/045756 | 5/2005 |
| WO | WO-2005/083595 | 9/2005 |
| WO | WO-2007/095997 | 8/2007 |
| WO | WO-2008/030779 | 3/2008 |

OTHER PUBLICATIONS

Haystack Project; David R. Karger, Stephen J. Garland, Karun Bakshi, David Huynh, Nicholas Matsakis, Dennis Quan, Vineet Sinha, Jaime Teevan, Yuan Shen, Punyashloka Biswal, Artem Gleyzer; Ryan Manuel, Alexandre P. Poliakov, Amanda Smith, Lynn A. Stein, Eytan Adar, Mark Asdoorian, Robert Aspell, Wendy Chien, Gabriel Cunningham, Jonathan Derryberry, Adam Holt, Joshua Kramer, Percy Liang, Ilya Lisansky, Aidan Low, Enrique A. Muñoz Torres, Mark Rosen, Kai Shih, Svetlana Shnitser, Ben Walter, Marina Zhurakhinskaya; Massachusetts Institute of Technology; http://web.archive.org/web/20070415053620/http://haystack.lcs.mit.edu/; http://groups.csail.mit.edu/haystack/ ; http://en.wikipedia.org/wiki/Haystack_%28MIT_project%29 ; Published May 10, 2013.

Chandler Project; Grant Baillie, Jeffrey Harris, Sheila Mooney, Katie Capps Parlante, Jared Rhine, Mimi Yin, Eugene Kim, Alex Russell, Andre Mueninghoff, Al Cho, Aleks Totic, Alec Flett, Andi Vajda, Andy Hertzfeld, Aparna Kadakia, Bobby Rullo, Brendan

(56) References Cited

OTHER PUBLICATIONS

O'Connor, Brian Douglas Skinner, Brian Kirsch, Brian Moseley, Bryan Stearns, Chao Lam, Chris Haumesser, David Surovell, Donn Denman, Ducky Sherwood, Ed Bindl, Edward Chao, Heikki Toivonen, Jed Burgess, John Anderson, John Townsend, Jürgen Botz, Lisa Dusseault, Lori Motko, Lou Montulli, Mark Jaffe, Matthew Eernisse, Michael Toy, Mike Taylor, Mitch Kapor, Morgen Sagen, Pieter Hartsook, Philippe Bossut, Priscilla Chung, Robin Dunn, Randy Letness, Rys McCusker, Stuart Parmenter, Suzette Tauber, Ted Leung, Travis Vachon, Vinubalaji Gopal ; Open Source Applications Foundation ; http://chandlerproject.org/ ; Published May 10, 2013.
Emacs Org-Mode; Carsten, Bastien Guerry, Eric Shulte, Dan Davison, John Wiegley, Sebastian Rose, Nicolas Goaziou, Achim Gratz, Nick Dokos, Russel Adams, Suvayu Ali, Luis Anaya, Thomas Baumann, Michael Brand, Christophe Bataillon, Alex Bochannek, Jan BÃ¶cker, Brad Bozarth, Tom Breton, Charles Cave, Pavel Chalmoviansky, Gregory Chernov, Sacha Chua, Toby S. Cubitt, Baoqiu Cui, Eddward DeVilla, Nick Dokos, Kees Dullemond, Thomas S. Dye, Christian Egli, David Emery, Nic Ferrier, Miguel A. Figueroa-Villanueva, John Foerch, Raimar Finken, Mikael Fornius, Austin Frank, Eric Fraga, Barry Gidden, Niels Giesen, Nicolas Goaziou, Kai Grossjohann, Brian Gough, Bernt Hansen, Manuel Hermenegildo, Phil Jackson, Scott Jaderholm, Matt Jones, Tokuya Kameshima, Jonathan Leech-Pepin, Shidai Liu, Matt Lundin, David Maus, Jason F. McBrayer, Max Mikhanosha, Dmitri Minaev, Stefan Monnier, Richard Moreland, Rick Moynihan, Todd Neal, Greg Newman, Tim O'Callaghan, Osamu Okano, Takeshi Okano, Oliver Oppitz, Scott Otterson, Pete Phillips, Francesco Pizzolante, Martin Pohlack, T.V. Raman, Matthias Rempe, Paul Rivier, Kevin Rogers, Frank Ruell, Jason Riedy, Philip Rooke, Christian Schlauer, Christopher Schmidt, Paul Sexton, Tom Shannon, Ilya Shlyakhter, Stathis Sideris, Daniel Sinder, Dale Smith, James TD Smith, Adam Spiers, Ulf Stegemann, Andy Stewart, David O'Toole, Jambunathan K, Sebastien Vauban, Stefan Vollmar, Jürgen Vollmer, Samuel Wales, Chris Wallace, David Wainberg, Carsten Wimmer, Roland Winkler, Piotr Zielinski; http://orgmode.org/ ; Published May 10, 2013.
TimeLine: Visualizing Integrated Patient Records; Alex A. T. Bui, Denise R. Aberte, Hooshang Kangarloo ; IEE Transactions on information technology in biomedicine, vol. 11, No. 4, Published Jul. 2007.
ChronoTwigger: A Visual analytics tool for understanding source and test co-evolution ; Barret Ens, Daniel Rea, Roiy Shpaner, Hadi Hemmati, James E. Young, Pourang Irani ; Department of Computer Science, University of Manitoba, Winnipeg, Canada ; Published 2014.
Translation of foreign reference EP2568369.
Visualization of document collection: the vibe system ; in Information Processing & Management vol. 29. Published by Pergamon Press, Molde (Norway), Published Feb. 3, 1992.
Translation of EP2568369.
Canadian Intellectual Property Office—2,638,101; Requisition—Simon Chau, CIPO, Gatineau Canada.

* cited by examiner

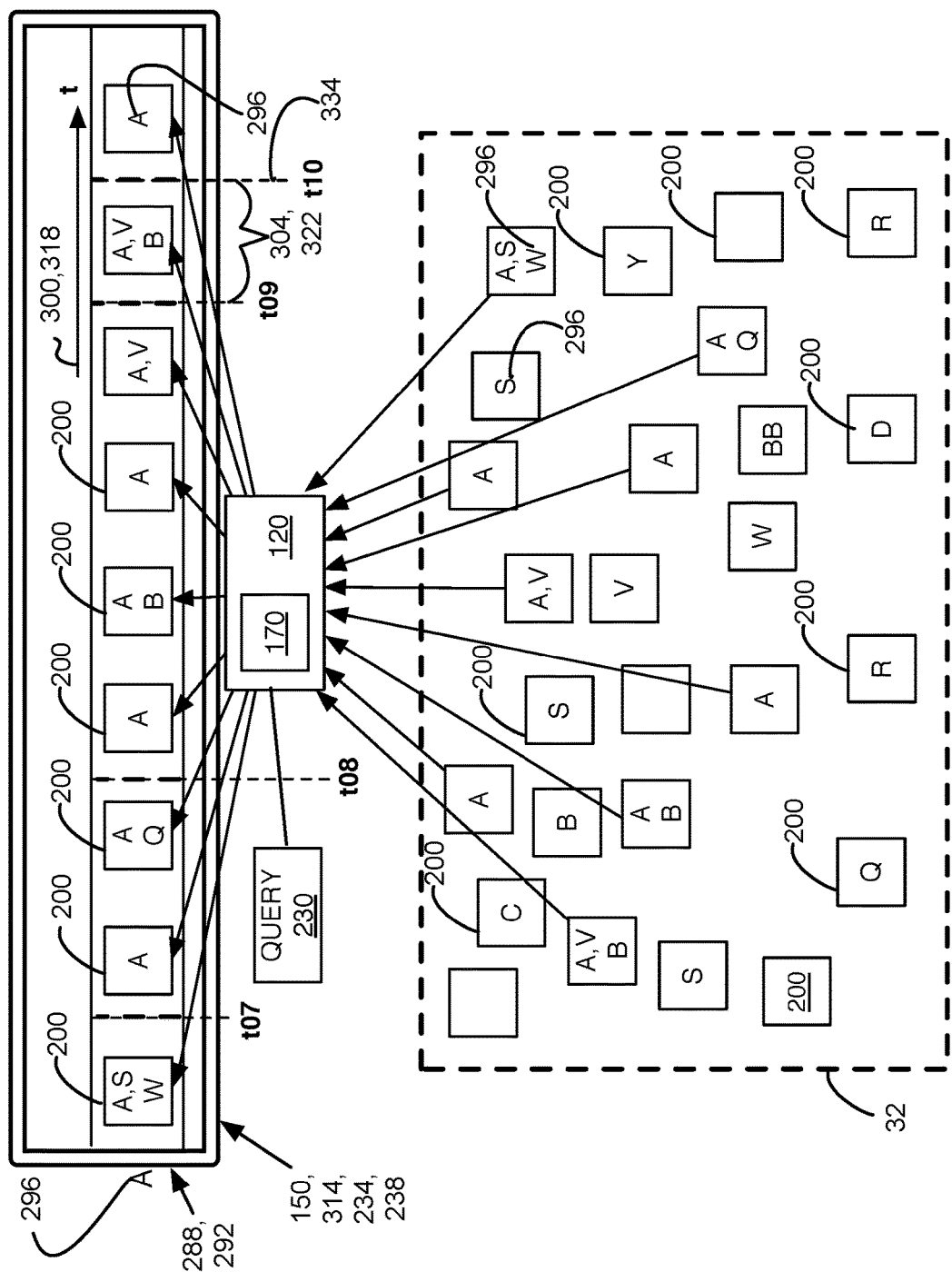

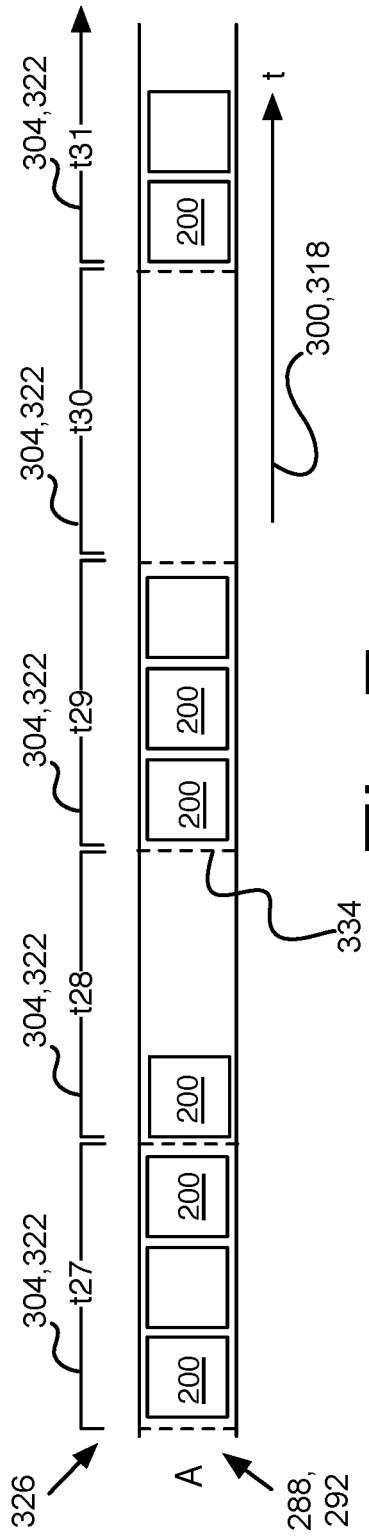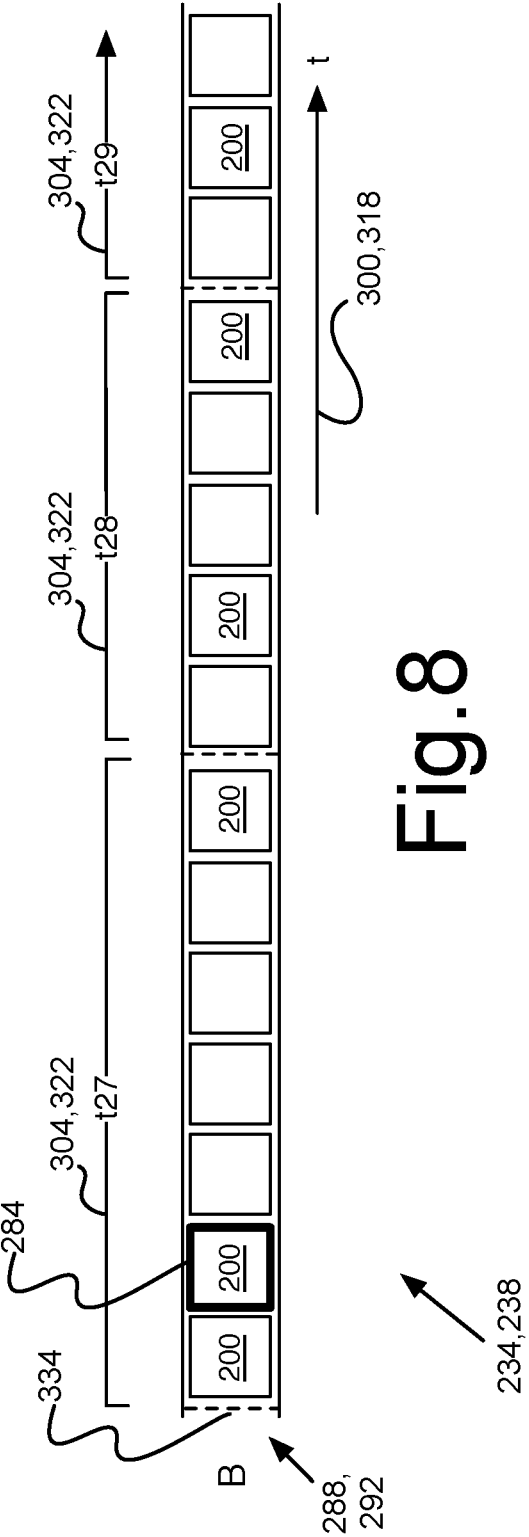

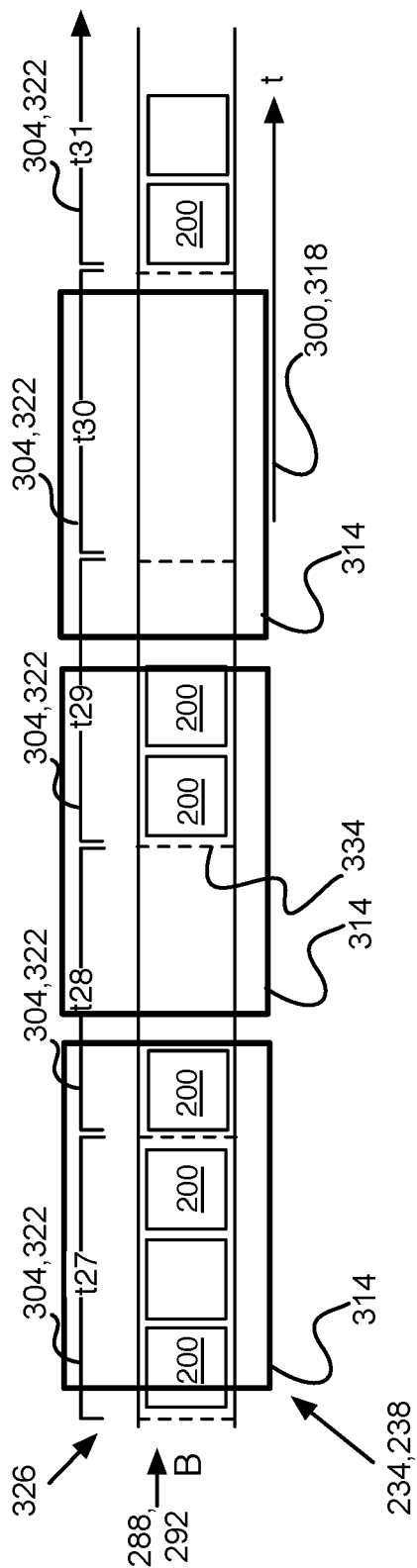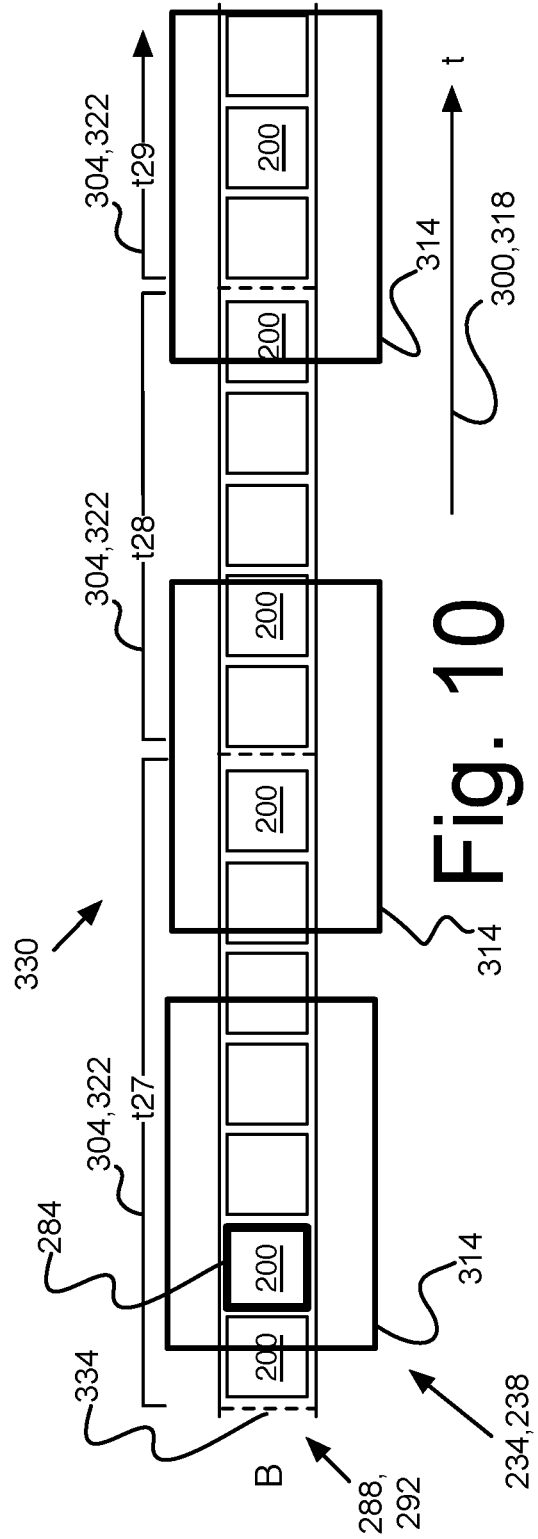

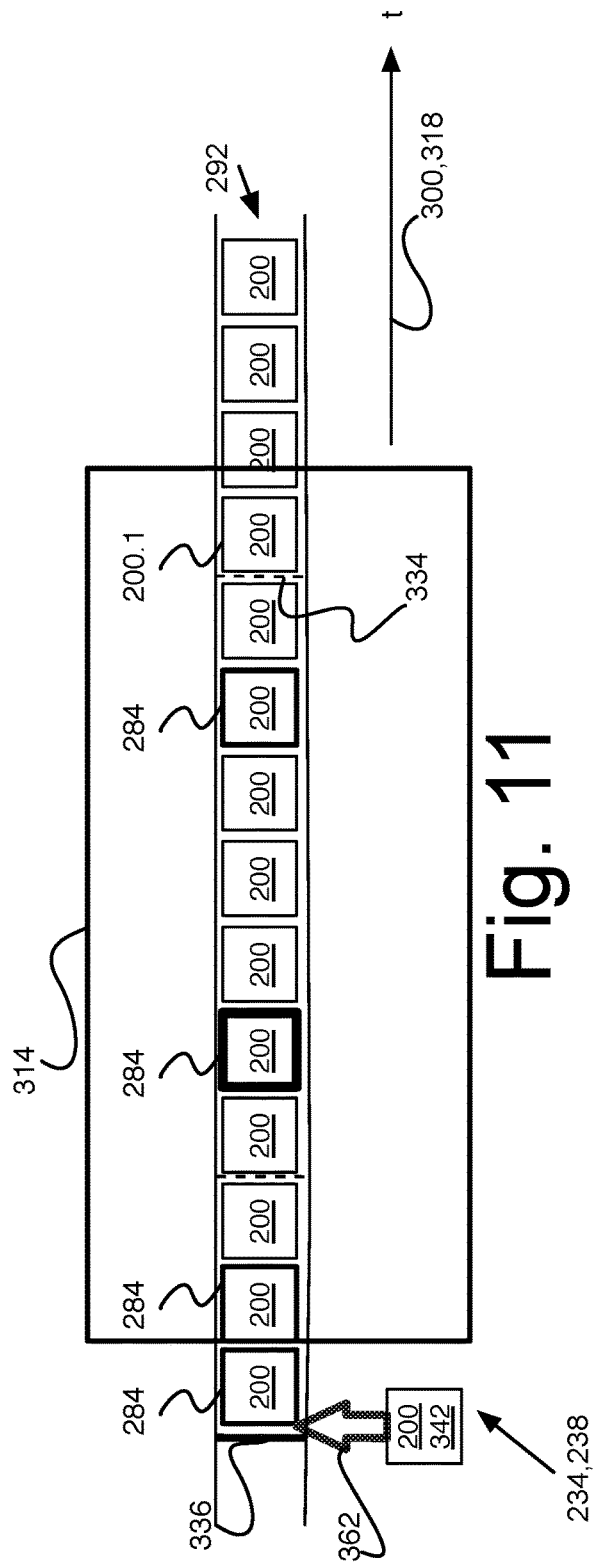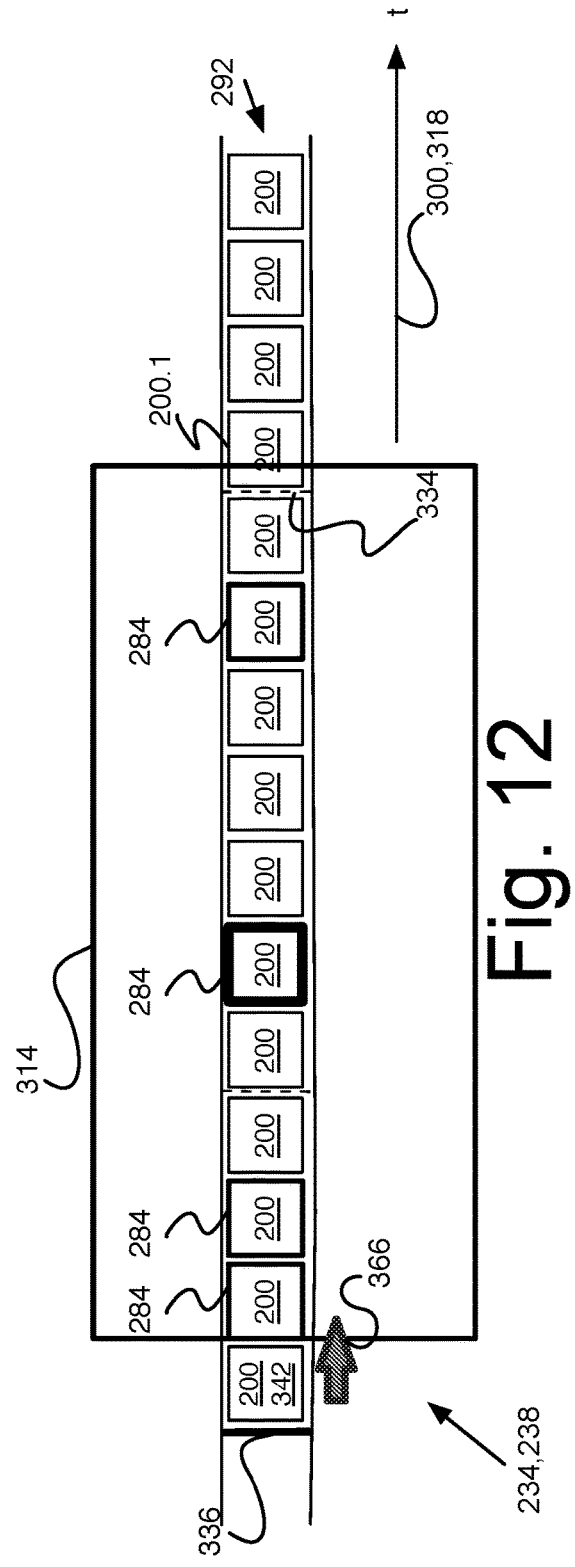

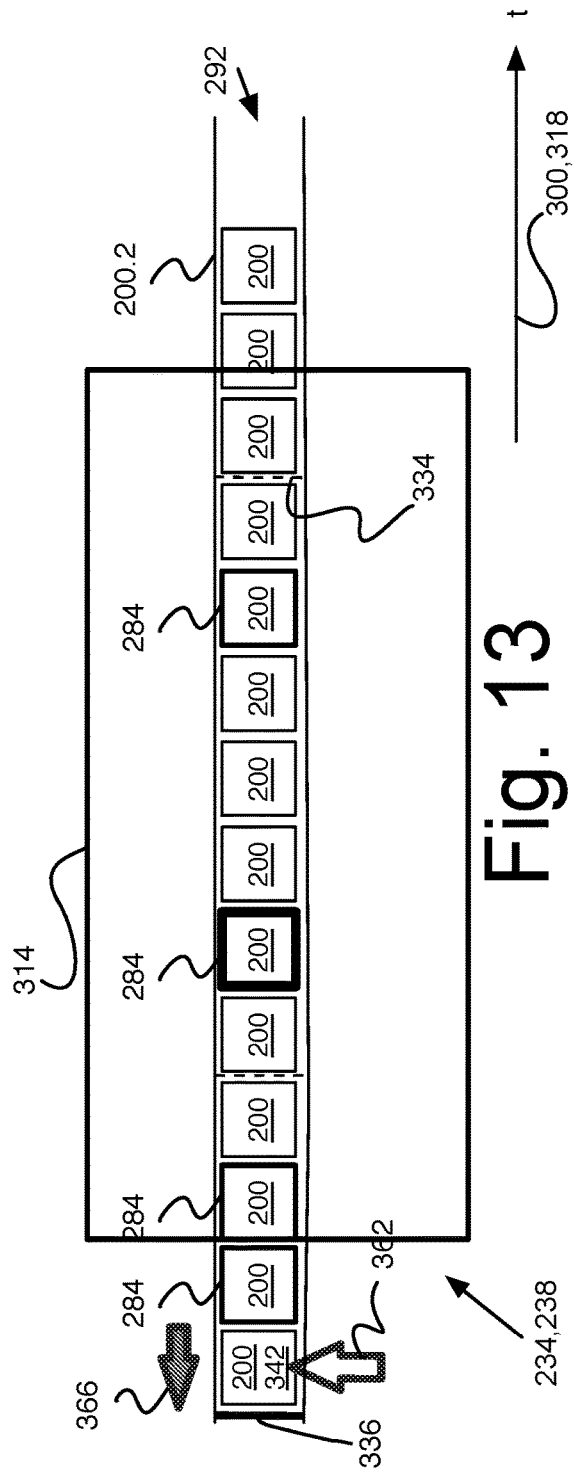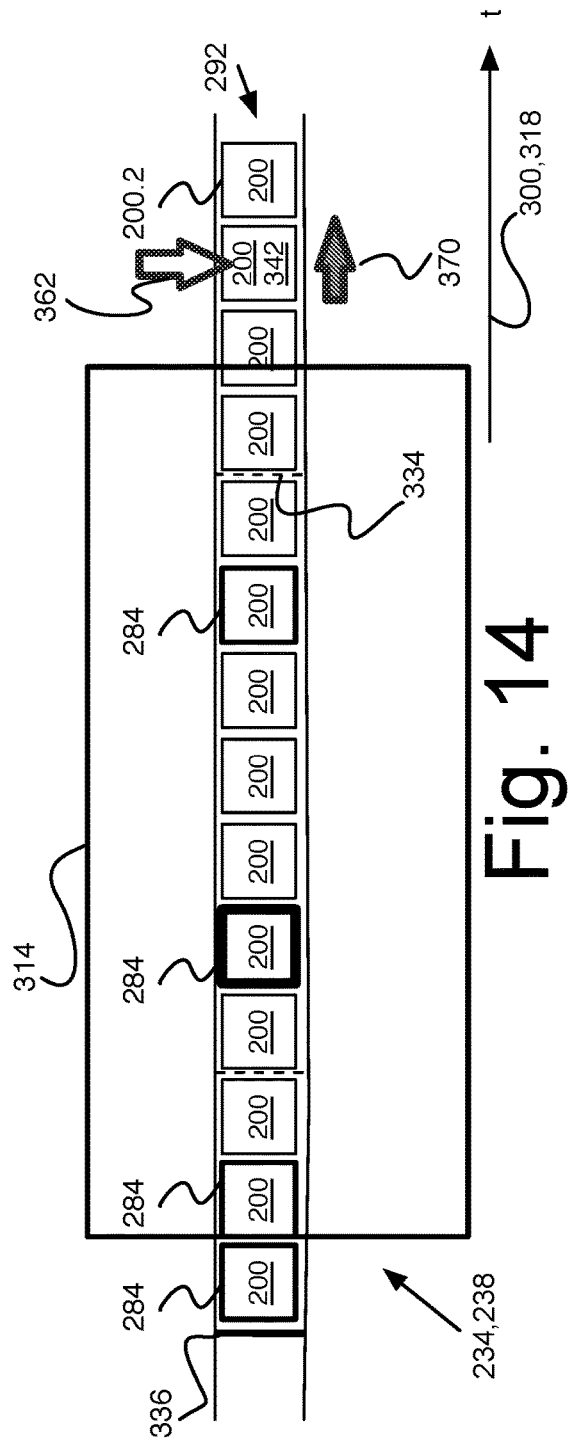

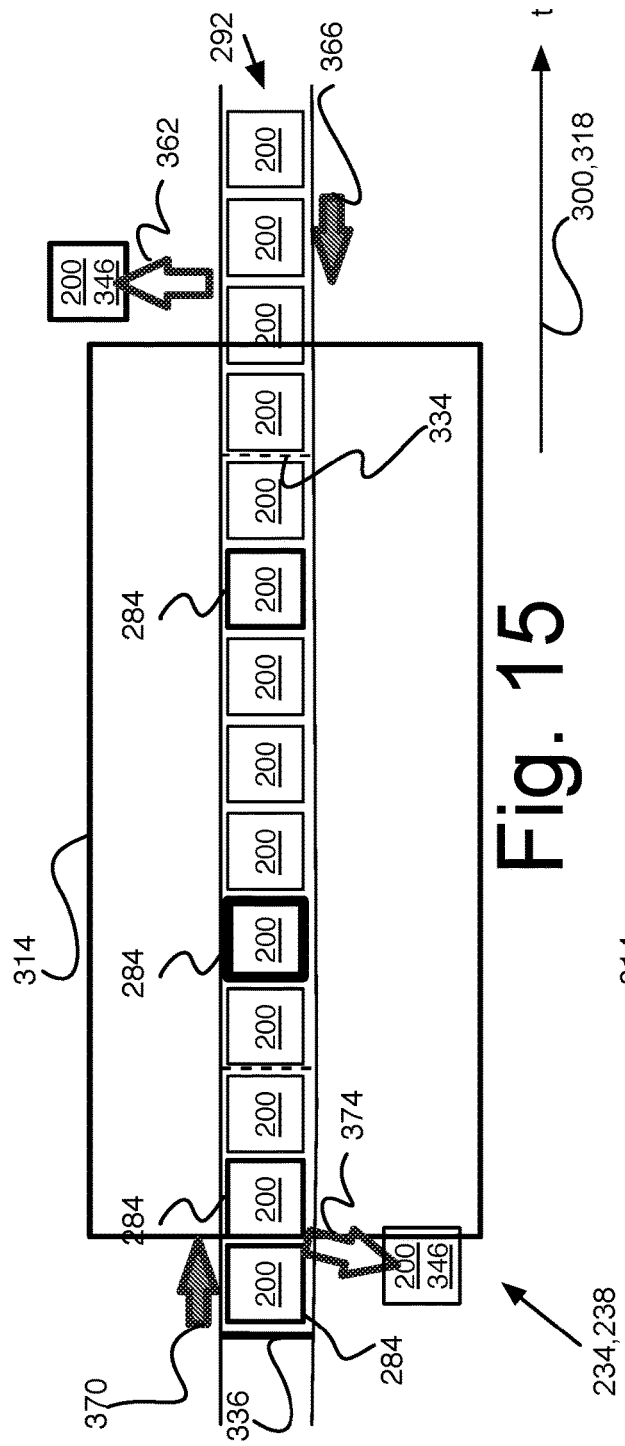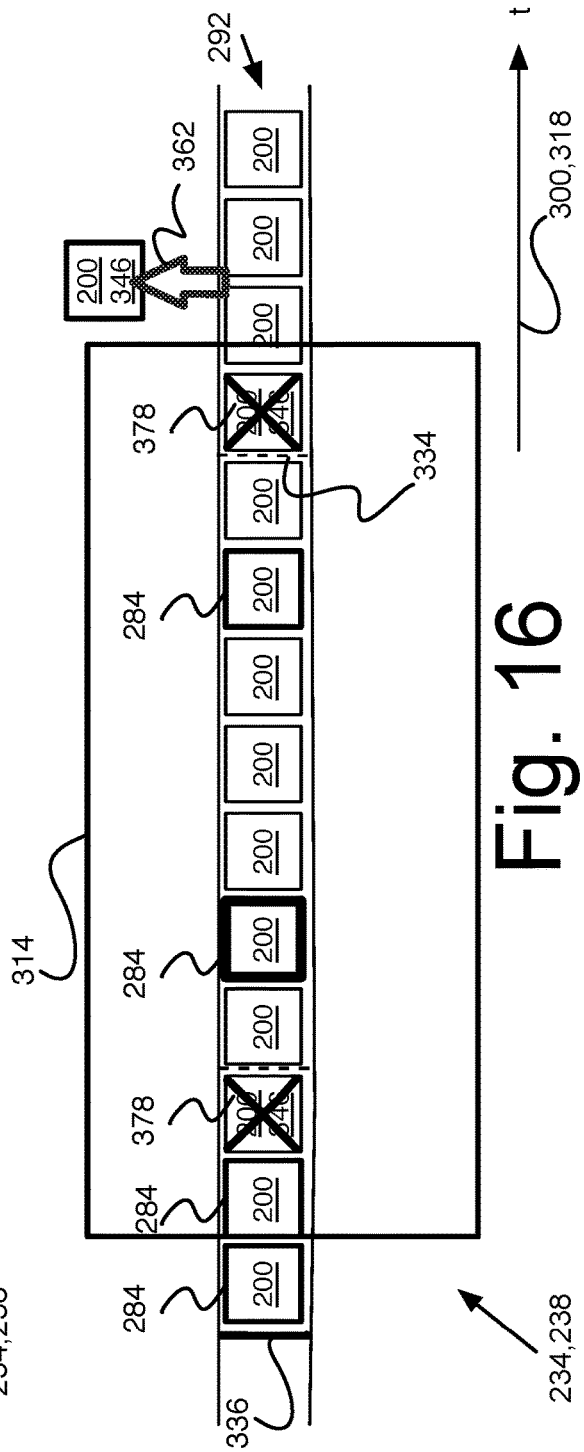

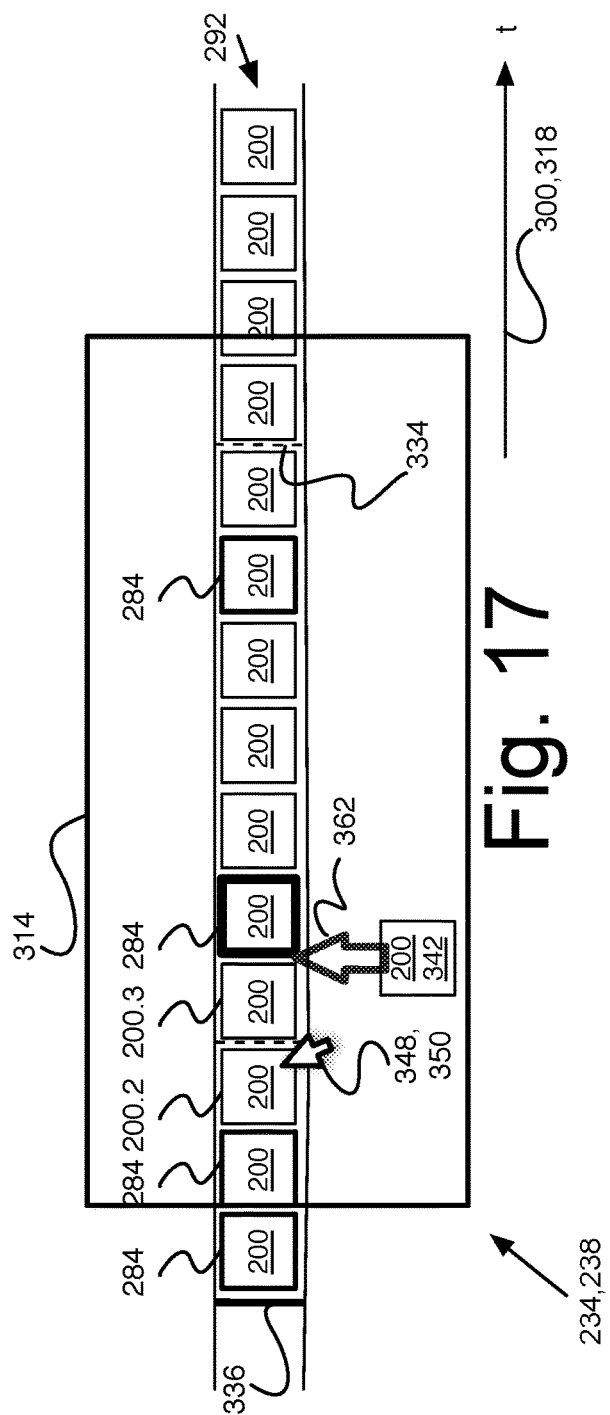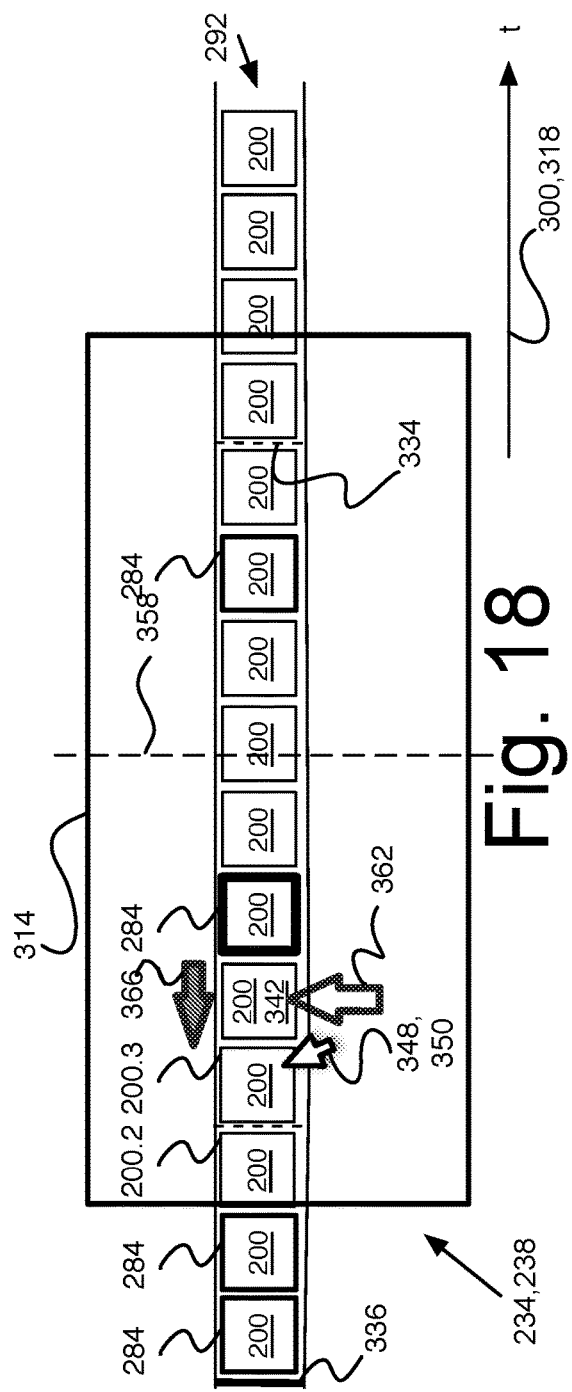

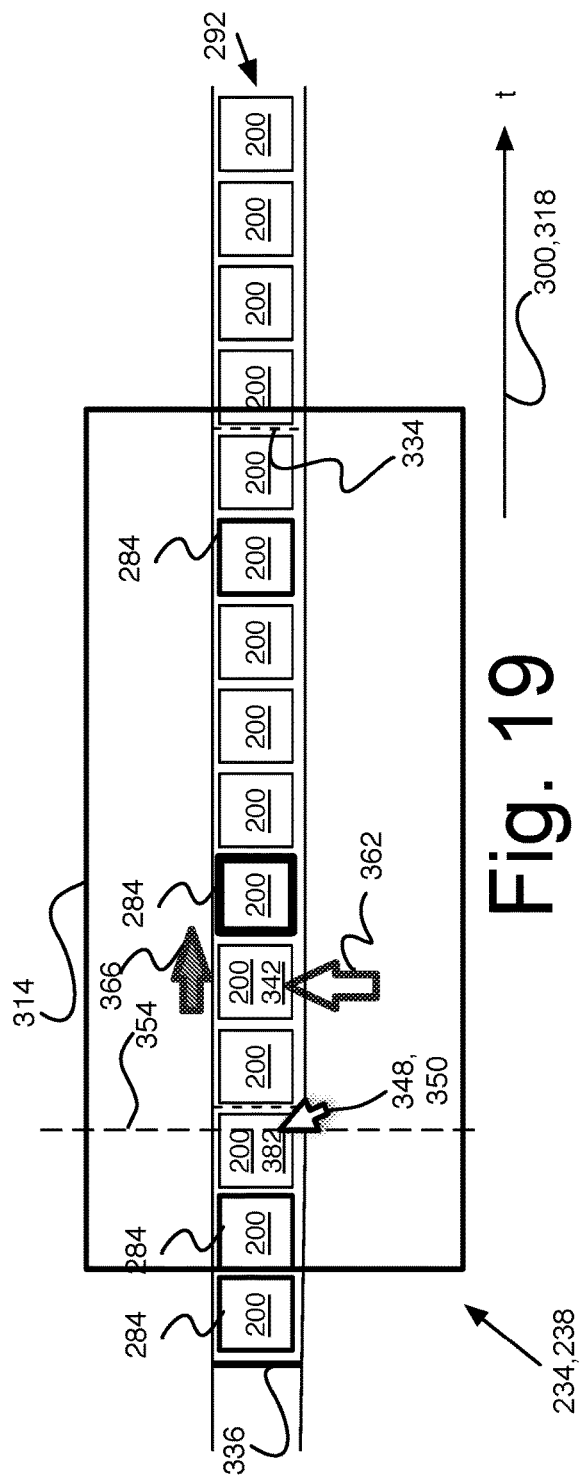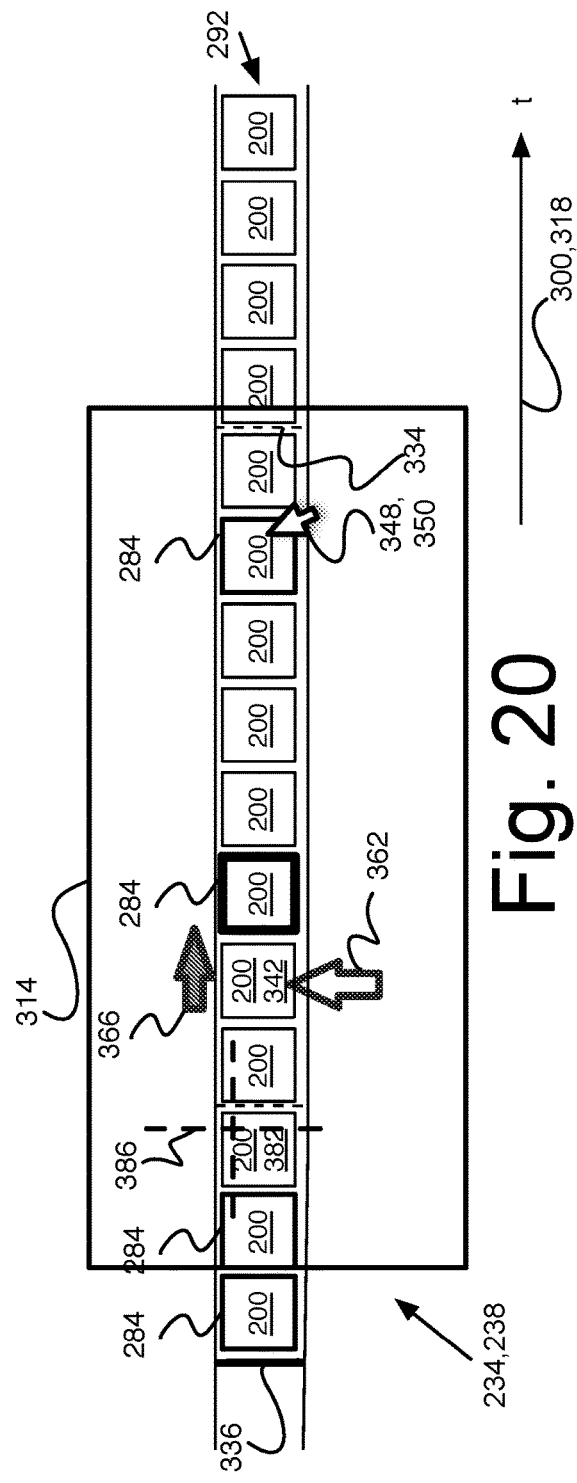

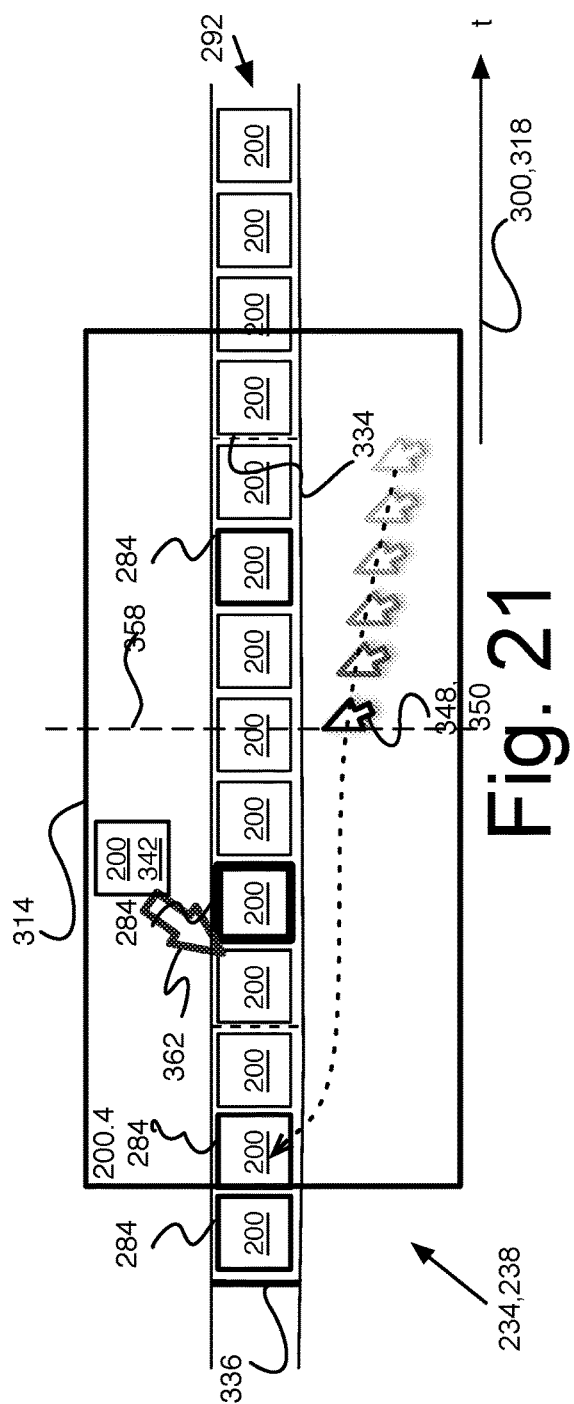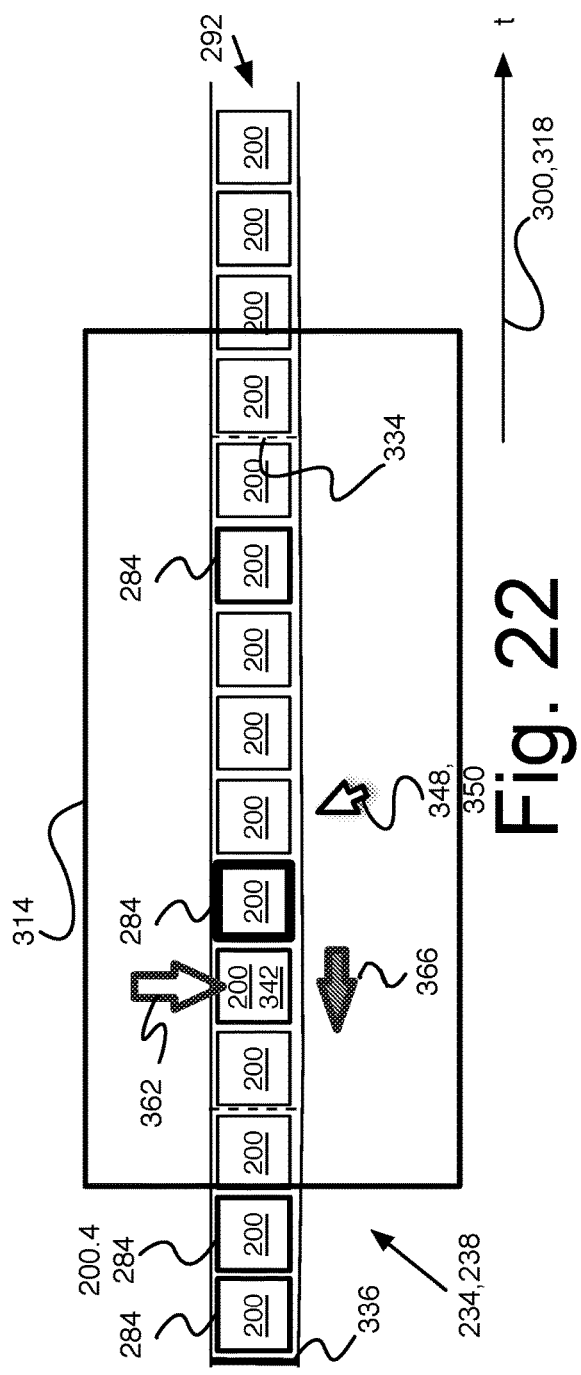

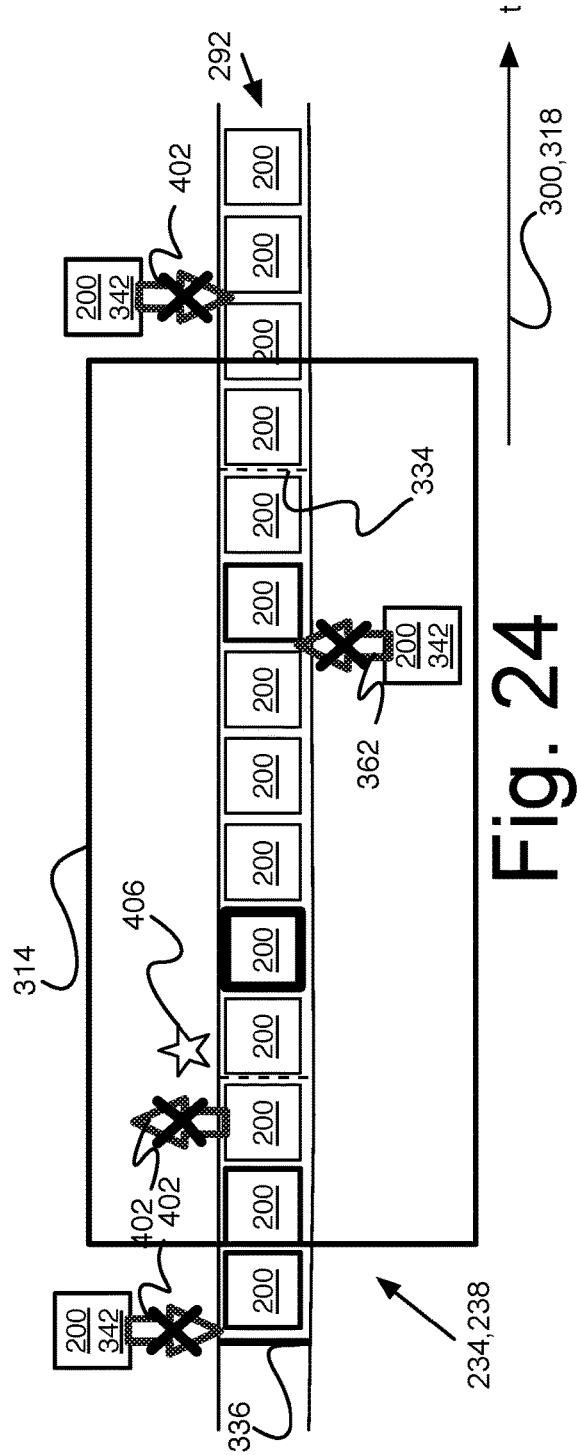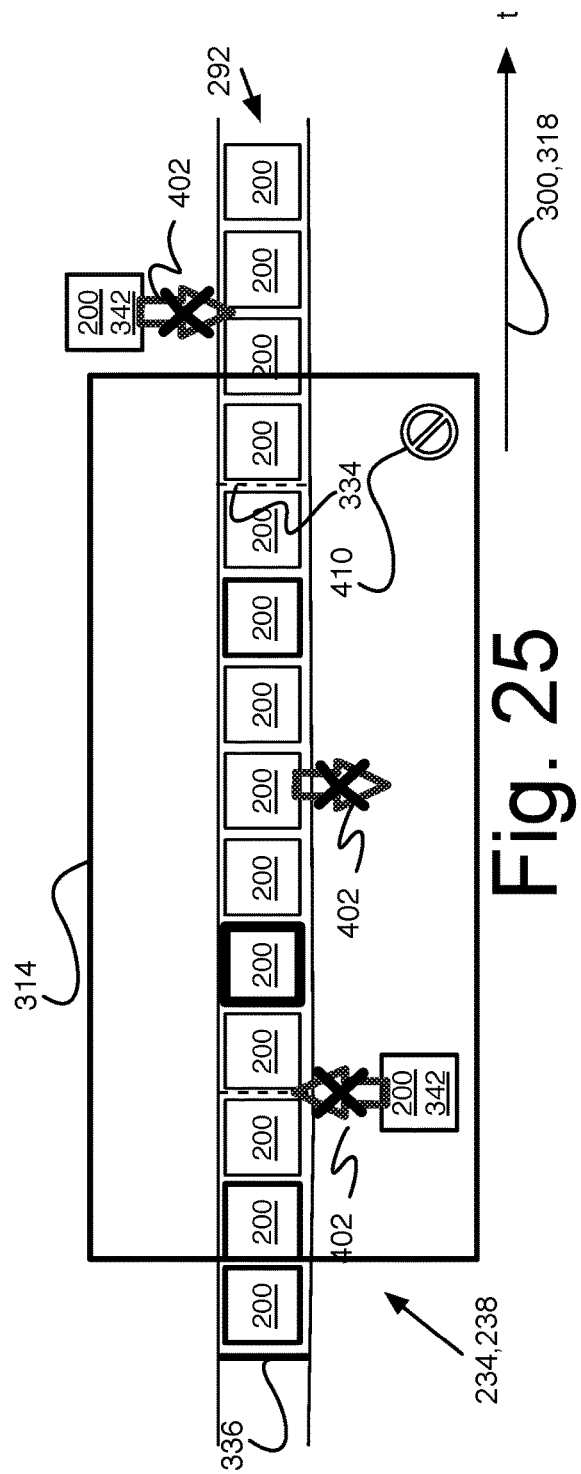

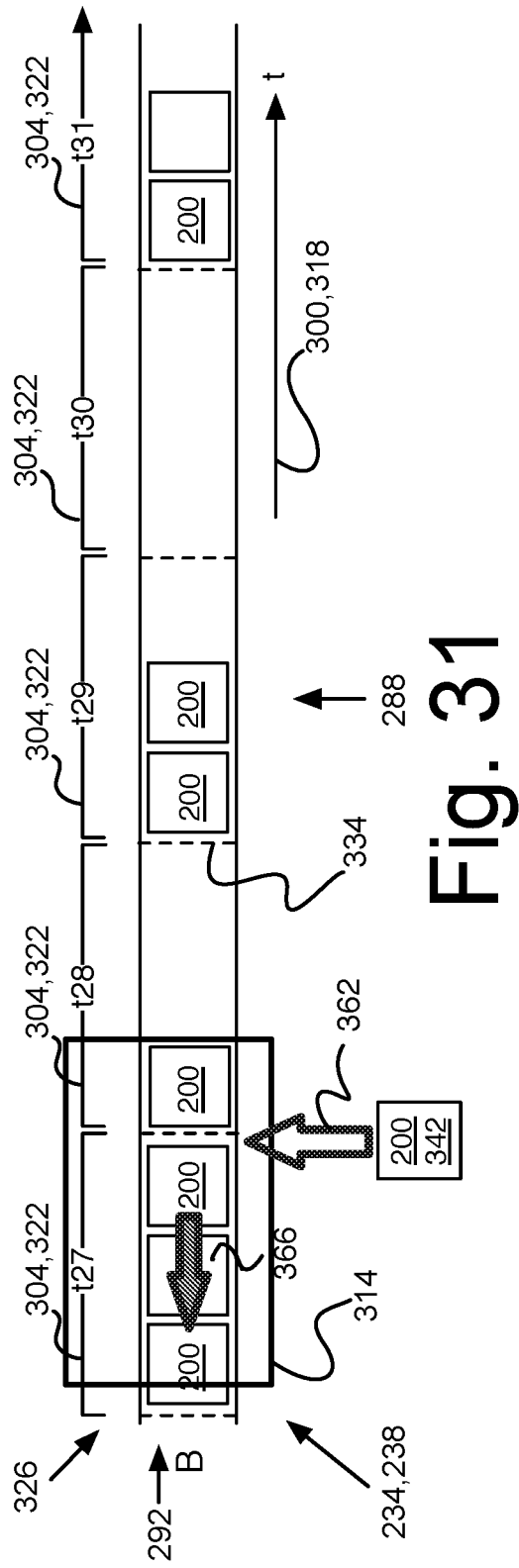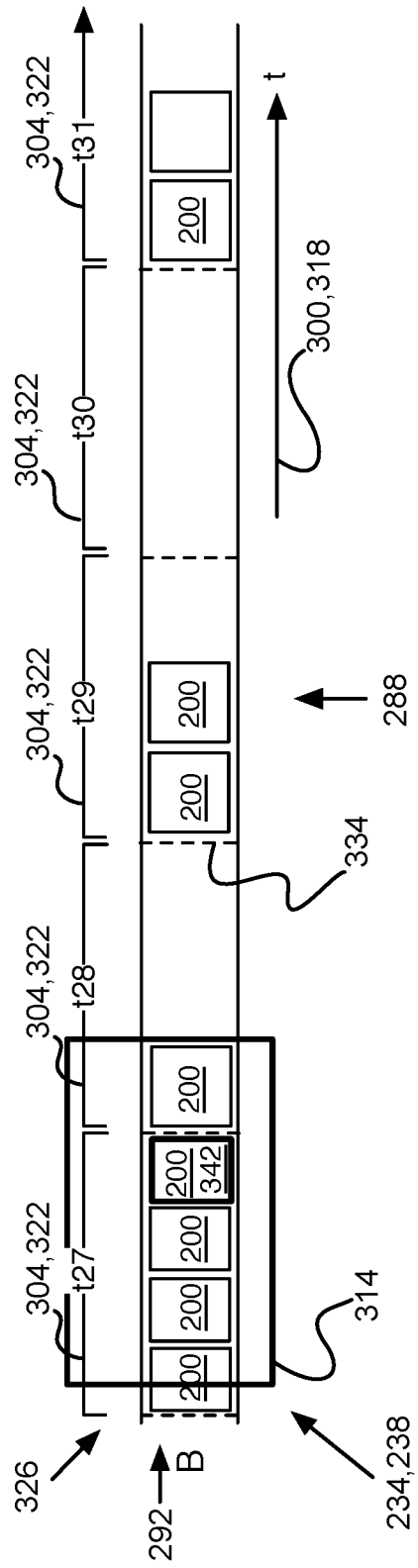

METHOD OF EXPANDING STACKED ELEMENTS

CROSS-REFERENCES

The present invention relates to claims priority from and is a continuing application of U.S. patent application Ser. No. 15/434,184, filed Feb. 16, 2017, which '184 application relates to, claims priority from and is a continuing application of U.S. patent application Ser. No. 13/626,692, filed Sep. 25, 2012, now U.S. Pat. No 9,613,167, which '692 application claims priority from U.S. Provisional Patent Application No. 61/538,879, filed Sep. 25, 2011 All these documents are incorporated herein by reference in their entireties.

BACKGROUND OF THE INVENTION

1. Field of the Invention

This invention relates generally to computer systems adapted to insert information elements in information element axes. The present invention more specifically relates to methods and apparatuses for reducing and preventing confusion when information elements are inserted in displayed array of information elements.

2. Description of the Related Art

Axes of documents present documents thereon in a predetermined fashion. They are displayed on the axis in a collated manner; that is, they are sorted on an axis in a specific order, often chronological. Moreover, documents displayed on these axes share one or more attributes. The attribute is a certain descriptive element ascribed to a document by a user.

A document can have one or more attributes. For example, one's picture taken on a vacation trip to Mexico can have the following attributes: "Mexico 2012 trip," "Mary and the dog on the beach," and "June 2012 cocktail party." The picture, therefore, was taken during someone's trip to Mexico, which took place sometimes in June of 2012. Moreover, this picture is one where Mary, the protagonist of the picture, is with her dog on the beach.

The number of documents displayed on an axis varies. The length of the axes upon which these documents are displayed fluctuates as well in dependence of the number of documents they contain. Given their nature and purpose to graphically display the documents of which they are composed, axes' actual lengths differ in dependence of the number of documents they have. Some axes might have as little as one document, while others might contain more.

Axes are visible on a display area, for example, a computer screen. The display area can reveal more than one axis at a time. Some axis, with a small number of documents, can be fully displayed on the display area, as their lengths are relatively short and can easily fit within the frame of the display area. Others, however, which have a relatively high number of documents, cannot be fully shown on the display area and, therefore, are partially visible on a display area. The viewer, consequently, can access the non-displayed documents of the axes by scrolling to the right or to the left of the display area in dependence of the location of the document(s) searched.

Changes made to documents in an axis can drastically change the location of the documents on the respective axis. For example, if a certain axis contains "10" documents, and if "20" more of such similar documents are added to the respective axis within a small time frame (a few seconds), the initial "10" documents which were present on the axis can either be dislocated to the right or the left sides of the axis so that the other "20" documents can now be aligned on the axis. The axis becomes larger as a result of this very addition of documents.

Similarly, documents can also be removed from a certain axis. If the initial number of documents on an axis were "30" and if "20" documents were simultaneously removed from the axis, the remaining "10" documents would be subject to an automatic movement towards the center of the axis.

Documents are added on an axis when they receive one attribute that defines the rest of the documents on that respective axis. Documents are removed or, consequently, deleted from an axis when they are no longer defined by the attribute that once linked them to that respective axis.

The addition and the removal of documents on an axis are less significant to the viewer when the specific axis is not visible on the display area. Stating differently, if someone were to look at an axis containing five documents sharing the common attribute "higher education in Canada" (the five documents being all displayed on the display area), s/he would not notice any changes on the visual display if "20" other documents were simultaneously being added to two other axes nonvisible on the display area. This scenario, however, would not apply if the same "20" documents were being added to the axis with the five documents on "higher education in Canada". The viewer would notice the graphical enlargement of the axis displayed on the screen as a result of this addition. Moreover, the initial five documents on the axis would be consequently displaced either to the right or left of the axis to provide the necessary space for the new documents' addition.

Changes in the number of documents present on an axis are, therefore, more significant to the viewer when the axis is visible on the display area. By significant, one refers to the effects these changes can have on the viewer(s). Document displacements on the display area can lead to various undesirable consequences to the viewer, such as loss of focus on a document(s); occurrence of at least one unintended error in the viewing, modification and/or management of a document(s); possible disorientation, perplexity and/or puzzlement of the viewer caused by the change in the layout of document(s); and unforeseen and unintended dissatisfaction and frustration of the viewer. These are mere examples, and do not embody the total number of possible outcomes that might arise as a result of document displacements and/or axes dislocations on the display area.

Documents' dislocations on axes may cause the axes to displace. Stated differently, axes to which documents were inserted and/or removed may move themselves to the right or to the left of the display area in order to adjust to the updated number of documents they contain. This phenomenon, also, can cause unwanted consequences on the viewer, some of which were listed above.

A user can manage one's own documents. In other words, one can add and/or remove documents from an axis. This axis may or not be visible on the display area. Its visibility on the display area is caused by the user's exploration of one or more of its documents on the display area.

Moreover, a user can manage attributes associated with these respective documents. When the managing of attributes by the user does occur, significant changes in the way documents are sorted, and, therefore, listed on an axis can occur. Documents on an axis may be dislocated to the right or to the left of the axis.

Needless to say, there is a positive correlation between the number of documents added and/or removed on a certain axis and the potential undesirable impact these changes have on the user. The greater is the number of documents that are added or removed from an axis, the greater is the impact on the layout and the graphical display of the documents on this axis.

More than one user can manage and share documents on a specific axis at a given time. By "sharing," on refers to the act of holding the right to assign and/or remove attributes to documents. For example, a first user can manage one's attributes. However, the association and/or disassociation of attributes will affect another user. Needless to explain, the impact of these changes can be significant, especially when the other user views on the display area an axis or several axes presenting documents associated with the attributes subjected to simultaneous changes by another user.

Documents can modify their location on the axes in a precipitous manner and without prior warning. This increases the likelihood of confusion and frustration caused to the viewer of these axes, both most likely arising from the potential unintended error(s) one can commit as a result of these sudden changes on the axes.

It is therefore highly desirable to have a mechanism preventing or reducing confusion and frustration caused by the addition and/or removal of documents from displayed axes.

It is also desirable to orderly present the changes on the axes visible on the display area, in order to help the viewer understand the changes that are taken place.

It is yet desirable to display warnings of the changes that are occurring on the axes as a result of the addition and/or removal of the documents and to offer the viewer of the display area choices of actions matching one's needs.

It is desirable, also, to inform the viewer of the number and identity of the user(s) who have added and/or removed documents on the displayed axes.

Moreover, it is also necessary to have a system that would analyze and assess the viewer's behavior in respect to the display area in order to decide the best action(s) to be undertaken in terms of the location where a document or documents may be best added and/or removed on axis shown on the display area so that its/their insertion and/or removal would cause little or no undesirable effects on the viewer.

It is equally desirable to offer the viewer the proper means to control and manage the number of, and time when, at least modifications to documents viewable in the display area can take place.

Other deficiencies will become apparent to one skilled in the art to which the invention pertains in view of the following summary and detailed description with its appended figures.

SUMMARY OF THE INVENTION

One aspect of the present invention aims to alleviate one or more of the shortcomings of the background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention is generally described as a method, a system, a device and/or a graphical user interface used to represent multiple computer files, documents, or other data on axes in an axis-based graphical user interface (GUI).

Aspects of our work provide a method and system preventing and reducing viewer's confusion and potential errors the viewer might commit when documents are added or removed from displayed axes. The system allows the viewer to efficiently navigate the documents on axes present on the display area, or a portion thereof, when additional documents are being added and/or removed on the displayed axes simultaneously and/or at later time. This is made possible by the indications provided by the system concerning these modifications and by the means to manage these modifications accordingly, in accordance with at least one embodiment.

One aspect of the instant invention provides a method, an apparatus and a graphical user interface adapted to present arrays of documents as a single axis, row, or column or a plurality thereof, and in which the distribution of documents is graphically affected by the addition and/or the removal of other documents therefrom. The respective method, apparatus and graphical user interface allow for a smooth transition from the original graphical layout of documents to the final one, caused by the addition and/or removal of documents therefrom, in accordance with at least one embodiment.

Another aspect of the invention provides a method and a system intended for the user to be warned and, consequently, offered choices of action in light of the addition and/or removal of documents on the displayed axes, in accordance with at least one embodiment.

Another aspect of the invention offers a method and a system where the displayed longitudinal side of the axis wider to the pointing device remains motionless on the screen and the opposite longitudinal side of the axis adjusts to make room for the new documents to be displayed or removed from an axis, in accordance with at least one embodiment.

Another aspect of the invention presents a method, a system and a graphical user interface where the displayed longitudinal side of the axis in respect with the insertion location remains fixed on the screen while its opposite side adjusts to make room for new documents to be displayed and/or removed on the axis, in accordance with at least one embodiment.

The present invention provides a mechanism adapted to prevent a viewer of displayed documents from being confused by the modifications caused to the documents by another user. Given that these modifications are not performed by the viewer, the latter may find them confusing, especially when documents' presence (and lack thereof) and location on a specific axis are being subject to constant and impromptu changes, in accordance with at least one embodiment.

In one aspect of the invention, the user can decide a fixed and/or maximum space one would allow for supplementary documents to be added and/or removed from a specific axis shown on the display area, in accordance with at least one embodiment.

A further aspect of the instant invention provides a functionality adapted to move and or/remove documents shared by another user immediately and/or after a predetermined delay, in accordance with at least one embodiment.

Another aspect of the present invention provides a functionality adapted to display the added and/or removed documents in an expanded or contracted manner, and/or or within a fixed set space, dictated or not by the viewer, in accordance with at least one embodiment.

In one other aspect of the instant invention, a mechanism is provided to identify the documents that have been added and/or removed from a specific axis as a result of the actions of another user(s), in accordance with at least one embodiment.

One aspect of the invention provides a method of managing elements in a collation unit of an axis of elements, the method comprising displaying a plurality of elements along the axis of elements, the elements being displayed in a substantially rectilinear arrangement on a display on a basis of a collation function, the elements being displayed in collation units along the axis of elements, each collation unit including a receiving space thereof along a longitudinal length of the axis of elements, the elements displayed in a collation unit being displayed with a first layout until the number of elements to be displayed in the collation unit exceeds a maximum number of elements displayable with the first layout, the elements displayed in the collation unit being displayed with a second layout when the number of elements to be displayed in the collation unit exceeds the number of elements displayable with the first layout.

One other aspect of the invention provides a non-transitory computer-readable medium having stored thereon computer-readable instructions that, when executed by a computer, cause the computer to perform operations for managing elements in a collation unit of an axis of elements, the operations comprising: displaying a plurality of elements along the axis of elements, the elements being displayed in a substantially rectilinear arrangement on a display on a basis of a collation function, the elements being displayed in collation units along the axis of elements, each collation unit including a receiving space thereof along a longitudinal length of the axis of elements, the elements displayed in a collation unit being displayed with a first layout until the number of elements to be displayed in the collation unit exceeds a maximum number of elements displayable with the first layout, the elements displayed in the collation unit being displayed with a second layout when the number of elements to be displayed in the collation unit exceeds the number of elements displayable with the first layout.

An aspect of the present invention provides a device, comprising a processor configured to present a graphical user interface for displaying and managing elements in a collation unit of an axis of elements, the graphical interface comprising areas adapted to provides the operations comprising: displaying a plurality of elements along the axis of elements, the elements being displayed in a substantially rectilinear arrangement on a display on a basis of a collation function, the elements being displayed in collation units along the axis of elements, each collation unit including a receiving space thereof along a longitudinal length of the axis of elements, the elements displayed in a collation unit being displayed with a first layout until the number of elements to be displayed in the collation unit exceeds a maximum number of elements displayable with the first layout, the elements displayed in the collation unit being displayed with a second layout when the number of elements to be displayed in the collation unit exceeds the number of elements displayable with the first layout.

Each of the embodiments of the present invention has at least one of the above-mentioned objects and/or aspects, but does not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

FIG. 6 is a schematic illustration of an exemplary axis layout;

FIG. 7 is a schematic illustration of a linear and non-linear axis configurations;

FIG. 8 is a schematic illustration of an exemplary axis layout in accordance with an embodiment of the present invention;

FIG. 9 is a schematic illustration of an exemplary axis layout in accordance with an embodiment of the present invention;

FIG. 10 is a schematic illustration of an exemplary axis layout with three display areas thereon in accordance with an embodiment of the present invention;

FIG. 11 is a schematic illustration of a magnified display area partially showing an exemplary axis layout in accordance with an embodiment of the present invention;

FIG. 12 is a schematic illustration of a magnified display area partially showing an exemplary axis layout in accordance with an embodiment of the present invention;

FIG. 13 is a schematic illustration of a magnified display area partially showing an exemplary axis layout in accordance with an embodiment of the present invention;

FIG. 14 is a schematic illustration of a magnified display area partially showing an exemplary axis layout in accordance with an embodiment of the present invention;

FIG. 15 is a schematic illustration of a magnified display area partially showing an exemplary axis layout in accordance with an embodiment of the present invention;

FIG. 16 is a schematic illustration of a magnified display area partially showing an exemplary axis layout in accordance with an embodiment of the present invention;

FIG. 17 is a schematic illustration of a magnified display area partially showing an exemplary axis layout in accordance with an embodiment of the present invention;

FIG. 18 is a schematic illustration of a magnified display area partially showing an exemplary axis layout in accordance with an embodiment of the present invention;

FIG. 19 is a schematic illustration of a magnified display area partially showing an exemplary axis layout in accordance with an embodiment of the present invention;

FIG. 20 is a schematic illustration of a magnified display area partially showing an exemplary axis layout in accordance with an embodiment of the present invention;

FIG. 21 is a schematic illustration of a magnified display area partially showing an exemplary axis layout in accordance with an embodiment of the present invention;

FIG. 22 is a schematic illustration of a magnified display area partially showing an exemplary axis layout in accordance with an embodiment of the present invention;

FIG. 24 is a schematic illustration of a magnified display area partially showing an exemplary axis layout in accordance with an embodiment of the present invention;

FIG. 25 is a schematic illustration of a magnified display area partially showing an exemplary axis layout in accordance with an embodiment of the present invention;

FIG. 31 is a schematic illustration of an exemplary linear axis layout in accordance with an embodiment of the present invention;

FIG. 32 is a schematic illustration of an exemplary linear axis layout in accordance with an embodiment of the present invention;

DESCRIPTION OF EMBODIMENT(S) OF THE INVENTION

Our work is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate describing the present invention.

The features provided in this specification mainly but might not exclusively relate to principles of computer software and machine-readable code/instructions adapted to instruct a computer, many computers or other machines adapted to use the instructions to provide material effects on a display, or other means enabling human-computer interactions to manage documents, menus, user-selectable elements and other computer files. These code/instructions are preferably stored on a machine-readable medium to be read and acted upon with a computer or machine having the appropriate code/instructions reading capability.

Figure 1:
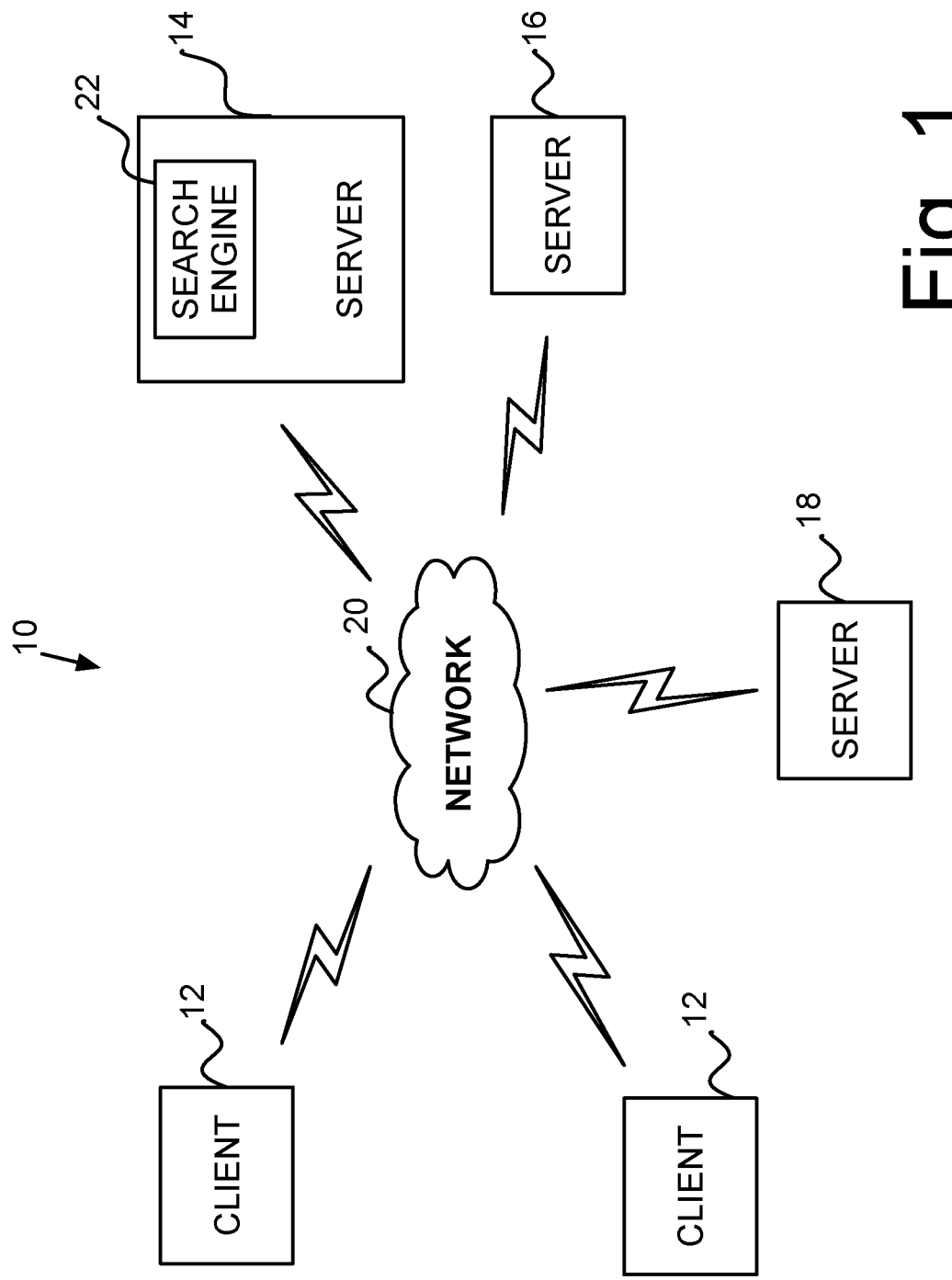
FIG. 1 is a schematic illustration of an exemplary network.

FIG. 1 illustrates an exemplary network 10 in which a system and a method, consistent with the present invention, may be implemented. The network 10 may include multiple client devices 12 connected to multiple servers 14, 16, 18 via a network 20. The network 20 may include a local area network (LAN), a wide area network (WAN), a phone network, such as the Public Switched Phone Network (PSTN), an intranet, the Internet, Wi-Fi, WiMAX or a combination thereof. Two client devices 12 and three servers 14, 16, 18 have been illustrated as connected to network 20 for simplicity. In practice, there may be more or less client devices and servers 14, 16, 18. Also, in some instances, a client 12 device may perform the functions of a server 14, 16, 18 and a server 14, 16, 18 may perform the functions of a client 12 device.

The client devices 12 may include devices such as mainframes, minicomputers, personal computers, laptops, personal digital assistants, phones, or the like, capable of connecting to the network 20. The client devices 12 may transmit data over the network 20 or receive data from the network 20 via a wired, wireless, or optical connection.

The servers 14-18 may include one or more types of computer systems, such as a mainframe, minicomputer, or personal computer, capable of connecting to the network 20 to enable servers 14-18 to communicate with the client devices 12. In alternative implementations, the servers 14-18 may include mechanisms for directly connecting to one or more client devices 12. The servers 14-18 may transmit data over the network 20 or receive data from the network 20 via a wired, wireless, or optical connection.

In an implementation consistent with the present invention illustratively embodied herein, the servers 14-18 may include a search engine 22 usable by the client devices 12. The servers 14-18 may store documents 200, such as web pages, accessible by the client devices 12.

Figure 2:
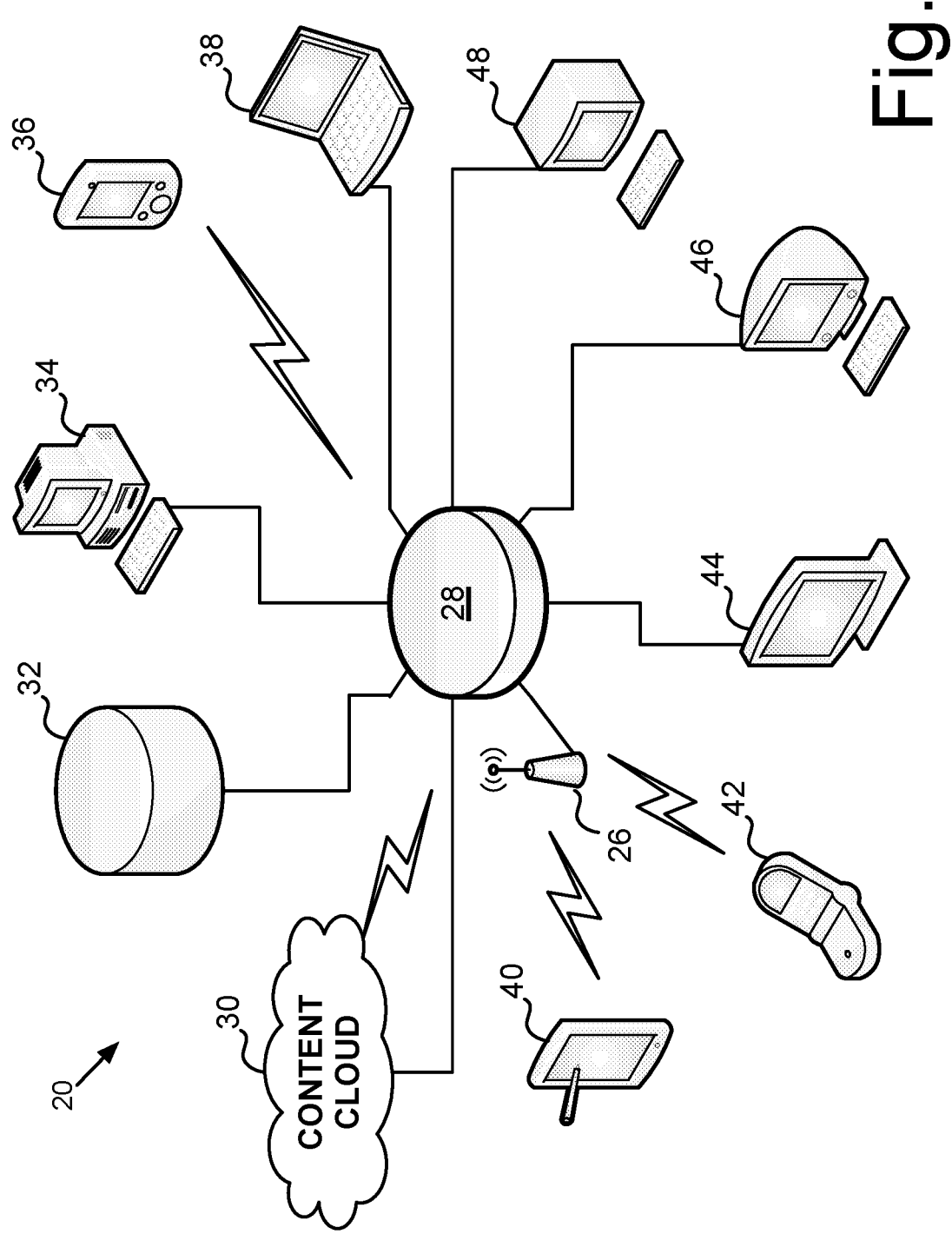
FIG. 2 is a schematic illustration of an alternate exemplary network.

With reference to FIG. 2, a network 20 includes the content cloud 30, a content database 32, content devices 34-38, and other devices 40-48. The network mediator 28 enables network devices 34-48 to communicate with each other without pre-configuring each device 34-48. The content cloud 30 represents a content source such as the Internet, where content exists at various locations across the globe that could be reached through a wired connection and/or with a wireless connection provided by an antenna 26. The content includes multimedia content such as audio and video. The mediator 28 allows the content cloud to provide content to devices 34-48. The database 32 is a storage device 166 that maintains content. The database 32 may be a standalone device on an external communication network. The mediator 28 communicates with the database 32 to access and retrieve content. The content devices 34-48 include intelligent devices, such as, for example, personal computers, laptops, cell phones and personal digital assistants. The content devices 34-48 are capable or storing content data. The devices 34-48 are intelligent devices that receive content from other content devices 30-48. However, the devices 34-48 can also operate as servers to distribute content to other client devices if desirable.

The following discussion provides a brief, general description of an exemplary computer apparatus in which at least some aspects of the present invention may be implemented. The present invention will be described in the general context of computer-executable instructions, such as program modules 174 being executed by a computerized device. However, methods of the present invention may be affected by other apparatuses. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be implemented with other configurations, including hand-held devices, multiprocessor system, microprocessor-based or programmable consumer electronics, network computers, minicomputers, set top boxes, mainframe computers, gaming consoles and the like. At least some aspects of the present invention may also be carried out in distributed computing environments where tasks are performed by remote processing devices linked through a communications network as exemplified in FIG. 2. In a distributed computing environment, program modules 174 may be located in local and/or remote memory storage devices 166.

Figure 3:
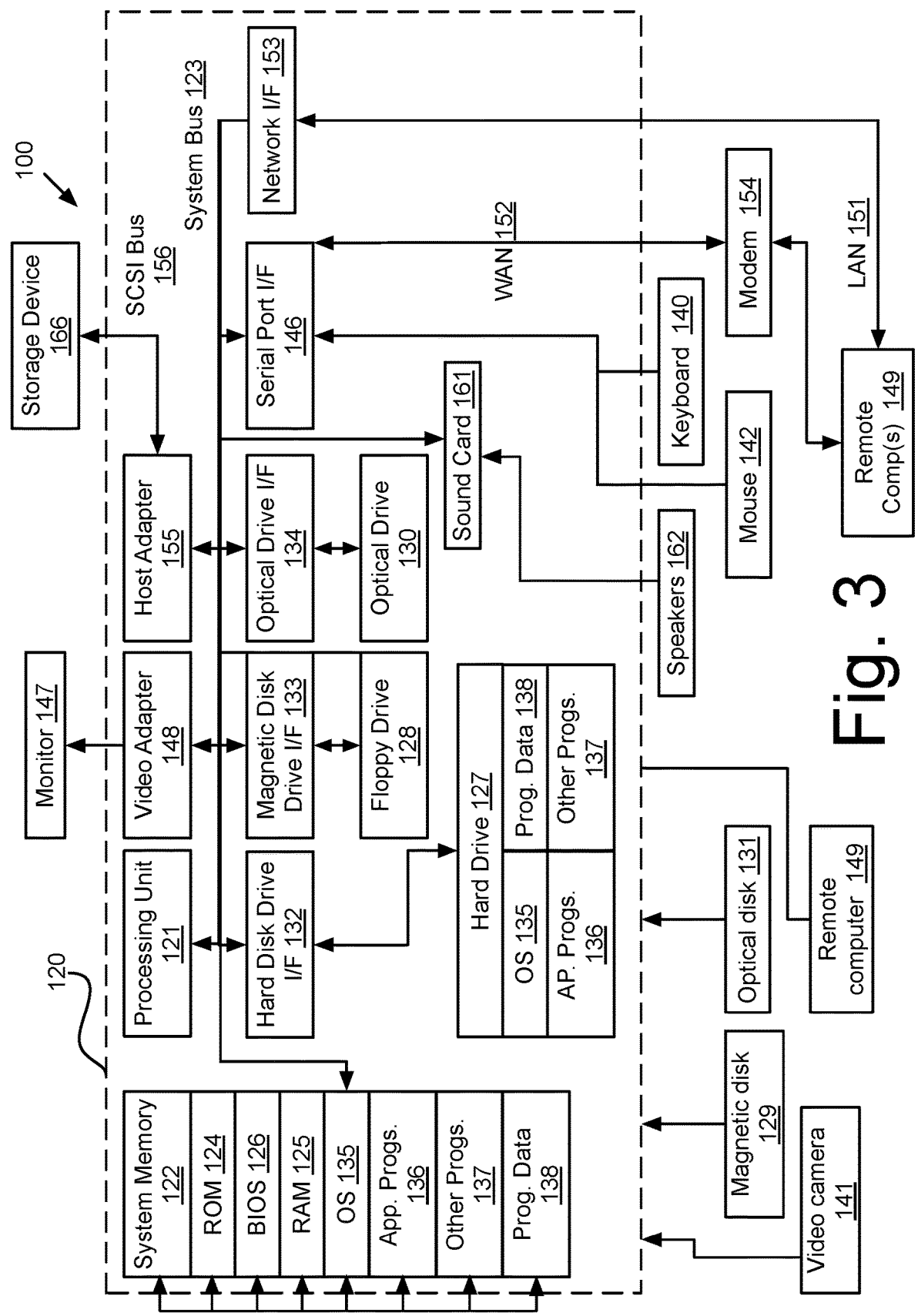
FIG. 3 is a schematic illustration of an exemplary computer system.

With reference to FIG. 3, an exemplary apparatus 100 for implementing at least some aspects of the present invention includes a general-purpose computing device in the form of a computer 120 or in the form of a computerized portable apparatus. The computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer data between elements within the computer 120, such as during start-up, may be stored in ROM 124. The computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine-readable instructions, data structures, program modules 174 and other data for the computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), remote cloud storage and the like, may be used instead of, or in addition to, the storage devices 166 introduced above.

A number of program modules 174 may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as Alice™, which is a research system developed by the User Interface Group at Carnegie Mellon University available at www.Alice.org, OpenGL® from Silicon Graphics Inc. of Mountain View Calif., or Direct 3D from Microsoft Corp. of Bellevue Wash.), and/or program data 138 for example.

A user may enter commands and data into the computer 120 through input devices, such as a keyboard 140, a camera 141 and a pointing device 142 Other input devices (not shown) such as a microphone, joystick, game pad, satellite dish, scanner, a touch sensitive screen, accelerometers or a motion-sensor detector such as KINECT™ that are adapted to sense movements of the user or movements of a device, or the like, may also be included. These and other input devices are often connected to the processing unit 121 through a serial port interface 146 coupled to the system bus 123. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device 150 may also be connected to the system bus 123 via an interface, such as a video adapter 148 for example. The video adapter 148 may include a graphics accelerator. One or more speakers 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the computer 120 may include other peripheral output devices (not shown), such as a printer, a hi-definition television and a scanner for example. As an alternative or an addition to the video monitor 147, a stereo video output device, such as a head mounted display or LCD shutter glasses for example, could be used.

The computer 120 may operate in a networked environment defining logical connections to one or more remote computers 120, such as a remote computer 149. The remote computer 149 may be another computer 120, a server 14-18, a router, a network PC, a peer device or other common network node, and may include many or all of the elements described above relative to the computer 120. The logical connections depicted in FIG. 3 include a local area network (LAN) 151 and a wide area network (WAN) 152, an intranet and the Internet.

When used in a LAN, the computer 120 may be connected to the LAN 151 through a network interface adapter (or "NIC") 153. When used in a WAN, such as the Internet, the computer 120 may include a modem 154 or other means for establishing communications over the wide area network 152 (e.g. Wi-Fi, WinMax). The modem 154, which may be internal or external, may be connected to the system bus 123 via the serial port interface 146 or another type of port interface. In a networked environment, at least some of the program modules depicted relative to the computer 120 may be stored in the remote memory storage device 166. The network connections shown are exemplary and other means of establishing a communications link between the computers 120 may be used.

Figure 4:
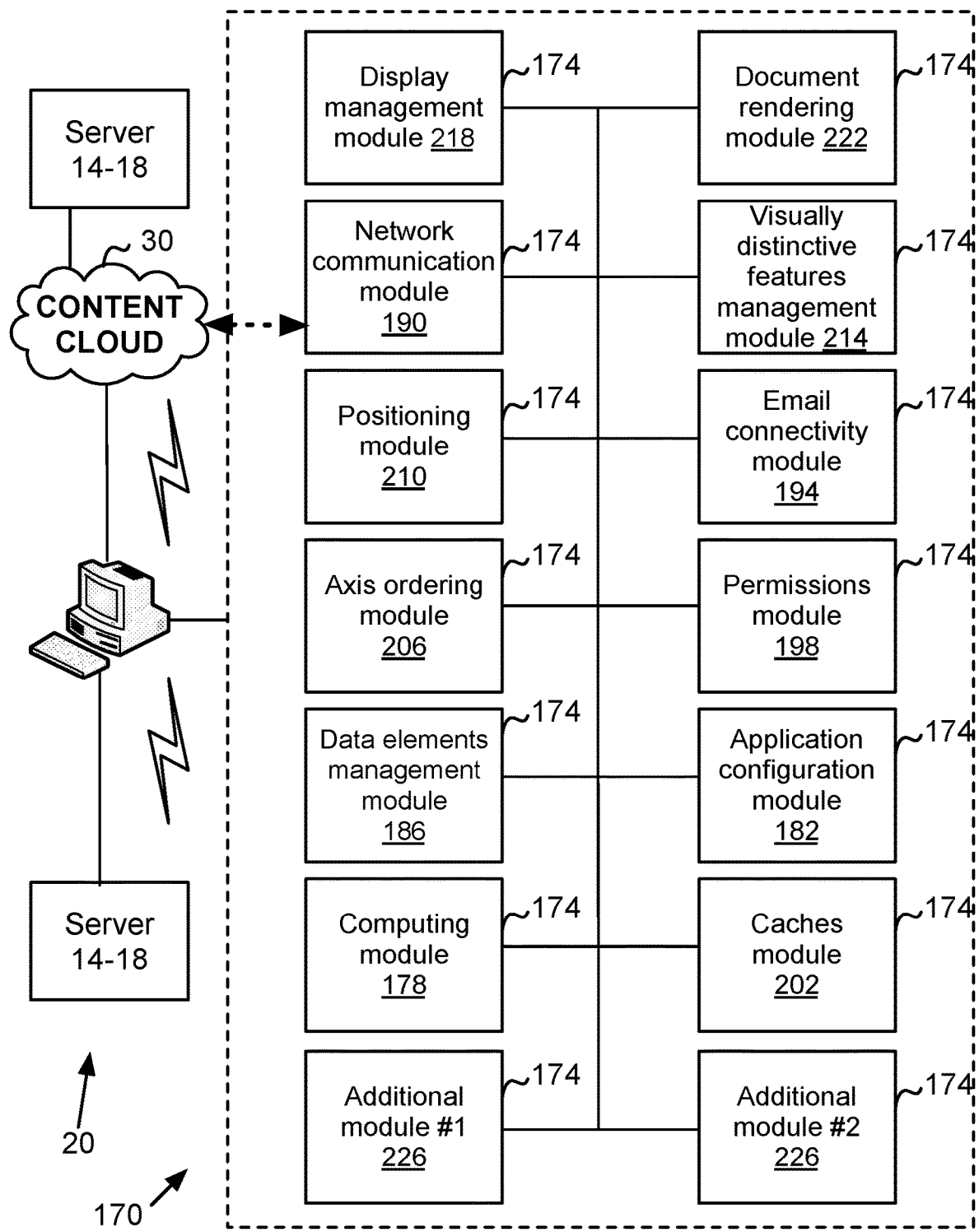
FIG. 4 is a schematic illustration of an exemplary software system.

The exemplary network and the exemplary computer system described above are adapted to carry on the following embodiments:

A system 170 is depicted in FIG. 4 which may represent the functionalities described in the instant application when run on an apparatus 100, for instance a computer 120, such as has been previously described. The computer 120 may in turn be connected to a server 14-18 comprising a set of program modules 174 enabling functions including but not limited to: computing, document rendering, network communication, application configuration and local database management.

The software system 170 illustratively consists of a collection of at least twelve modules 174 independent from those of the server 14-18 that together carry out the method required for the functionalities to be visible on a graphical user interface and usable by the user. As illustrated, additional modules 226 may also be used in conjunction with the twelve base modules.

A computing module 178 provides a means to circulate data between users, the other modules 174 and the apparatus 100. The computing module 178 is adapted to convert queries 230, which may be system-based or user-based, into graphical rendering in accordance with at least one embodiment of the present invention. The other modules 174 are configured to send to and receive data from the computing module and to individually or collectively interact with other modules 174.

An application configuration module 182 provides software configuration to manage application settings and open connections to other servers 14-18. Other modules 174 may use the application configuration module 182 to manage their behavior to satisfy user-specific needs.

A data elements management module 186 may be used in conjunction with other modules to manage data elements such as documents 200 contained in a database 32 in response to a query 230. The data elements management module 186 may use any kind of database connection and may use a network communication module 190 in order to access a database 32 through a network 28, on a server computer 14-18. The network communication module 190 may use several protocols in order to communicate with a server computer 14-18, such as IPv4, IPv6, TCP, UDP, ODBC, HTTP, WebDAV, SSH, IMAP and even define its own specific communication protocol. The data elements management module 186 may also be used in conjunction with an email connectivity module 194 and network communication module 190 in order to treat and represent emails in the same way as the data elements of a database 32. The data elements management module 186 may also be used in conjunction with the permissions module 198 (on the client or server side) in order to control the user access to elements based by some sort of sharing rules. The data elements management module 186 may also work in conjunction with a caches module 202, providing client-side cached versions of the database 32 and files in order to respond to future requests faster. Modules 174 may be made to communicate information in a standardized way by the use of an Application Programming Interface (API) in order to simplify the data elements management module's 186 interactions with other modules 174.

The data elements management module 186 may sort through documents 200 stored in the database 32 and connected to each other via a variety of referencing modes, may apply a filter as specified in a query 230 and may subsequently direct the filtered documents 200 to other modules 174 (this will be shown in FIG. 6). One such module may be an axis-ordering module 206 which may distribute documents 200 filtered by the data elements management module 186 onto an axis-like array 288 or axis 292 (illustrated in FIG. 6) according to a collation function that may be user- or system-specified and analyzed by the computing module 178. An axis 292 or axis-like array 288 is an embodiment of graphical rendering of the functionalities described in the present specification on a device's display 150 that can be embodied as a substantially rectilinear sequence of documents 200 from which a viewer can infer meaning and/or relationships therebetween. An axial distribution 292 of documents 200 is adapted to accommodate and display a single type of documents 200 or, if desirable, more than one type of documents 200, computer files, multimedia contents, user-selectable elements and/or user-selectable menu elements. Generally, an axis 292 is used to graphically group information elements 200 having a commonality. Other functionalities related to axes 292 shall be described in greater detail below.

The axis-ordering module 206 may manage the ordering of single documents 200 and/or several documents 200 assembled into document sets 220 onto one or more axes 292. In addition of managing the collation of documents 200 onto an axis 292, the axis-ordering module 206 may also manage the order of the documents 200 contained within secondary documents sets 232 (not illustrated). The positioning module 210 manages the positioning of documents 200 within axes 240 based on interactions with other modules 174 processing the various elements contained in a query 230. The positioning module 210 is adapted to and may interpret data contained in document sets 228 generated by the data elements management module 186 in relationship to the query 230 to identify a location for a given document set 228 within the collation of an axis 292. Likewise, a visually distinctive features management module 214 is adapted to interpret data contained in documents 200 or document sets 228 generated by the data elements management module 186 in relationship to the query 230 to selectively apply one or more visually distinctive features 284 (not illustrated in this figure) to single documents 200 or document sets 228. Finally, a display management module 218 may, inter alia, manage elements related to the user interface 234, possibly interacting with a graphics card and a monitor 147. The display management module 218 may use a document-rendering module 222 that provides instructions to render specific documents 200, like images, text files, word-processing files, spreadsheet files, presentation files, etc. The document-rendering module 222 may also provide an API to let developers add their own extensions to deliver to renderers other document types.

Figure 5:
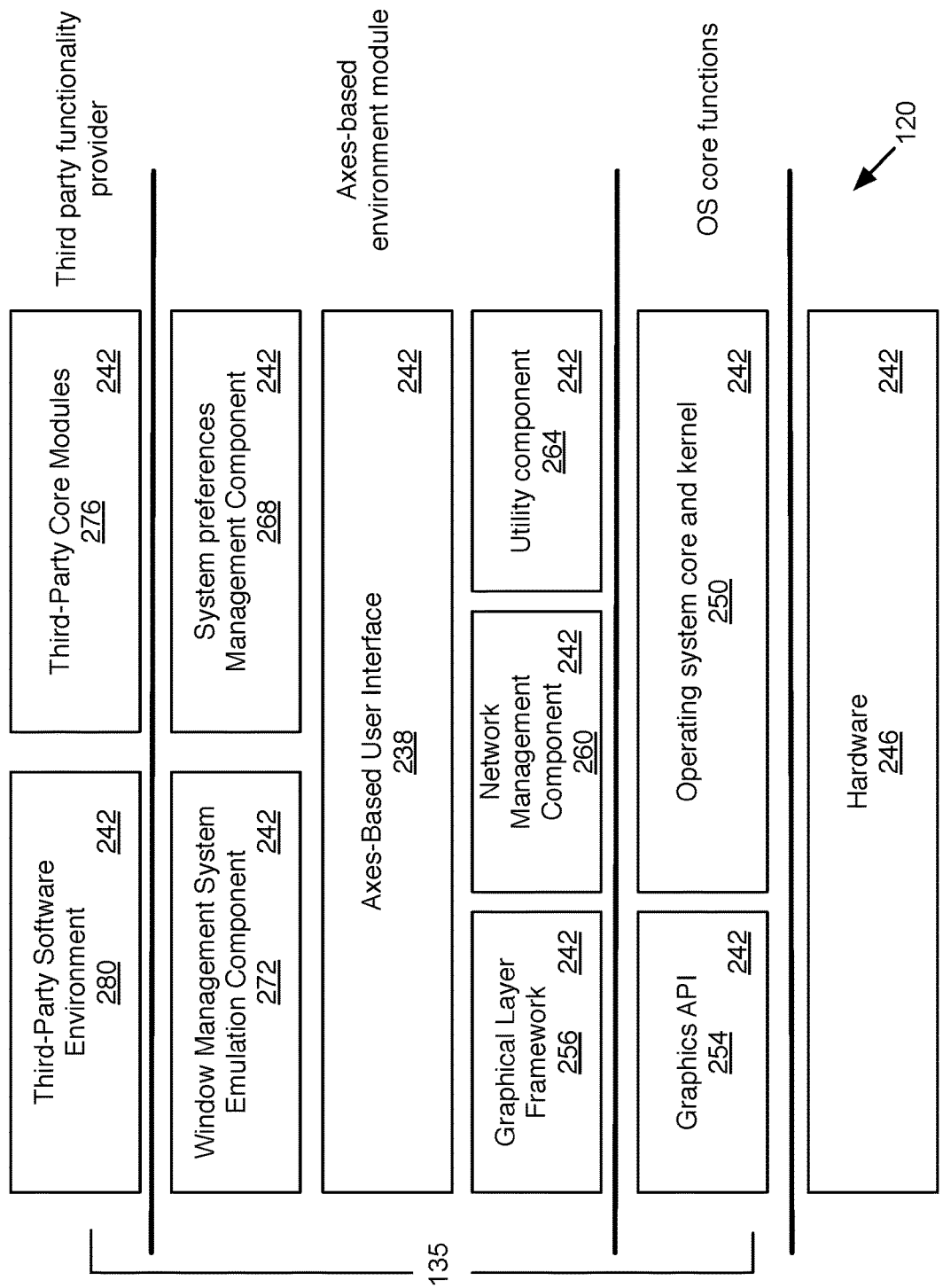
FIG. 5 is a schematic illustration of an axis-based interface and operating system.

FIG. 5 depicts a computer system 120 comprising an operating system 135 with an integrated axis-based user interface 238. As illustrated in FIG. 5, the axis-based user interface 238 could serve as a desktop environment to manipulate documents 200 (such as files, objects and applications), or could be used as a main operating system 135 user interface 234. One can appreciate a hierarchical description of a computer system 120 and software system 170 with multiple components 242. First, hardware 246 is used to provide users with a physical device 34-48. Second, the axis-based system could be built on top of an existing operating system core and kernel 250, such as, for instance, Unix™ or BSD™. A graphics API 254 like OpenGL® could also be used in order to provide basic graphical capabilities to the system via a video adapter 148.

Multiple core functionalities could be integrated to provide core operating system 135 services. A graphical layer framework component 256 could be built over the graphics API component 254, and could be used to provide complex drawing capabilities. The layer-based graphics layer framework component 256 may also support widget rendering and handling (like buttons, text fields, dialogs, etc.) A network management component 260 could be based on pre-existing network management capabilities in the operating system core and kernel 250. It could serve as a tool to manage an Internet network connection through Ethernet, Bluetooth, Wi-Fi, Modem and other communication channels. A utility component 264 could handle all the other services needed to communicate with the operating system core and kernel 250, providing functionalities such as user login, user authentication, memory, disk-access management, etc. Using these modules, the axis-based user interface 238 would use core functionalities from the graphical layer framework component 256, the network management component 260 and the utility component 264 to provide workspaces 306 comprising multiple axes 292 that display documents 200 (not shown in FIG. 5). The axis-based user interface 238 may also provide more integrated actions, like interface buttons, preview or magnification that may be directly docketed. Another component, a system preferences management component 268 would provide multiple functions needed by the axis-based user interface 238, such as dialogs to manage document insertion, attribute definitions, users, permissions, application configuration, etc. Finally, the operating system 135 may comprise a window management system emulation module 272. This module may be based on an X Window System or X11© and may use other existing client application libraries to provide a large number of applications as well as functionalities to run windowed applications on top of the axis-based user interface 238. To provide other functionalities, third-party application providers could build third-party core modules 276 on top of the axis-based user interface 238 and system preferences management module 268. Third-party application providers could also develop third-party software environments 280 and other applications that could be run using the window management system emulation 272, providing the user with useful applications such as an Internet Browser, Office Business Applications, Multimedia Applications, Games, etc.

The Window Management System Emulation 272 could also offer functions to provide a more axis-based user interface 238 integration, such as, previews, player and editors for the documents 200 displayed in the axis-based user interface 238. For example, a rich text document 200 could use a third-party module 276 or third-party software environment 280 to provide a previewer or media player for the document 200, or a third-party application to integrate a live editor on the axis-based user interface 238.

This computer system 120 could be used, for instance, as a business solution to provide users with an axis-based user interface 238 operating system 135 directly on multiple kinds of devices 34-48 (computers, laptop, tablets, cell phones, etc.). The computer system 120 may also illustratively be used as a business solution to sell preconfigured devices 34-48 with the axis-based user interface 284. Since the operating system 135 has a built-in axis-based user interface 284, the device 34-48 is likely to have a display 150 and other input device like a keyboard 140, a mouse 142 or a touch-screen interface. The devices 34-48 may not necessarily provide such parts and may be adapted to be used by communicating information about the user interface 240 and input methods with other devices 34-48 (television set, motion sensing input device, computer or tablet over network, cell phone, etc.)

FIG. 6 illustrates the interaction of the computer system 120 and software system 170 with an axis-based graphical user interface 238. An interface program providing a graphical user interface 234 for managing information elements 200 in accordance with an embodiment of the invention is installed on a machine, e.g. a computer system 120 as illustrated in FIG. 3. The interface 234 can be programmed using various programming languages e.g. C++, Java or other suitable programming languages. The programming of these languages is well known in the art and is adapted to be stored on a machine-readable medium and readable therefrom to provide executable instructions to a hardware system. It is believed that a skilled reader in software art is going to recognize this portion of the system that will, therefore, not be further described herein.

The graphical user interface 234 may run through the operating system 135 and the hardware 246 of the computer system 120 or, alternatively, through a network-based system e.g. client-server, and/cloud computing system as exemplified in FIG. 1 and FIG. 2. The interface 234 is adapted to display and manage information elements 200, generally provided on a basis of a query 230, which may be stored in one or many databases 32 (as illustrated in FIG. 6) that might be distributed in a combination of locations (e.g. multiple databases, web, cloud, etc.). Information elements 200 may include computer files, pictures, multimedia content, applications (i.e. computer programs), menu elements, sets of icons and/or other user-selectable elements, all of which shall henceforth be indiscriminately referred to as documents 200 to lighten the text without limiting the scope of the present invention.

An axis-based graphical interface 238 is adapted to graphically structure documents 200 in arrays 288 that arrange the documents 200 in rows and/or columns in a reasonably regular fashion and to allow navigation thereof by the user further to a query 230. The axis-based layout and ordering provide the user with information about the content of each document 200, its meaning and its relationships to the other documents 200 disposed on the axis 292. Navigation tools are provided with the axis-based user interface 238 to allow navigation through the documents 200 of a single axis 292 and of various axes 292 when a plurality of axes 292 is enabled. The display of documents 200 on an array 288, or axis 292, therefore allows contextual management of documents 200 as a flow, or an ongoing rational sequence of documents 200. An axis-based interface 238 thus helps to intuitively display a group of documents 200 and facilitate understanding and managing large sequences of documents 200 bearing a relation.

In a simplified exemplary form, an array 288 may be embodied as an axis of documents 292 (herein below referred to as axis 292 to lighten the text), which groups documents 200 in a single row or column, as illustrated in FIG. 6. An axis 292 can be embodied as a substantially rectilinear arrangement of documents 200 adapted to dispose each document 200 on a straight or curved line. The axis 292 can be embodied as completely straight (rectilinear), slightly curved, substantially curved, circular, angled, following a particular shape or have a consistent shape over which documents 200 are disposed in a reasonably consistent fashion. The exact shape of the axis 292 as well as its disposition can vary—horizontal, vertical or other—in relation to the device's display 150. What matters, inter alia, is that the layout structure of an axis 292 provides a sequence of documents 200 from which a viewer can infer meaning, logical connections, contextual location, and/or relationships.

The axis 292 can be represented as a single axis 292, a double axis 292, or more axes 292. Axes 292 may be independent from one another (using distinct scales, or orderings, henceforth referred to as collation functions 300) or may form a group of axes 310 by sharing the same scale or collation function 300. Also, a document 200, attribute 296 or other property of an element contained in an axis 292 can be selected and used as a logical connector to create an additional axis 292 from an existing axis 292. This subsidiary axis 294 is meant to be temporary in some embodiments, serving as a way to view a specific set of additional documents 200 or highlight certain documents 200 from the original axis 292 without having to alter the entire workspace 306. It may originate from the logical connector document 200 or information element 200 and be disposed in non-parallel fashion thereto. The subsidiary axis's 294 position is preferably orthogonal to the original axis 292. However, the angle may vary. Like axes 292, logically connected axes 294 may be scrollable. More such logically connected axes 2924 can subsequently be created in the same fashion. Navigation among axes 292 and subsidiary axes 294 could be called "relational navigation".

Axes 292 may be disposed horizontally and/or vertically. Groups of axes 310 may be presented using one of the layouts or combining both. The axes 292 presented in the embodiments below are generally illustrated in the horizontal layout configuration. However, they could, all or in majority, be disposed vertically without departing from the scope of the present disclosure. Other possible graphical layouts of documents 200 might become obvious to a skilled reader in light of the present application and would be considered within the scope of this application.

When only a portion of the axis 292 is visible, a play of zoom, pan and scrolling movements along the axis 292 allows a user to navigate the axis 292 and change the series of documents 200 that are displayed in the display area 314 of the display 150. Scrolling movements can be performed in a variety of ways including but not limited to click-and-drag, pressing on the keys of a keyboard, gesturing to a motion-sensor or on a touch-screen.

Documents 200 might overlap or decrease in size so as to fit or maximize the space available in the display area 314. Selected documents 200 on an axis 292 can be magnified to increase the level of detail shown. Similarly, a small display area 314 could display only one document 200 out of the entire axis 292. The remaining documents 200 would not be shown in the display area 314 but would yet remain at their respective "virtual" position on the axis 292, ready to be displayed upon scrolling the axis 292. In other words, if we consider a mobile platform like a mobile phone having a small display 150, the small display 150 might only allow to efficiently exhibit one document 200 at a time. However, given that the displayed document 200 is part of an axis 292, the other documents 200 on the axis 292 would remain displayable in accordance with their respective position on the axis 292 when the axis is scrolled, navigated, gestured.

The documents 200 are selected to be disposed on the axis 292 on the basis of one or more attributes 296, and are ordered thereon according to a collation function 300, namely an ordered arrangement made by comparison, (e.g. a chronological order adapted to use a time scale 318. The attribute(s) and collation function parameters are specified in a query 230 that may be run by a user or by an automated function of the system. Indeed, each axis 292 groups documents 200 in accordance with, for example, a selected tag, category, keyword, document creator, or other attribute 296 that expresses a characterization of one or more document(s) 200 and that are configurable to represent intrinsic or extrinsic characteristics. The term "attribute" 296 will generally be used throughout the instant specification to lighten the reading of the text and will encompass other document properties or means for establishing commonality or relationships as described above unless otherwise specified.

Attributes 296 may be user-specified or system-specified. Generally, documents 200 bear a plurality of attributes 296 assigned by one or more user(s) (e.g. keyword, subject, project, creator, category, etc.), and a plurality of attributes 296 that are assigned by the system, such as, illustratively, file type, time of creation, number of views, time of last modification, file size, etc. Given the broad range of applicability of the present invention, the attributes 296 that may be assigned by the system and user, as well as the attributes 296 that can be desirable to use in the management of axes 292 might substantially vary from one field or user to another and however remain within the scope of present specification.

The selection of one or more attributes 296 (using Boolean logic for instance) in a query 230 determines which documents 200 will be displayed on the axis 292. If no specific attribute 296 is selected, the axis 292 will display all documents 200 in a default order, like the date of creation thereof. Thus, all documents 200 on the same axis 292 are normally associated with the selected set or combination of attributes 296 that are used as parameters for the axis 292. Third-party data, like publicity or user-targeted information, could also be added to an axis 292, either arbitrarily or according to user information, filtering and/or existing collation of axes 292 without departing from the scope of the present invention.

The documents 200 illustrated in FIG. 6 feature attributes 296 individually represented by a capital letter thereon, or none, in which case the documents 200 are left blank. Letter attributes 296 are used in the present application for illustrative purposes only while letter attributes are theoretically possible. More descriptive attributes 296 such as those described above are used in embodiments of the present invention. As is shown in FIG. 6, any document 200 can simultaneously feature multiple attributes 296, some user-specified and others system-specified. In fact, a preferred embodiment of the invention assigns a plurality of attributes 296 to every document 200. Other documents 200 illustrated on FIG. 6 are blank, or without any associated attribute 296, illustrating documents that could theoretically not be assigned any attribute 296, but that could nonetheless be created and found in a query 230 (e.g. a query 230 that would select all documents 200 contained in the database 32).

The query 230 in FIG. 6 here illustratively filters and selects documents 200 from the database 32 based on attribute 296 'A' for display on the axis 292. FIG. 6 further illustrates that the documents 200 selected from the database 32 by the query 230 are placed on the axis 292 in chronological order 318, another parameter that could be specified in the query 230. Indeed, an axis 292 also generally disposes the documents 200 resulting from the query 230 in accordance with a specified order or collation function 300, (e.g. chronological order, alphabetical order, statistical order, increasing file size, etc.). A collation function 300 might include dividing the axis 292 into successive collation units 304 (e.g. time units 322 in the case of a chronological order, which can illustratively be hours, days, months, years, etc.). A collation function 300 would thus dispose each document 200 along the axis 292 according to the value of a specified attribute 296 in relation to the collation units 304 of the axis 292 and the other documents 200 of the selected document set 228. Among collation functions 300, a chronological distribution of documents 200 on a time scale 318 is used in most embodiments of our work because of its intuitiveness (because any action or event takes place at a specific time and usually in sequence with other events or actions). While an axis 292 disposing documents in random fashion is also contemplated within the scope of the present specification, axes 292 disposing documents 200 according to a collation function 300 are illustrated embodiments because of the usefulness of ordering documents 200.

An axis 292 or a group of axes 310 may be embodied in a linear configuration 326 or a non-linear configuration 330. Both configurations are illustrated in FIG. 7 in a generic example. As can be appreciated from FIG. 7, a linear configuration 326 displays collation units 304 of the same graphical longitudinal size regardless of the number of documents 200 contained in each collation unit 304. The size of the documents 200 located within a given collation unit 304 can optionally be adjusted in accordance with the number of documents 200 located therein. For instance, documents 200 will be larger if there are few documents 200 in the collation unit 304 and smaller if many documents 200 are found therein. Alternatively, the documents 200 can remain the same size and can overlap, or be stacked, when their quantity exceeds the available space. Another possible way of making large numbers of documents 200 fit into a fixed-size collation unit 304 is to equip the collation unit 304 with a scroll bar allowing the user to navigate the collation unit 304 to reveal hidden documents 200. This also means that documents 200 in a linear configuration 326 may be displayed as an uneven sequence from a graphical point of view. Ultimately, a collation unit 304 in a linear configuration containing no document will appear as empty, or as a blank space on the display 150, but will still be the same size as the other collation units 304 of the axis 292.

Conversely, the non-linear configuration 330 displays collation units 304 of uneven longitudinal sizes because an even distribution of documents 200 along the axis 292 prevails over the linearity of the collation. In other words, document 200 size and a constant flow of documents 200 along the axis 292 are given primacy over having collation units 304 of equal graphical size. This provides a more efficient use of the space on the axes 292, but may provide less meaning to illustrate an evolution along time.

Conversely, the non-linear configuration 330 displays collation units 304 of uneven longitudinal sizes because an even distribution of documents 200 along the axis 292 prevails over the linearity of the collation. In other words, document 200 size and a constant flow of documents 200 along the axis 292 are given primacy over having collation units 304 of equal graphical size. This provides a more efficient use of the space on the axes 292 but may provide less meaning to illustrate an evolution along time.

FIG. 7 presents a graphical user interface 234. More specifically, it illustrates an axis-based user interface 238 with a linear axis configuration 326. The linear axis configuration 326 shows an axis-like array 288. This is an exemplary illustration of how documents 200 can be presented on a linear axis 292 within and outside of the display area 314.

Documents are not the only items one could find on an axis-like array 288. Videos, menu options, emails and numerous other types of information elements can also be displayed on an axis-like array 288. However, for the purpose of explaining and describing this invention, the Figures presented herein will only reserve to axes 292 with documents 200 only.

In the axis-like array 288, documents 200 are laid out in a linear fashion, based on the framework set out by the collation units 304. By "linear," we refer to the idea that documents 200 are arranged and extended along a straight horizontal line.

A collation unit 304 collects and combines certain elements on an axis 292. In the case of FIG. 7, the collation units 304 gather and combine documents 200 in a certain predetermined order.

The collation unit 304 is chronological in nature. That is, documents 200 are organized on the axis-like array 288 according to time units 322 (t27, t28, t29, t30 and t31) that are equally spaced. The time scale 318 specifies the division of time. For example, it can be by hour, day, month, or year.

The collation function 300 makes it possible for time units 322 to align accordingly on the axis 292 based on a certain time scale 318. Moreover, these time units 322 are moving progressively to the right. The time unit markers 334 identify the beginning and end of a time unit 322.

The collation units 304 do not have to be chronological per se. For example, they can be alphabetical as well or based on a certain feature or identity set out by the user.

Some collation units 304 contain more documents 200 than other ones. This is because on a linear axis 292, the collation units 304 are equally spaced from each other and, therefore, of the same length. As a result, it will often be the case that some collation units 304 will be empty and some—full or partially full of documents. FIG. 7 illustrates this very phenomenon. The time unit t28, for example, contains only one document 200. Time unit t29 is full, while time unit t30—empty of documents 200. It is thus safe to assume that not all axes displaying documents or any other elements, such the axis of documents 292 depicted in FIG. 7, are comprised of collation units 304 that are equally spaced.

Axes 292 that have non-equally spaced collation units 304 are called non-linear axes 292. Notably, the variation in length of the collation units is the one major distinctive feature that sets non-linear axes 292 apart from the linear ones 292.

FIG. 8 illustrates a non-linear axis of documents, with non-equally spaced collation units 304. Just like in FIG. 7, they follow a chronological order, set up by the collation function 300. A certain time scale 318 defines them. Time unit t27 contains 7 documents 200 while time unit t28—only 5.

Non-equally spaced collations units 304, presented in FIG. 8, are adapted to present documents 200 to be shown on the axis 292 in a regular, consecutive and chronological manner. There is no space between them, only separators when a time unit 322 change occurs. In this Figure, these separators are marked as time unit markers 334.

FIG. 8 shows a document 200 with a visually distinctive feature 284. This feature, for example, can be graphically displayed as a change in the color or the color intensity of the edges of a document, enlargement of the lines defining its frame, etc. Moreover, it seeks to visually filter and identify the documents belonging to an axis of documents 292, sub-selected by the user as a result of a more advanced search carried out within the axis. For example, all the documents on the axis of documents 292 share one attribute in common. That attribute is depicted in the figure as attribute B, and is marked to the left of the axis of documents 292. The user may carry out a search within the documents 200 of the axis 292 to seek for the document(s) that has/have another sub-attribute assigned to it/them. Document with a visually distinctive feature 284 would represent the result of the search. It would be consequently visually highlighted in some sort of way on the axis of documents 292 in order for the viewer to easily differentiate it from the rest of the documents 200.

FIG. 9 presents a graphical user interface 234. More specifically, it illustrates an axis-based user interface 238 with a linear axis configuration 326 as it can be visible on three distinct display areas 314. The simultaneous presentation of three different display areas 314 on the same axis 292 is provided for illustrative purposes only despite the fact that only one display area 314 would suffice and normally be utilized to show a portion of the axis 292. The purpose of displaying three instead of one display area seeks to schematically demonstrate the variety of layouts and placements of documents 200 on an axis 292 and the different ways in which they can be viewed via display areas 314. By this, one can see that some display areas may have no documents 200 displayed, some—a few and some might present a portion of an axis 292 filled completely by documents 200.

The linear axis configuration 326 presented in FIG. 9 is also illustrated in FIG. 7. The difference lies in the fact that FIG. 9 shows how the documents 200 exhibited on the linear axis 292 can be viewed on display areas 314. A computer or telephone screen can serve as a display area 314. These, however, are mere examples. Possibilities of devices and apparatuses upon which axes of documents or any kind of elements can be displayed are numerous.

When examining FIG. 9 from left to right, one notices that the display area 314 closest to the left side of the FIG. 9 visually fully displays two documents 200 belonging to the time unit 27 and one document belonging to the time unit t28. The display area 314 shown in the center of FIG. 9 shows two documents belonging to the time unit t29, while the display area 314 to the right side of FIG. 9 fails to bring to light any documents, as the time unit t30, which is shown on this display area 314, contains no documents 200. To summarize, FIG. 9 schematically points out that the portion of a linear axis 292 (or the whole axis 292), when visible on a display area 314, may display some or no documents; moreover, it may potentially present on the display area 314 empty space as well.

FIG. 10 illustrates a non-linear axis of documents 292, with non-equally spaced collation units 304, as it can be visible on three distinct display areas 314. If examined carefully, one notices that the non-linear axis 292 presented in FIG. 10 is also illustrated in FIG. 8. The difference lies in the fact that FIG. 10 schematically illustrates how the documents 200 exhibited on the axis 292 can be viewed on the display areas 314.

Non-linear axes 292, in general, when visible on a display area 314, show documents 200 or any other elements, while failing to reveal any empty, and therefore, non-occupied by or any other document and/or element, space. The following examples from FIG. 10 further illustrate this:

The display area 314 to the utmost left side of FIG. 10 presents the document with a visually distinctive feature 284. This display area 314 shows fully three documents 200 belonging to the time unit t27. Moreover, it partially reveals two other documents 200 belonging to the same time unit t27.

The display area 314 in the center of FIG. 10 shows fully two documents 200, one belonging to the time unit t27 and another—to the time unit t28. Furthermore, this display area 314 shows partially two other documents 200, one belonging to the time unit t27 and the other—to time unit t28.

Similarly, the display area 314 to the right side of FIG. 10 shows three documents 200 belonging to time unit t29. Another partially displayed documents 200 belongs to the time unit t28. FIG. 10 seeks to illustrate that a non-linear axis 292 with documents 200, when visible on a display area 314, shows documents without revealing any empty space.

FIG. 11 illustrates the insertion of a document 342 on a non-linear axis of documents 200. The insertion takes place outside of the display area 314. The display area 314 shows ten documents 200. The eleventh one, located at the utmost right side of the display area 314, is only partially shown.

The documents 200 within the display area 314 belong to three different time units, one of which is shown fully on the display area 314. The beginning and end of this time unit are marked by two time unit markers 334. Document 201.1 is the last fully-displayed document 200 shown on the left side of the display area 314.

Within the time unit fully shown on the display area 314, there are two documents with a visually distinctive feature 284, described in greater length in the discussion about FIG. 10. The actual visual feature assigned to these documents is different on each of them. This is so that the viewer can discriminate between the two with little or no difficulty. FIG. 11, also, shows two more documents with a visually distinctive feature 284. Both are located to the outmost left side of FIG. 11. One of which is the first document 200 displayed on the axis 292, as it is located next to the beginning of the axis 336.

Not all the documents 200 present on the axis 292 shown in FIG. 11 are displayed in the display area 314. Some of them are outside of the viewing space. One document 200 with a visually displayed feature 284 is shown outside of the display area, on the left side of FIG. 11. Two documents 200, along with a portion of a document 200, are displayed outside the display area 314, on the right side of FIG. 11. FIG. 11 shows only the beginning of the axis 292, implying that there are documents 200 on the axis 292 beyond the ones displayed in the Figure.

FIG. 11 also illustrates how an inserted document 342 is added to the axis 292. The insertion arrow 362 points out the exact location where this document is inserted—outside the display area 314, and on the beginning of the axis 292. This insertion location may have been chosen by the collation function 300.

There are two ways documents 342 can be inserted on a document: when it is already existent and is given an attribute based on which the axis 292 is defined, by the user; and when is created or imported by a user. Both these actions result in the same effect, namely, in the addition of a document 200 on an axis 292. In a network collaborative work context, multiple users can simultaneously insert or change attributes of elements 200 distributed on one or more axes 292.

FIG. 12 illustrates the insertion of a document 342 on a non-linear axis 292, outside the display area 314 and a way in which this insertion affects the way documents 200 within the display area 314 are graphically laid out. This is likely to be one of default implantation in an axis-based interface 238 since the beginning of the axis 292 was not moved.

FIG. 12 depicts the same non-linear axis 292 as the one illustrated in FIG. 11. FIG. 12, moreover, shows how the insertion of the document 342 on the axis 292 shifts the location of all the documents 200 of the axis 292 to the right. The arrow 366 indicates the direction towards which the documents 200 are moved as a result of this insertion.

Due to the insertion of document 342, all the documents 200 within and outside of the display area 314 shifted to the right in order to make room for the newly added document 342. Moreover, the document 200.1 is now partially located outside the display area 314 in FIG. 12.

FIGS. 13 and 14 illustrate two other possible embodiments of the way a document 342 can be inserted on a non-linear axis 292, outside the display area 314. In FIG. 13, a document 342, as shown by the insertion arrow 362, is being inserted on the utmost left side of the axis 292, outside of the display area 314. The insertion causes the beginning of the axis 336 to move further to the left to make room for the newly added document 342, without affecting the display of documents 200 within the display area 314.

In FIG. 14, the same document 342 is inserted on the right side of the axis 292, outside of the display area 314. This insertion causes the document 200.2 to move to the right, as arrow 370 indicates it, outside of the display area 314. FIGS. 13 and 14 demonstrate how the insertion of a document 342 on a non-linear axis 292, outside the display area 314, does not necessarily affect the visual display of documents 200 within the display area 314.

FIGS. 15 and 16 illustrate two other possible embodiments of the way a document 346 can be removed from a non-linear axis 292, outside the display area 314.

FIG. 15 illustrates a possible way in which documents 346 may be removed from the axis 292, outside of the display area 314. The removal arrows 374 point to the possible directions towards which these documents 200 may go as a result of their removal. One must be reminded that the removal of a document 200 from an axis 292, in general, may be caused by the removal of the attribute that once linked it to an axis 292 and/or by the actual deletion of the document 200 by a user. As the FIG. 15 seeks to illustrate, the removal of documents 200 from an axis 292, from within space outside of the display area 314, will not affect the distribution and layout of these documents 200 on the display area 314.

FIG. 16 illustrates another aspect of the present invention offering another option of the way in which documents 346, when removed from the display area 314, may not affect the display and layout of the documents within the display area 314. Similarly to FIG. 15, FIG. 16 illustrates how a document 346 may be removed from the axis 292, from the outside the display area 314, without disturbing the layout of the documents 200 within the display area 314.

Moreover, FIG. 16 illustrates a possible solution to the problem that might arise as a result of the removal of documents 346 from the display area 314. The cross signs 378 mark the two documents 346 that have been removed from the display area 314. In order to avoid the possible movement of the rest of the documents 200 within the display area 314 as a result of their removal, the space that these two documents 346 once occupied on the display area 314 remains static and unchanged. The two documents 346 that were removed remain listed on the axis 292, within the display area 314, and are being marked by the cross sign 378.

The cross sign 378 presented in FIG. 16 is for illustrative purposes only, and may be substituted by other means seeking to identify the documents 346 that were removed from the display area 314, from those that were not. FIG. 16, therefore, represents one aspect of the embodiment in which the removal of documents 346 from the display area 314 of an axis 292 may not affect the viewer of the display area 314.

FIGS. 17 and 18 illustrate another possible way in which the insertion of a document 342 on an axis 292 may affect the viewer of the display area 314 and how this undesirable effect may be alleviated. In this case, the undesirable consequence relates more to the viewer's potential loss of track of a certain document 200 on the display area 314. The loss might cause frustration and confusion to the viewer. To understand it, one must examine FIGS. 17 and 18 together in order to trace the succession of events illustrated herein.

FIG. 17 illustrates an axis 292 with documents 200, placed within the display area 314. A document 342 is being inserted on the axis 292, inside the display area 314, between a document 200.3 and the document with a visually distinctive feature 284. The insertion arrow 362 pinpoints the exact location where the document 342 is being introduced.

The display area 314, also, exhibits four other noteworthy documents 200, three of which are documents with a visually distinctive feature 284. The other one, document 200.2, is located to the left of the document 200.3.

A pointing device 348, embodied in FIG. 17 as a cursor 350, points towards the document 200.2. The cursor 350 may indicate the viewer's intention to deal with the document 200.2 and, therefore, serves as a reference (aka reference point) indicator based upon which the addition and/or removal of documents 200 may take place within and outside of the display area 314.

The reference based upon which the addition and/or removal of documents 342, 346 may take place within and outside of the display area 314 may be embodied, for example, as the position of the cursor 350, as shown in FIG. 17. It may also be embodied as a line defined in relation to the viewer's activity(ies) in relation to the elements of the axis(es) displayed within the display area 314, or as a collation position. Moreover, the reference based upon which the addition and/or removal of documents 200 may take place within and outside of the display area 314 may be also identified, for example, via a multi-point sensing device.

The reference may be static or dynamic. The static reference is not subject to dislocation as a result of the viewer's activity on the display area 314. The static reference may be embodied as a line, displaying vertically the center of the display area 314. For example, it is presented in FIG. 18 as the center of the display area 358. The line indicating the center of the display area 358 (FIG. 18) is not shown to the user. It may also be embodied as a vertical line located on the display area 314, as shown in FIG. 19 as the vertical line 354. This line as well is not revealed to the user.

The dynamic reference aligns itself to the movement of the pointing device 348, which may be embodied, for example, as a cursor 350 or the position and alignment of the viewer's eyes in relation to the display area 314.

The possibilities of the actions one might want to undertake in respect to the document 200.2 are numerous. It may be the case, for example, that the viewer might want to open it, observe its content, read it, and/or send it to someone else as an attachment in an email. However, due to the possible sudden dislocation of the document 200.2, the viewer might unintentionally target another document 200.3 instead of the one the viewer initially intended to target. In this case, the viewer might click, for example, or touch with one's finger(s) a document 200 other than the one initially intended to be targeted. This might cause frustration to the viewer, especially when accuracy in one's work and deadlines to accomplish a certain task may be of great importance to the user. Undesirable consequences to the viewer as a result of the insertion of the document 342 are most likely to occur especially when the insertion is subject to no order or, in other words, randomly carried out.

FIG. 18 presents a possible way in which the insertion of documents 342 may be carried so that it would alleviate the effect the random insertion of document 342 might have on the viewer of the display area 314. In this Figure, the insertion of document 342 is carried out in relation to the center line of the display area 358. The center line of the display area 358 is the reference based upon which the insertion of the document 342 is handled.

More specifically, FIG. 18 illustrates how the insertion of the document 342 may be carried out in on half of the display area 314, namely, on the side where the cursor 350 was initially pointing at document 202.2. This side is determined in reference to the center of the display area 358.

As a result of the insertion of the document 342, the cursor 350 is now pointing towards the document 200.3. This is because the document 342, when inserted on the axis 292, pushed to the left, as indicated by the arrow 366, the documents 200 located on the left side of the space occupied by the document 342. The movement to the left occurred as a result of the insertion of the document 342 on the axis 292.

FIG. 19 illustrates the preferred embodiment of the present invention in which the movement of documents 200 on the axis 292, when a document 342 is being inserted on the axis 292, is carried out in reference to the location of the viewer's pointing device 348, embodied in this Figure as a cursor 350.

The vertical line 354 indicates the location of the display area 314 aimed by the viewer, based on the position of the cursor 350. The insertion of the document 342 on the axis 292 is carried out so that the documents 200 move in the opposite direction from the vertical line 354; in other words, in the opposite direction from where the aimed document 382 is located. The arrow 366 indicates that the documents 200 move towards the right side of the display area 314 as the aimed document 382 is located on the left side of the display area 314.

In FIG. 19, the vertical line 354 is vertical because it is perpendicular to the axis 292. If the axis 292 were to be vertical, the line 354 would be embodied as a horizontal axis defined by the position of the cursor 350.

Similar to FIG. 19, FIG. 20 illustrates another embodiment of the present invention in which the movement of documents 200 on the axis 292, as a result of the insertion of the document 342, is based on the location of the aimed document 382. The document 382 is the document targeted or aimed by the viewer. The insertion of the document 342 is carried on the basis of the region of the display area 314 towards which the viewer is looking. In this Figure, this region is marked by eye view indicator 386.

The actual position and aim of the viewer's eyes in relation to the display area 314 can be detected, for example, via a web camera connected to the display area 314. The web camera could be used in order to track the viewer's eye movements and/or hand gestures. Even if the pointing device 348 in FIG. 20, embodied as the cursor 350, is located on the right side of the display area 314, the movement of documents 200 on the axis 292 is carried out, as the arrow 366 indicates it, towards the left side of the display area 314, away from the aimed document 386. This is so that the viewer may not be affected by the insertion of the document 342, as the viewer's attention is focused on the utmost left side of the display area 314.

Figure 23:
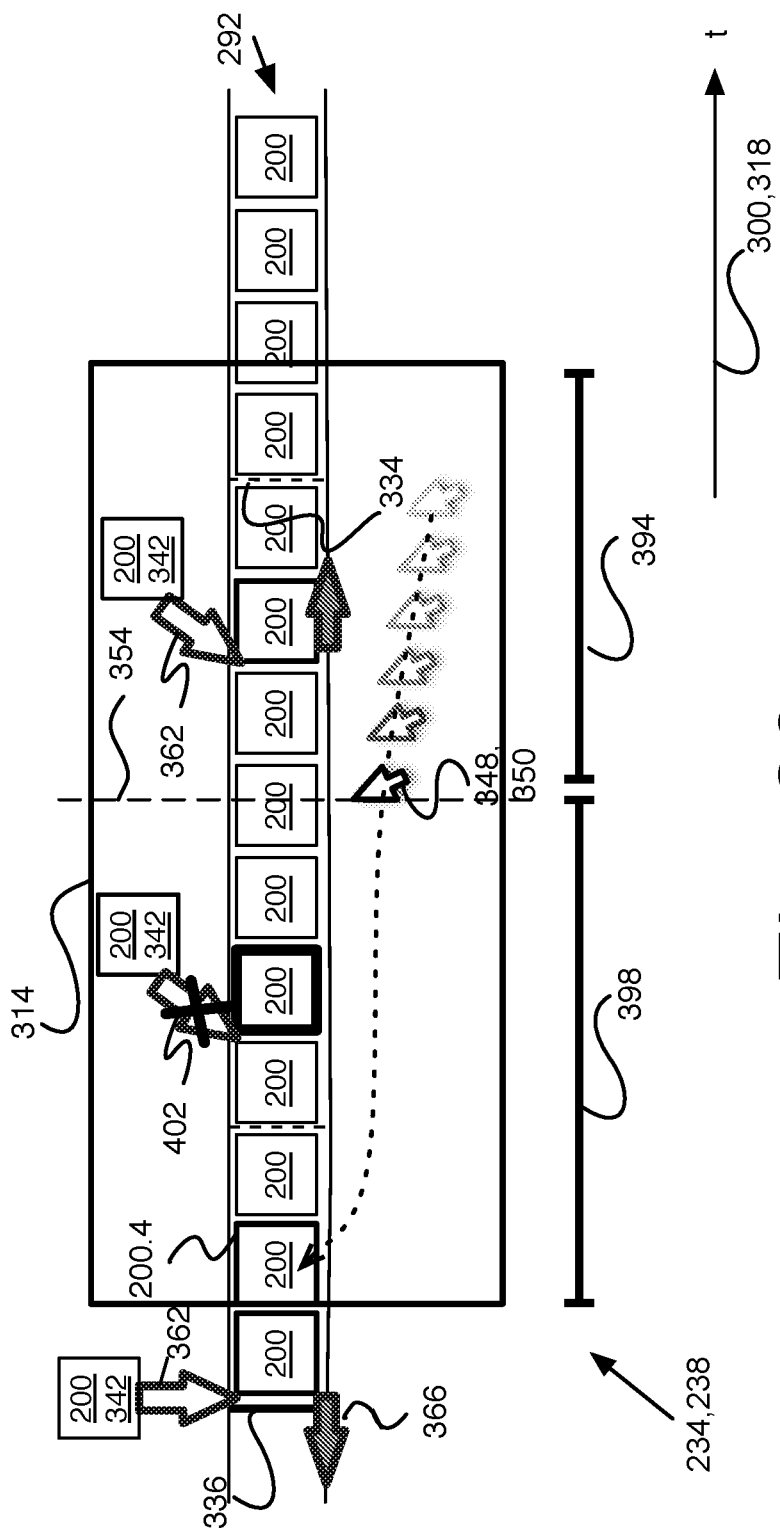
FIG. 23 is a schematic illustration of a magnified display area partially showing an exemplary axis layout in accordance with an embodiment of the present invention.

FIGS. 21, 22 and 23 illustrate another aspect of the invention in which the insertion of a document 342 on an axis 292 may affect the viewer of the display area 314 and how this problem may be alleviated. In this case, the undesirable consequence relates more to the viewer's potential loss of track of a certain document. To understand it, one must examine FIGS. 21, 22 and 23 together in order to trace the succession of events presented herein.

FIG. 21 illustrates the viewer's intent to aim and target the document 200.4 presented on the display area 314 by using a pointing device 348 embodied in as a cursor 350. The successive cursors 350 shown in FIG. 21 represent a cursor being moved by the user. Simultaneously to the viewer's attempt to target the document 200.4, a document 342 is being added to the axis 292, in near proximity to the aimed document 200.4.

FIG. 22 illustrates a possible outcome of the insertion of the document 342 on the axis 292 on the aimed document 200.4. In the case of FIG. 22, this outcome is illustrated as an immediate movement of the aimed document 200.4 from within the display area 314 towards left, as indicated by the arrow 366, and into the area of the axis 292 that is not displayed to the viewer. In this case, using a logical approach similar to the one shown in FIG. 19, the left movement of documents 200 is chosen because it is in the opposed direction from the location where the cursor 350 was initially located. Therefore, it is in the opposite direction from the center of the display area 358. With the movement of the aimed document 200.4 leftwards, the viewer would have now had to attempt to reach the document 200.4 by scrolling for example, activity that might prove to be dissatisfactory and causing some degree of inconvenience to the viewer.

FIG. 23 illustrates the preferred embodiment of the present invention, presenting another solution to the problem the viewer might face as a result of the insertion of documents 342 within the display area 314. In this case, the solution provided consists of identifying the side of the display area 314 upon which the viewer focuses most of the attention based on the direction and movement of the cursor 350. The solution provided in FIG. 23, also, offers to insert documents 200 within the idle side of the display area 314, towards which the viewer does not aim via its pointing device 348 and/or glance. In FIG. 23, the insertion of the document 342 is carried in the idle region 394 of the display area 314. This is the region in which the document 200.4 towards which the viewer aims is not located.

The display area 314 is equally divided into two sub-regions: the idle region 394 and the active region 398. The active region 398 is the space of the display area 314 towards which the viewer is aiming in order to reach a certain aimed document 200.4. It is therefore the region of the display area 314 in which most of the movement of the pointing device 348 and/or of the aim of the viewer's eyes is/are taking place. Similarly, the idle region 394 is the space of the display area 314 towards which the viewer does not aim via its pointing device 348 and/or glance.

Once these two regions are identified and marked through the usage of the vertical axis 354 (not shown to the user), the insertion of documents 342 takes place within the idle region 394 and outside the display area 314, where the addition of an extra document 342 would not cause the displacement of any documents 200 within the active region 398.

The non-insertion arrow 402 indicates that the insertion of document 342 within the active region 398 does not occur. That is because the viewer, by moving the pointing device 348 embodied in this Figure by the cursor 350, would cause the system to pause and assess the direction of the movement of the cursor 350. Once it would stop at a specific aimed document 200.4, the system would identify the region of the display area 314 upon which the trajectory of the movement of the cursor 250 was traced. This region is the active region 398 of the display area 314. FIG. 23, therefore, embodies another solution to the unintended and/or undesirable consequences of the insertion of a document 342 on an axis 292 within the display area 314.

FIG. 24 yet embodies another solution to the unintended and/or undesirable consequences of the insertion and/or removal of a document 342, 346 within the display area 314. The solution consists in notifying the viewer of the display area 314 of any changes that might occur to the documents 200 on the axis 292 without adding or removing any of them until a later time, following the instructions set up by the viewer.

FIG. 24 presents the same axis 292 illustrated in the previous FIG. 23, upon which the same display area 314 is superimposed to bring to the viewer's attention to a series of documents 200 which were described above at a greater length. Above the axis 292, one notices the display area notifications feature 406. These notifications concern the changes taken place while the axis 292 is displayed on the display area 314. These changes, however, do not lead to the visual displacement of documents 200 within and outside of the display area 314 until a later time, chosen by the viewer.

The actual presentation of the display area notifications feature 406 may vary. The wording and content of the notifications may differ as well. One example would be that it could provide the following information to the viewer: three documents 200 have been added to the axis; one of the documents 342 is to be inserted within the display area 314; one document 200 from the display area 314 has been removed. These notifications may, also, indicate the identity of the user(s) who added and/or removed documents 342, 346. Moreover, these notifications may offer the time when these documents 342, 346 may be added and/or removed from the axis 292 in light of the preferences and selection of the viewer. Documents 342 outside of the display area 314 may be added or removed at in real and/or at a later time, in dependence of the viewer's preferences and choices.

The user may also have the choice to decide when the addition and/or removal of the document 342, 346 may occur. The display area notification feature 406 may offer the addition and/or removal of the documents 342, 346 to be carried out automatically on a specific and/or periodical time. It may also offer to add and/or remove the documents 342, 346 when the user removes and reopens the axis 292.

Similar to FIG. 24, FIG. 25 embodies another solution to the unintended and/or undesirable consequences of the insertion of a document 342 within the display area 314, on the viewer of the display area 314. The solution consists in offering the viewer the option to pause for a certain time the removal and/or addition of any documents 342, 346 on an axis 292 of documents 200 and allow the viewer to activate the actual update of the axis 292 at a time determined by the viewer, when any modifications to the axis 292, within and outside of the display area 314, are deemed to have less or no impact on the viewer.

FIG. 25 seeks to illustrate, through the non-insertion arrows 402, that none of the insertions of the documents 342 are allowed to take place within and outside of the axis 292. This is because these modifications are not permitted to take place until the viewer activates the pause/activate feature 410. This feature inhibits any modifications of the documents 200 on the axis 292 to take place until the viewer allows them to happen.

In FIG. 25, this permission is expressed by the viewer's activation of the pause/activate feature 410. The activation may be visually presented by a change of color, for example, from the paused state. The viewer may, later, pause any further addition and/or removal of documents 342, 346 on the axis 292 by pausing the pause/activate feature 410. The pausing may be visually presented, for example, by a change of color from the one depicting activated state of the pause/activate feature 410.

Figure 26:
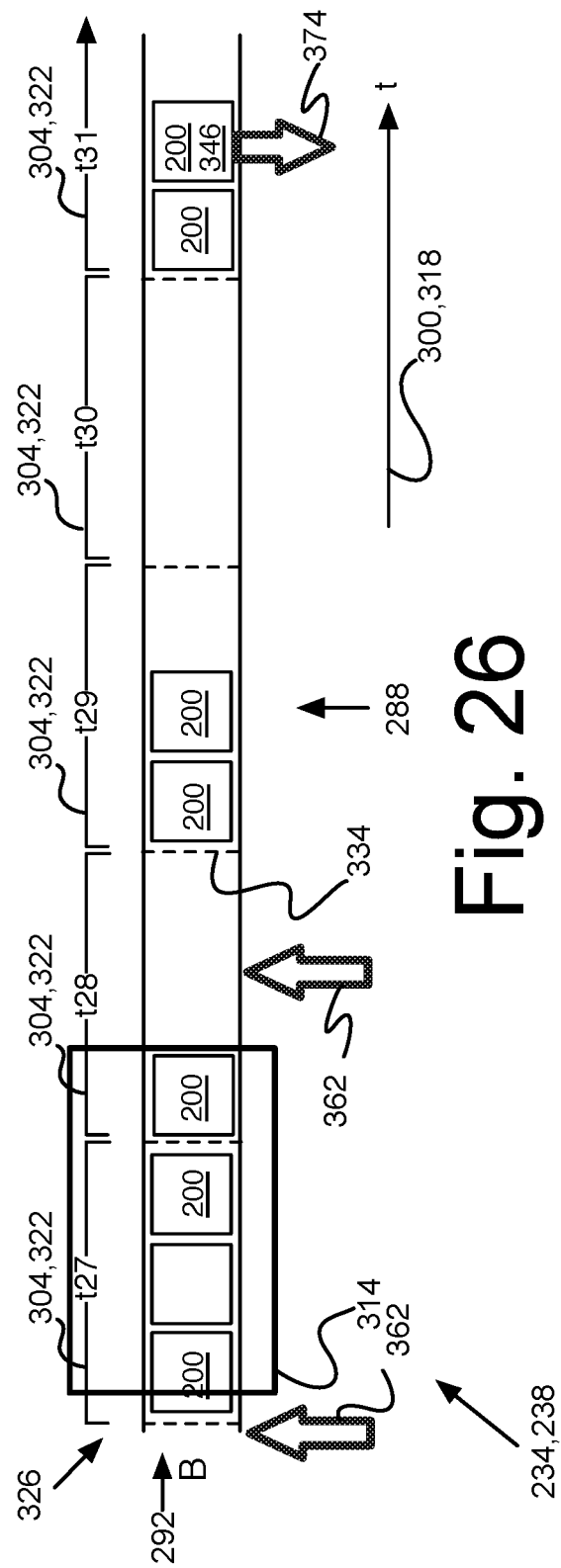
FIG. 26 is a schematic illustration of an exemplary linear axis layout in accordance with an embodiment of the present invention.
Figure 27:
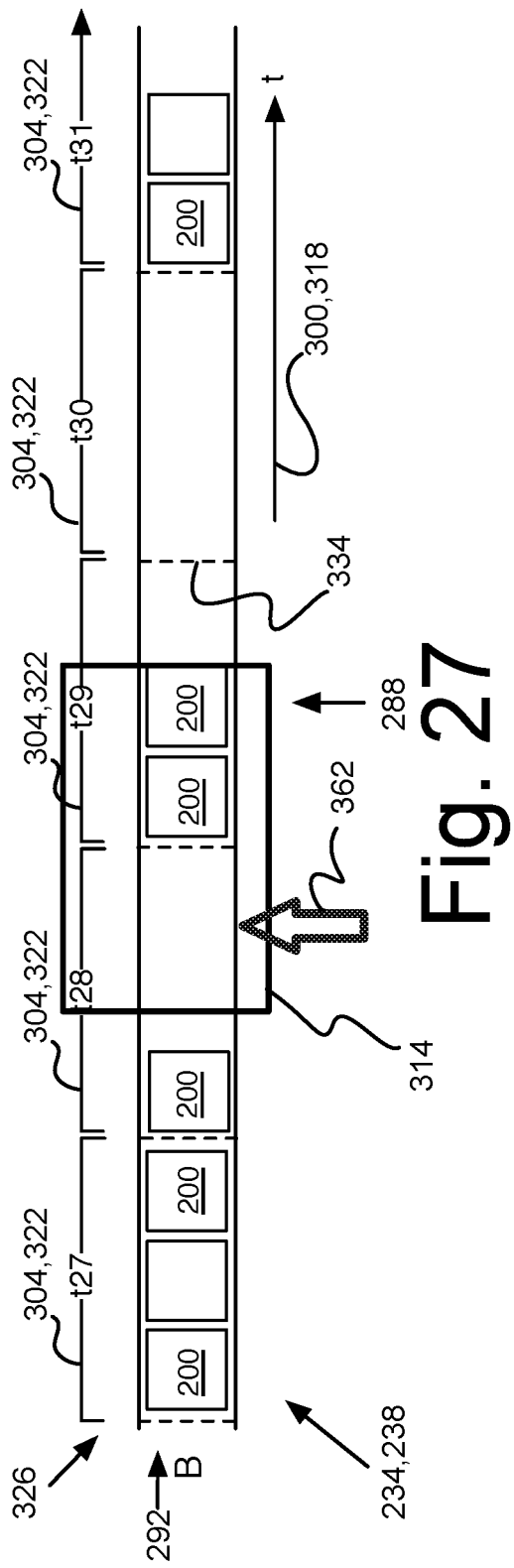
FIG. 27 is a schematic illustration of an exemplary linear axis layout in accordance with an embodiment of the present invention.
Figure 28:
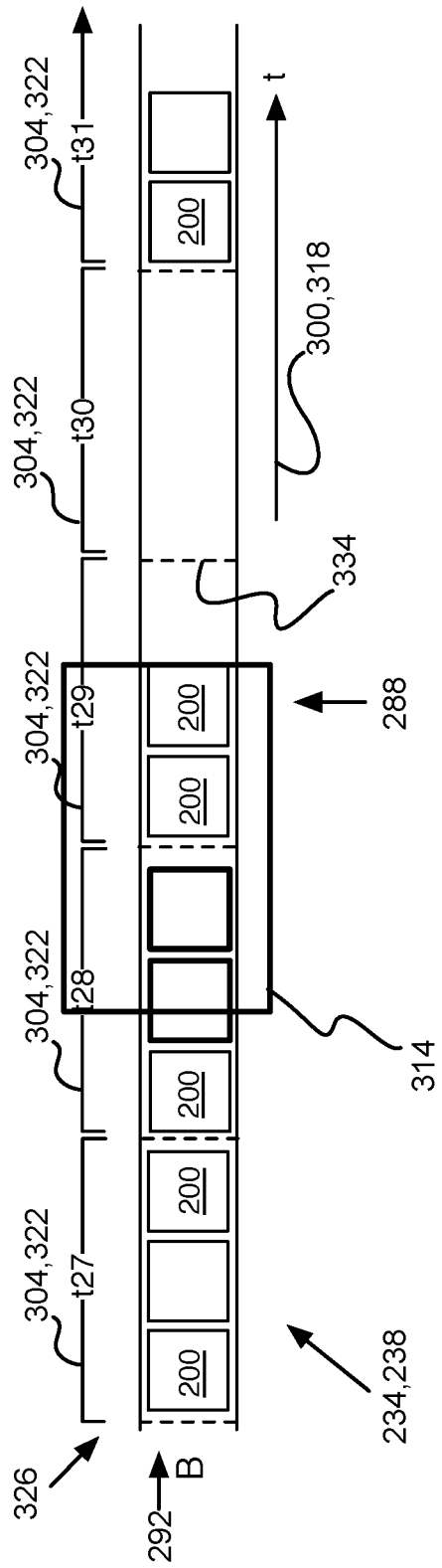
FIG. 28 is a schematic illustration of an exemplary linear axis layout in accordance with an embodiment of the present invention.

FIGS. 26, 27 and 28 illustrate three respective possible embodiments of a linear axis 292 as it may be partially viewed via a display area 314. These Figures illustrate possible distributions of documents 200 on a linear axis 292, on which some collation units 304, in this case, time units 322, may be partially, semi and/or completely filled with documents 200. Moreover, they illustrate how the addition and/or removal of documents 342, 346 from within these time units 322 may take place in light of the fact that some of these time units 322 are only partially or fully empty of documents 200.

FIG. 26 illustrates how an axis 292 may be partially viewed on a display area 314. The portion of the axis 292 displayed via the display area 314 is, however, filled to the maximum with documents 200. The insertion and/or removal of documents 342, 346, however, may take place nonetheless. In this Figure, the insertion arrows 362 identify potential spaces on the axis 292, outside of the display area 314, where documents 342 may be added. Moreover, FIG. 26 illustrates that document 346 may be also removed. In this case, the document 346 is being removed from time unit t31. The removal arrow 374 indicates the removal of the document 346. With this scenario, the viewer of the display area 314 will not be subject to undesirable modifications of the layout of the documents 200 displayed within the display area 314. The removal and insertion of documents 200 take place without modifying the display of documents 200 within the display area 314.

FIG. 27 illustrates how an axis 292 may be partially viewed on a display area 314. Roughly half of the area of the axis 292 displayed via the display area 314 is filled with documents 200. The insertion arrow 362 indicates that documents 200 may be added in the empty space visible via the display area 314. With this scenario, as well, the viewer of the display area 314 will not be subject to undesirable modifications of the layout of the documents 200 displayed within the display area 314. Even if two more documents 200 were to be inserted inside the display area 314, within the time unit t28, as FIG. 28 illustrates it, this would not cause the documents 200 within the time unit t29 to dislocate.

Figure 29:
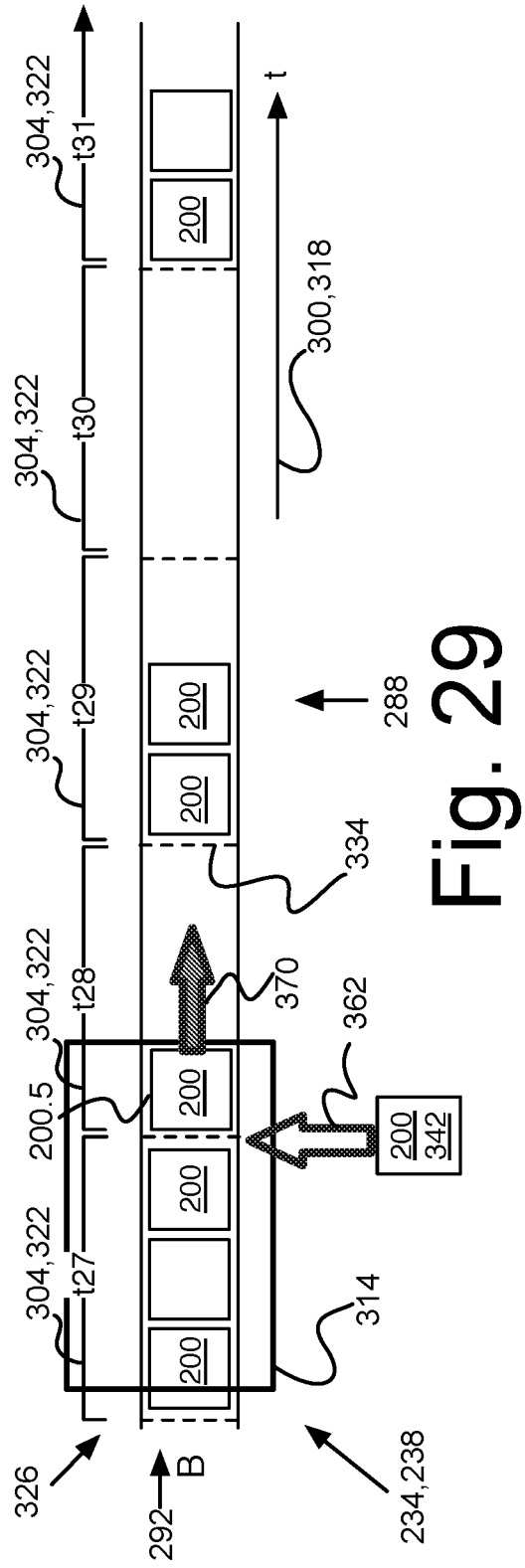
FIG. 29 is a schematic illustration of an exemplary linear axis layout in accordance with an embodiment of the present invention.
Figure 30:
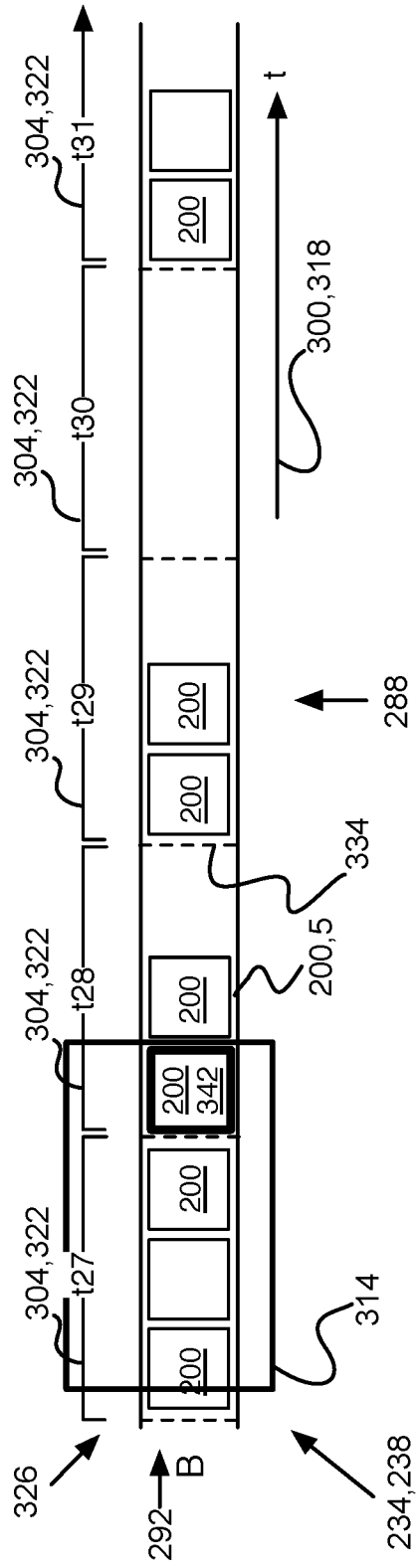
FIG. 30 is a schematic illustration of an exemplary linear axis layout in accordance with an embodiment of the present invention.

FIGS. 29 and 30 illustrate another embodiment of the present invention in which the insertion of the document 342 within the display area 314 leads to the movement of another document 200.5 from within the display area 314 outwards into the non-displayed area. This phenomenon occurs in the case where the collation unit 314 partially revealed within the display area has some empty space which makes possible the insertion of other documents 200.

In FIG. 28, document 342 is being inserted between two documents 200 revealed within the display area 314. These two documents are document 200 and 200.5. Moreover, document 342 is being inserted in the time unit t28 and before the document 200.5. In the case illustrated in FIG. 28, the location where the document 342 is inserted is identified based on the fact that the time and/or date the document 342 was produced was prior to the time and/or date when the document 200.5 was created. Given that the time units t27, t28, t29, t30 and t31 present documents 200 in a chronological order, progressively and consistently moving from left to right, the documents 342 inserted within the axis 292, within and outside the display area 314, would follow this chronological order as well. FIG. 29 illustrates the displacement of the document 200.5 towards the right side of the axis 292, from within towards the outside of the display area 314.

FIGS. 31 and 32 illustrate another embodiment of the present invention in which the insertion of the document 342 on the linear axis 292, within the time unit t27, leads to the rest of the documents 200 within the time unit t27 to be compressed in order to make room for the newly added document 342.

Despite the insertion of an additional document 342 within the time unit t27, the time unit t27 itself does not change in length. This is because the rest of the documents 200 within the time unit t27 reduced in size to accommodate the addition of the document 342.

In FIG. 31, the document 342 is being inserted at the utmost left side of the time unit t27. The insertion, as the arrow 366 indicates it, leads to the displacement of the rest of the documents 200 to the left of the time unit t27. FIG. 32 illustrates how the documents 200 initially present within the time unit t27 reduce in size so that despite the addition of a new document 342, the respective time unit t27 is subject to no modification in terms of its length and width.

Figure 33:
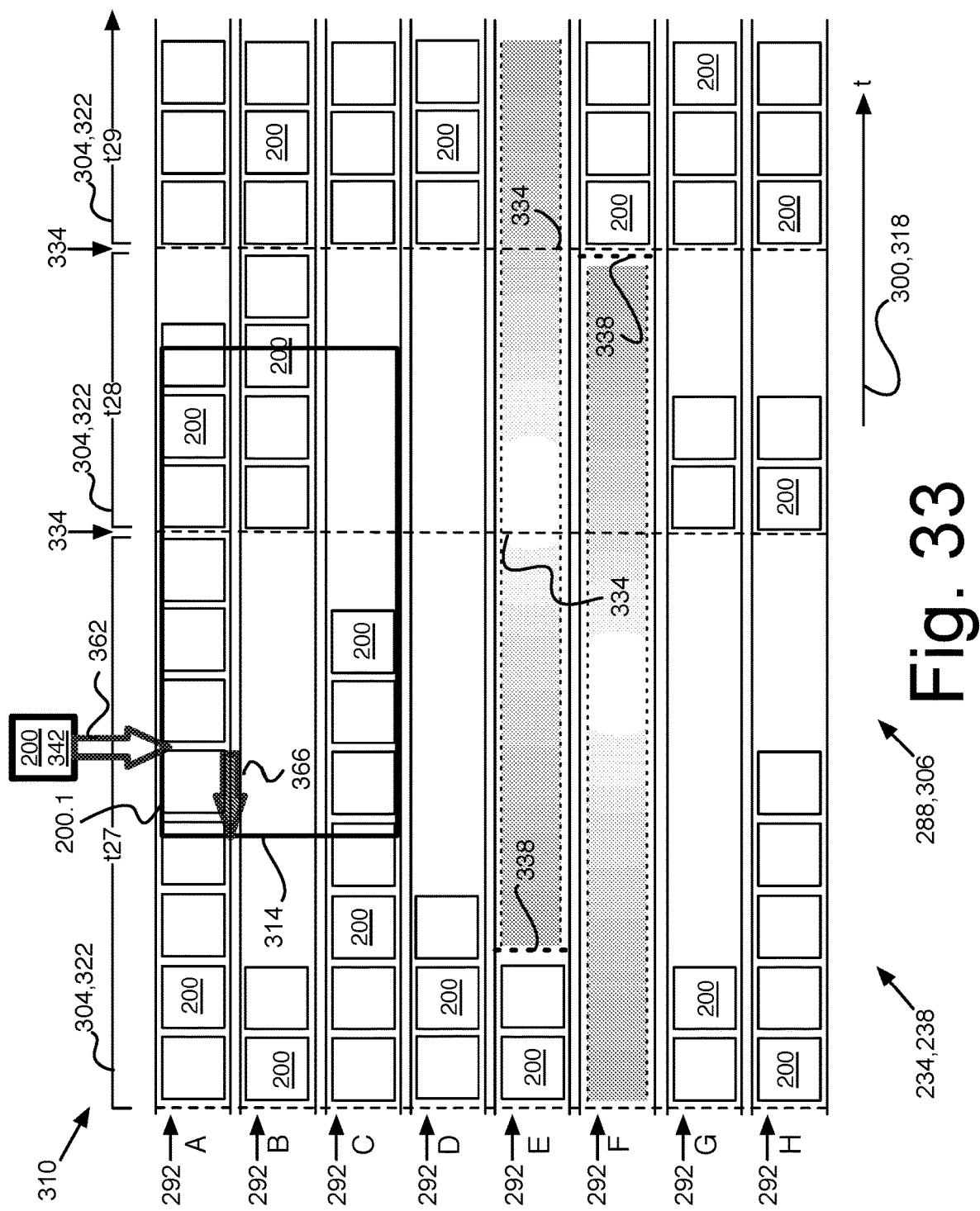
FIG. 33 is a schematic illustration of a group of axes layout in accordance with an embodiment of the present invention.
Figure 34:
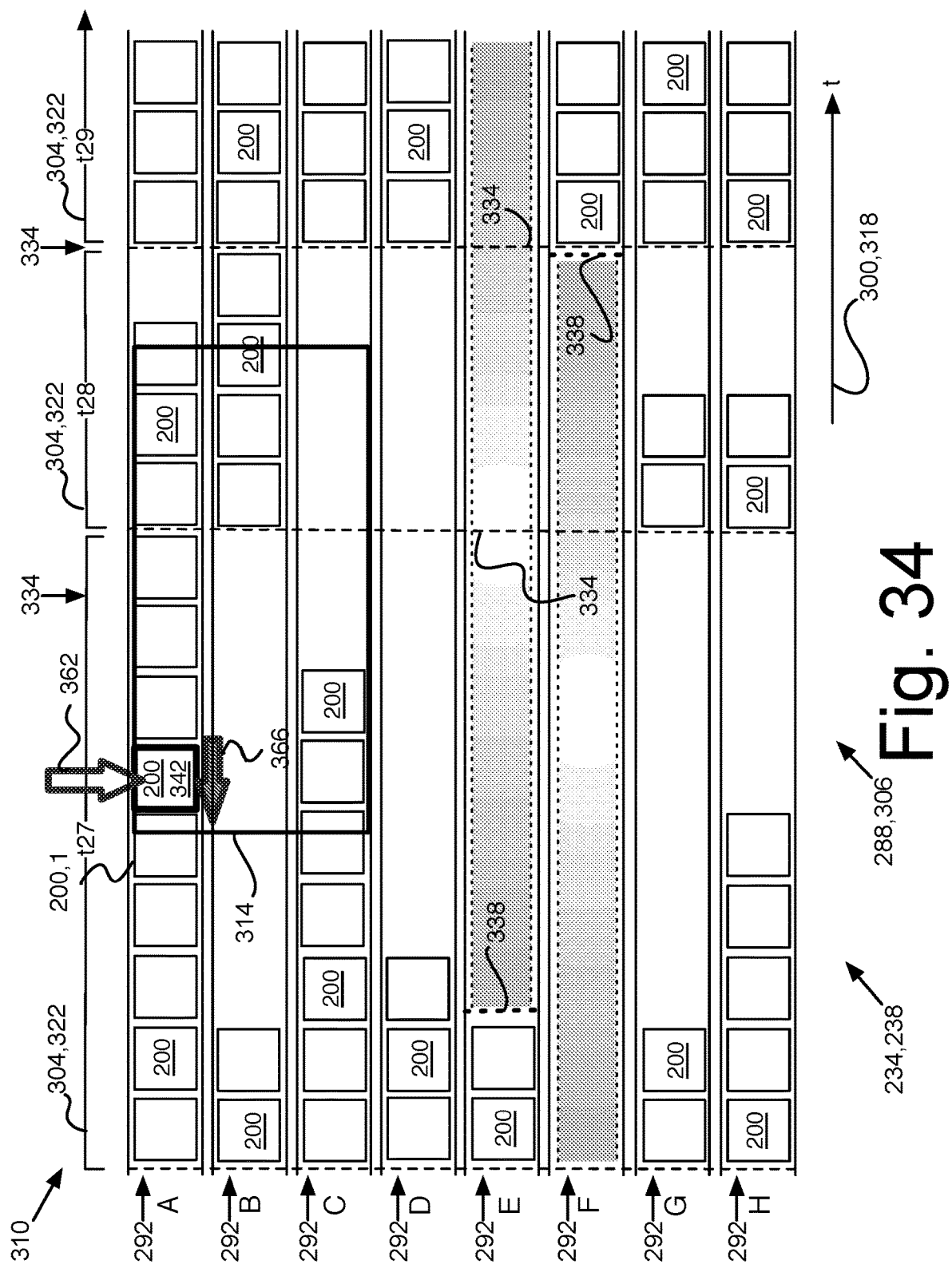
FIG. 34 is a schematic illustration of a group of axes layout in accordance with an embodiment of the present invention.
Figure 35:
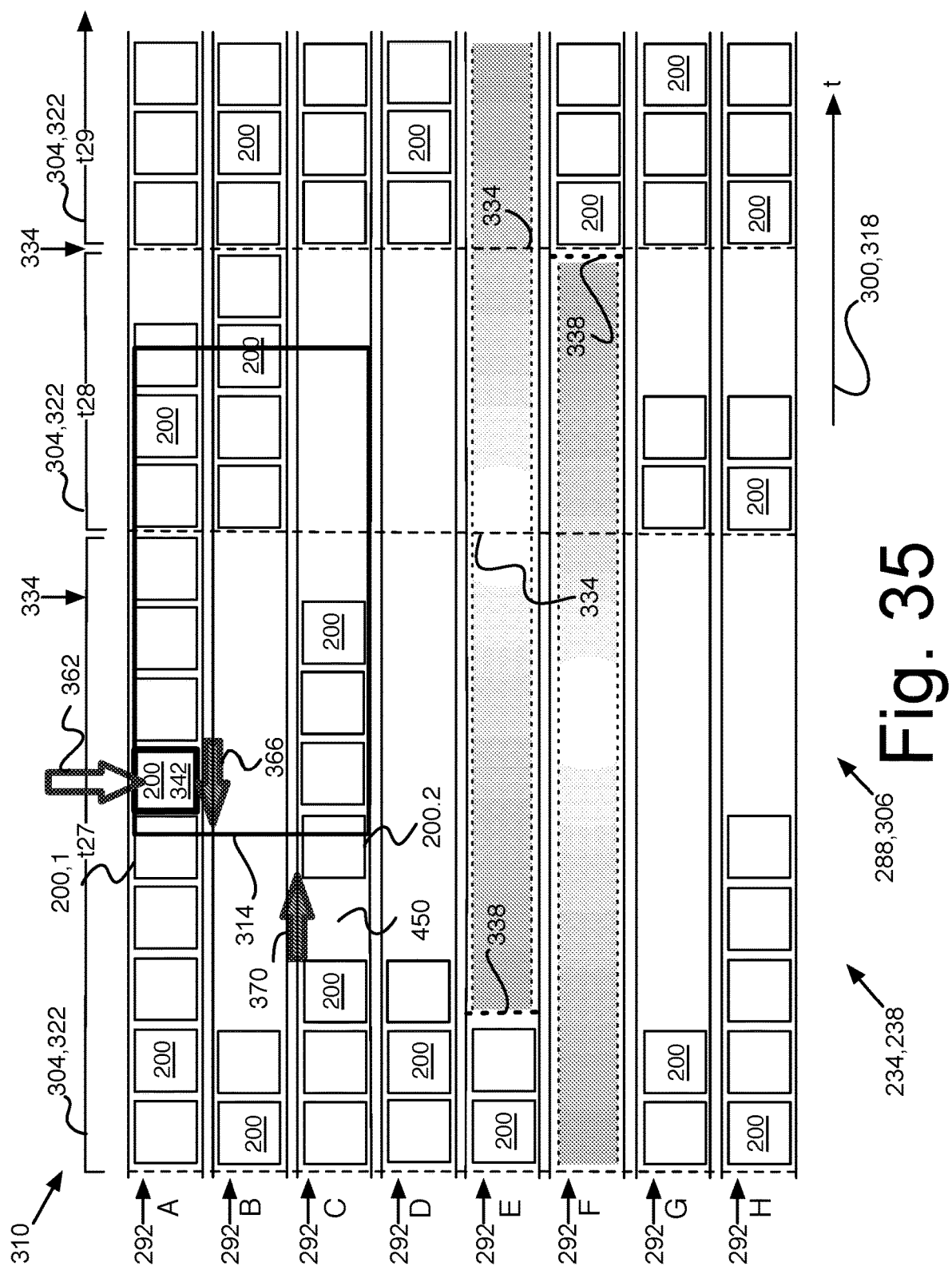
FIG. 35 is a schematic illustration of a group of axes layout in accordance with an embodiment of the present invention.

FIGS. 33, 34 and 35 illustrate yet another embodiment of the present invention. More specifically, they present the insertion of the document 342 within an axis 292 A, presented within the display area 314, when the axis 292 is part of a group of axes 310. The insertion of the document 342 leads to the enlargement of the time unit t27 to fit the new document addition.

FIG. 33 depicts a group of axes 310 and a display area 314 which exhibits portions of the following three axes 292: A, B and C. A, B and C refer to the respective attributes given to the documents 200 that belong to these three axes 292. There are in total 8 axes 292 presented in this group of axes 310. Some of them, namely axes 292 D, E, F, G and H, are not displayed at all on the display area 314.

In our preferred embodiment, no two axes 292 can be displayed on the same vertical line. Stated differently, any two axes 292, presented in a group of axes 310 will never be vertically placed in a tangential fashion. The end of an axis 338 may not lie next to the beginning or start of another axis 292. Given that, it is often the case that there might be non-occupied (by any document 200) space between two axes 292. In the case of the FIG. 33, this space is caused by the fact that there are no documents 200 with the attributes E and F that would be fitted for the time units t27 and t28 respectively.

Empty space, non-occupied by documents 200 within an axis 292 is different from the empty space between two axes 292. Axes 292 B, C, D, G and F, for example, all have empty spaces where documents 200 may be potentially added in the future. Whereas there might a possibility for an addition of a or several other document(s) 342 to be added on axis 292 B, C and D for example, within the space presently non-occupied by documents 200, there is no possibility for this to materialize in case of the empty space highlighted as grey shaded area next to the left and respective right the end of the axes 338 presented in the FIG. 33.

FIG. 33, furthermore, illustrates the insertion of the document 342 within the axis 292 A to the right of the document 200.1 present on the axis 292 A. Furthermore, FIG. 34 illustrates the outcome of this insertion, embodied in the movement outward of the display area 314 of the document 200.1, to the left of the axis 292.

The displacement of the document 200.1 from within towards outside of the display area 314 may cause undesirable consequences on the viewer of the display area 314, especially when the document 200.1 is the document the viewer aims to reach. Moreover, the insertion of the document 342 on the axis 292 A causes the time unit t27 to become larger than it was initially, so that it would accommodate the new document 342 insertion.

In FIG. 34, as a result of the insertion of the document 342, document 200.1 moved to the left of the axis 292 A, outside of the display area 314. Furthermore, one less document 200 is displayed on the axis 292 C. Whereas there were three documents 200 initially displayed on the axis 292 C within the display area 314 (see FIG. 33), due to the enlargement of the time unit t27 one of the documents 200 from the axis 292 C has moved leftwards, from within towards outside of the display area 314. This change of document display within the display area 314 may cause undesirable consequences on the viewer.

FIG. 35 illustrates a possible solution to prevent these potential undesirable consequences on the viewer by bringing an additional space 450 on the axis 292 C within the display area 314. The additional 450 would therefore bring the initial display of documents 200 on the axis 292 C, as presented in FIG. 33, despite the enlargement of the time unit t27. This additional space 450 may be temporarily placed in the respective place on the axis 292 C. It may also correct itself automatically when the user carries out additional actions intended to move the display area 314 elsewhere. In this manner, the viewer would be less likely to experience any undesirable consequences due to the insertion of the document 342 on the axis 292 A, within the display area 314.

Figure 36:
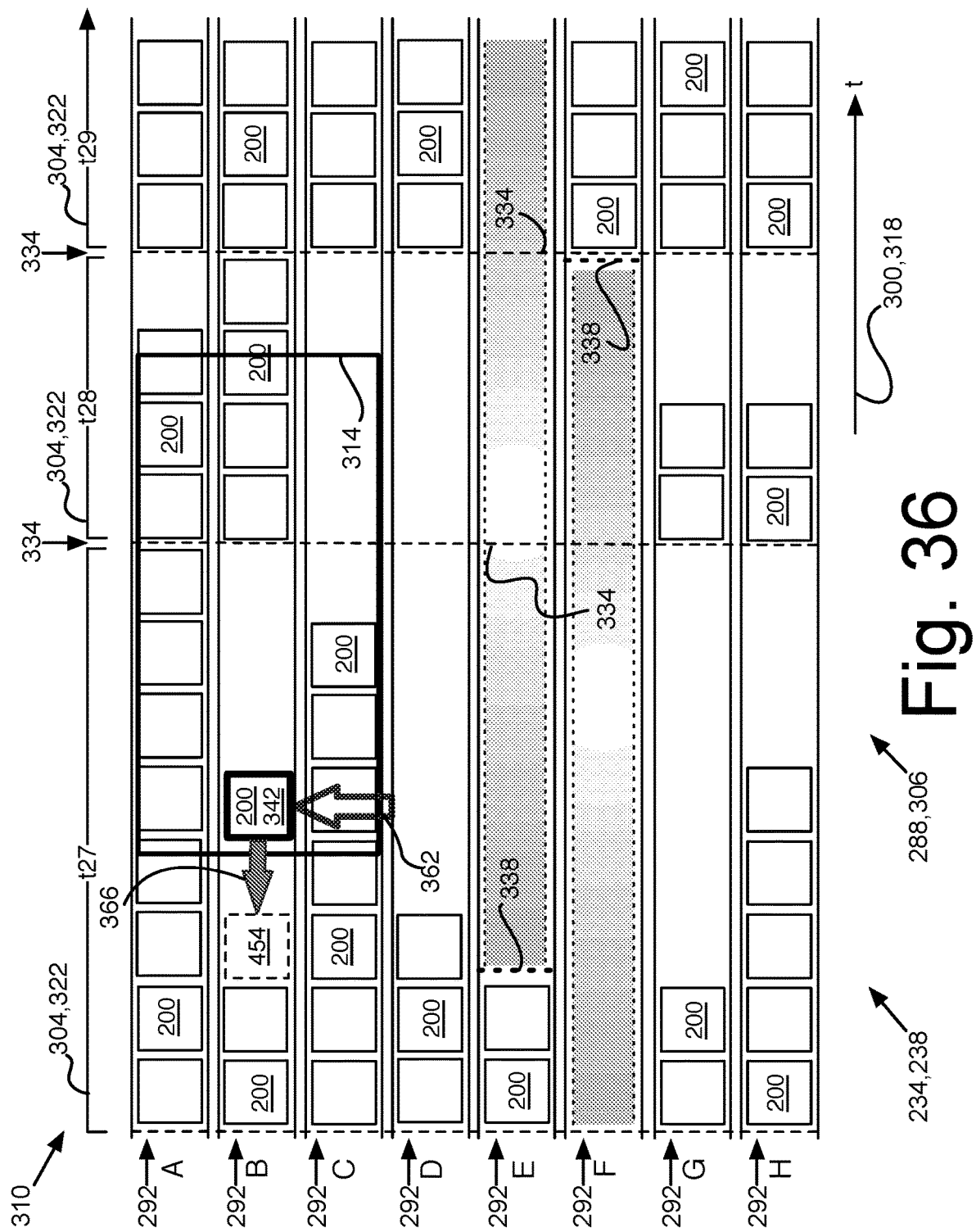
FIG. 36 is a schematic illustration of a group of axes layout in accordance with an embodiment of the present invention.

FIG. 36 is another embodiment of the present invention, in which the insertion of the document 342 within the display area 314 may not cause the enlargement of the time unit t27 in which the document 342 is inserted.

In FIG. 36, the insertion of the document 342 takes place on the axis 292 B, which portion that is displayed on the display area 314 reveals relatively more empty space (i.e. more room for documents 200 to be added into) than the axes 292 A and C do. In light of this circumstance, the insertion of the document 342 within the display area 314 leads not to the enlargement of the time unit t27 to which the newly inserted document 342 belongs. As a result of the insertion, the respective document moves leftwards on the axis 292 B, and outside of the display area 314.

As illustrated in FIG. 36, the insertion of a document 342 could take advantage of the empty space on the axis 292 B to show itself in the display area 314 before heading towards document-sized empty space. This movement may be animated. This may happen after a certain amount of time or after the user takes action to move the display area 314 to display other regions of the same axes 292 or other ones.

Figure 37:
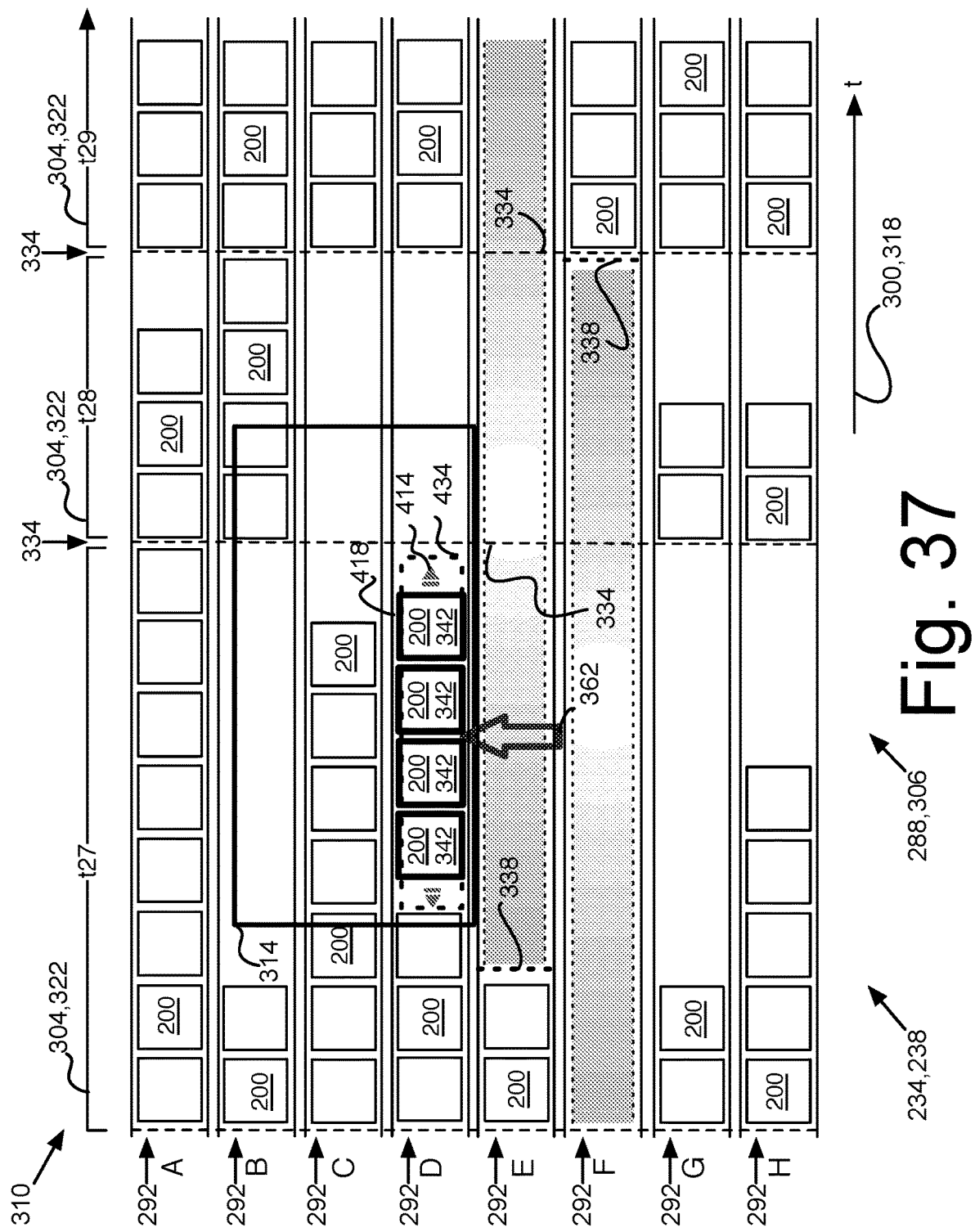
FIG. 37 is a schematic illustration of a group of axes layout in accordance with an embodiment of the present invention.

FIG. 37 illustrates another embodiment of the present invention, in which a group of axes 310 is partially shown on the display area 314. More specifically, it provides another possible solution for handling the addition of numerous documents 342 within the display area 314.

A series of documents 342, which have been added simultaneously or at a certain time distance from each other an axis 292, are partially displayed on the display area 314. They are located within the receiving space 434.

The addition of the documents 342 may cause the sudden enlargement of the time unit t27 to which they belong, and which is partially presented on the display area 314. In the case of the FIG. 37, the solution given in order to avoid the enlargement of the respective time unit t27 is to incorporate the respective documents 342 within a receiving space 434 which has a scrolling device 418 confined on both of its sides by scrolling arrows 414. In this manner, the viewer of the display area 314 may explore the added documents 342 within the scrolling device 418 a later time without changing the size of the time unit t27 and of the layout of documents 342 within the display area 314.

Figure 38:
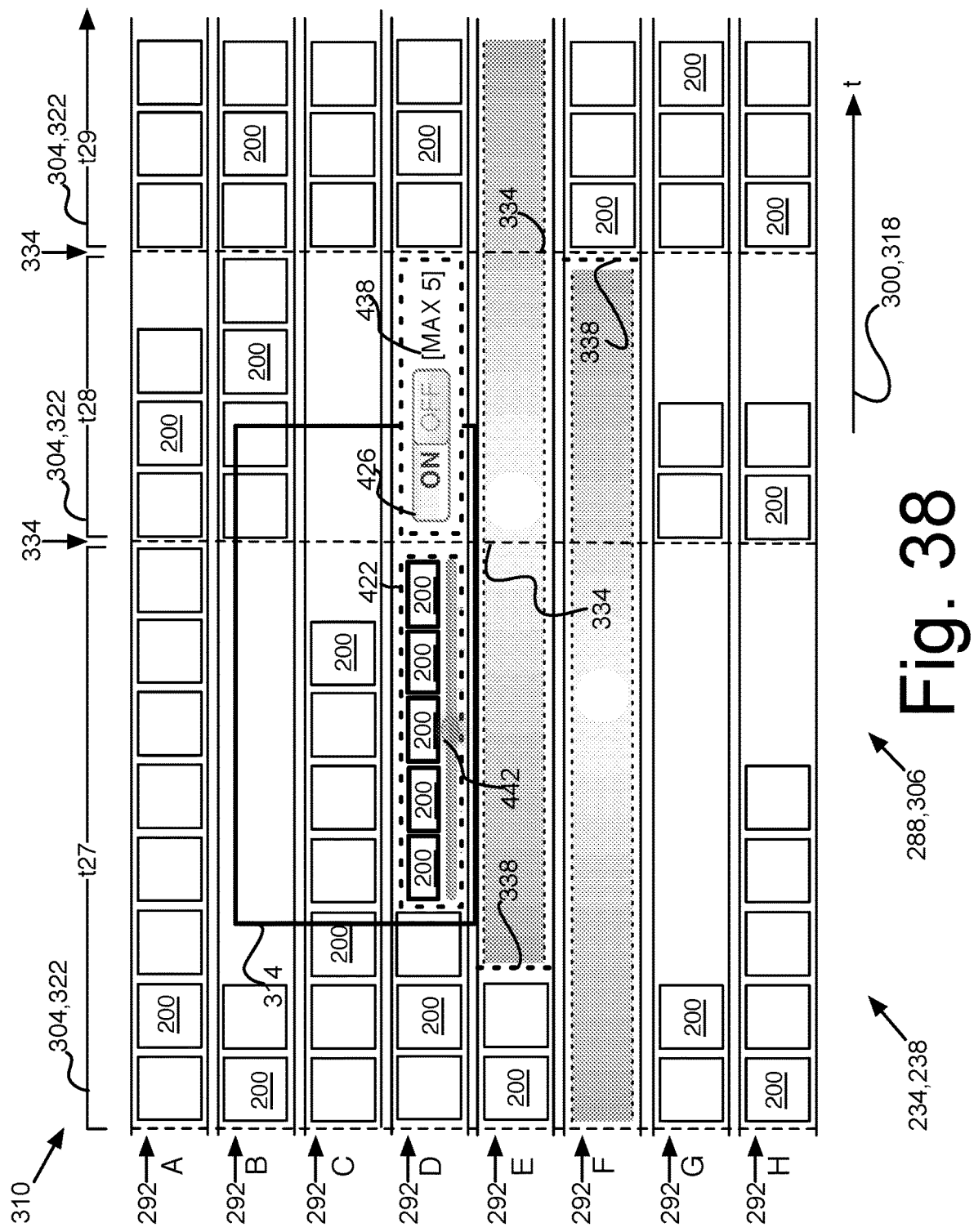
FIG. 38 is a schematic illustration of a group of axes layout in accordance with an embodiment of the present invention.

FIG. 38 illustrates another embodiment of the present invention in which a group of axes 310 are partially shown on the display area 314. More specifically, FIG. 38 provides another possible solution for handling the addition of numerous documents 342 within the display area 314.

A series of documents 342 are being added simultaneously or at a certain time distance from each other, on axis 292 D, which is partially displayed on the display area 314. The addition of the documents 342 may cause the sudden enlargement of the time unit t27 partially presented on the display area 314. In the case of the FIG. 38, the solution given in order to avoid the enlargement of the respective time unit t27 is to incorporate the respective documents 342 within an elements management device 422. In FIG. 38, this elements management device 422 has scrolling properties 442.

The elements management device 422, as FIG. 38 illustrates it, may indicate the maximum number of documents 342 to be displayed on the display area 314 from all the documents 342 that were added to the axis 292 D. The display potential 438 indicates that the elements management device 422 may display up to 5 of such documents 342. Moreover, the elements management device 422 may have an on and off button 426 which the viewer may use to indicate if the newly added documents 200 may be displayed or not on the axis 292 D, within the display area 314. This embodiment, as well, illustrates another potential solution to the undesirable consequences that might arise as a result of the insertion of documents 342 within the display area 314, on the viewer of the display area 314.

Figure 39:
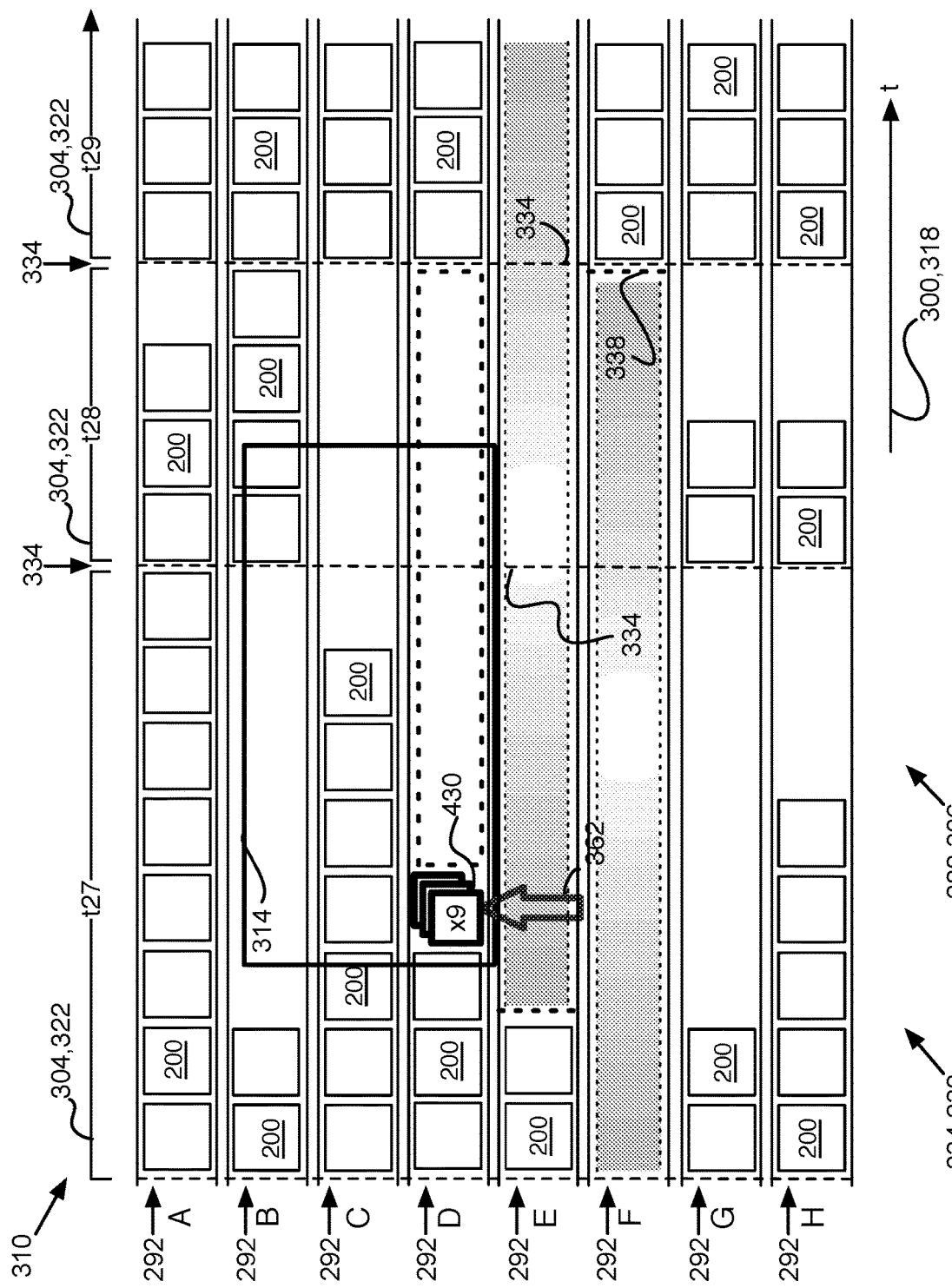
FIG. 39 is a schematic illustration of a group of axes layout in accordance with an embodiment of the present invention.

FIG. 39 illustrates another embodiment of the present invention in which a group of axes 310 are partially shown on the display area 314. More specifically, FIG. 39 provides another possible solution for handling the addition and/or removal of numerous documents 200 within the display area 314

In FIG. 39, a series of documents 342 are being added simultaneously at a certain time distance from each other, on axis 292 D. Axis 292 D is partially shown on the display area 314. In order to avoid the sudden enlargement of the time unit t27 partially presented on the display area 314 as a result of the abrupt and rapid addition of documents 342 on the axis 292 D, the documents 342 that were inserted and/or removed on the axis 292 D are compressed into a group of documents 430.

The group of documents 430 may indicate the number of documents 342 added to the axis 292 D. In the case of the FIG. 39, this number is 9, as indicated by the counting element 446. The group of documents 430 intends to avoid the enlargement of the time unit t27 as a result of the addition of the extra documents 200 on the axis 292 D, change that may cause unwanted consequences on the viewer of the display area 314.

The viewer of the display area 314 may explore the added documents 342 within the group of documents 430 a later time with or without changing the size of the time unit t27 and of the layout of the documents 200 within the display area 314.

Figure 40:
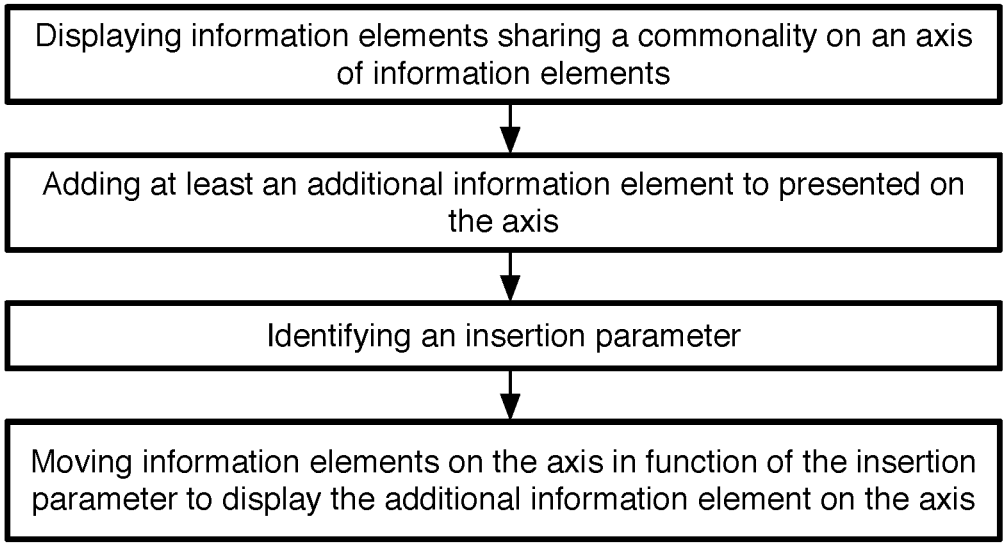
FIG. 40 is an exemplary flowchart of one of the methods based upon which several aspects of the present invention are based.

FIG. 40 presents a flowchart illustrating in an exemplary manner the method upon which one or more aspects of the present invention are based, namely—the addition of an information element 342 on an axis 292 of information elements 200. The method consists of the following steps: displaying the information elements 200 with a commonality on an axis 292 of information elements 200; adding of at least one additional information element 342 to the respective axis 292; identifying the insertion location; and moving the information elements 200 on the axis 292 in function of the insertion parameter to display the additional information element 342 on the axis 292.

Figure 41:
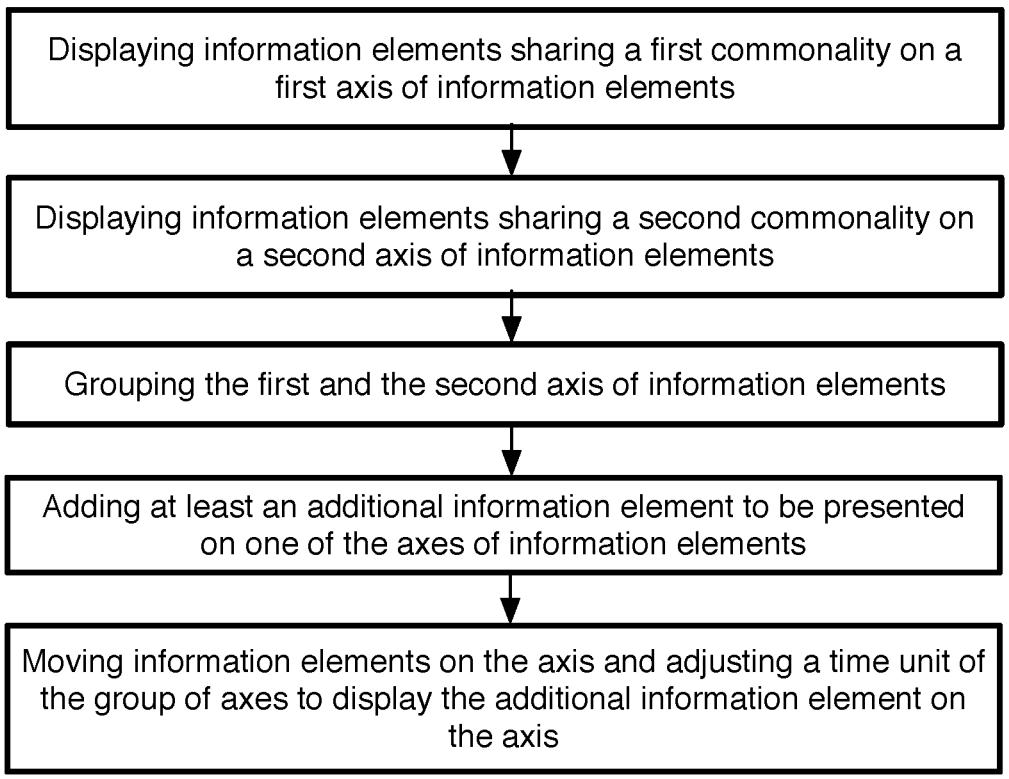
FIG. 41 is an exemplary flowchart of one of the methods based upon which several aspects of the present invention are based.

Similar to FIG. 40, FIG. 41 presents another flowchart illustrating in an exemplary manner the method upon which one or more aspects of the present invention are based, namely—the addition of an information element 342 on a group of axes 310 of information elements 200. The method consists of the following steps: displaying information elements 200 sharing a first commonality on an axis 292 of information elements 200; displaying information elements 200 sharing a second commonality on a second axis 292 of information elements 200; grouping the first and the second axis 292 of information elements 200; adding at least an additional information element 342 to be presented on one of the axes 292 of information elements 200; and moving information elements 200 on the axis and adjusting a time unit 322 of the group of axes 310 to display 314 the additional information element 200 on the axis 292.

Figure 42:
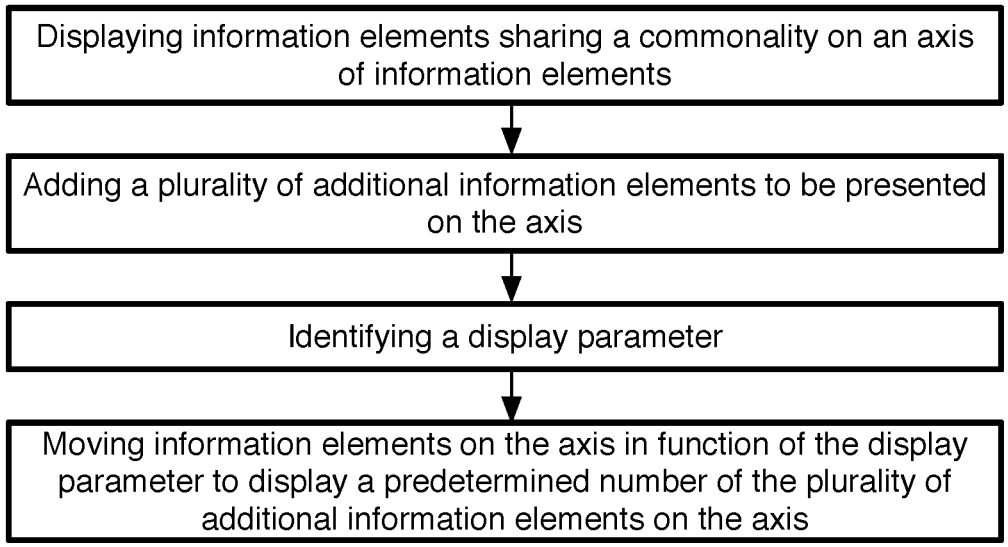
FIG. 42 is an exemplary flowchart of one of the methods based upon which several aspects of the present invention are based.

FIG. 42 presents another flowchart illustrating in an exemplary manner the method upon which one or more aspects of the present invention are based, namely—the addition and display of a plurality of information elements 292 on the display area 314 in a predetermined manner. The flowchart consists of the following steps: displaying information elements 200 sharing a commonality on an axis 292 of information elements; adding a plurality of additional information elements 200 to be presented on the axis 292; identifying a display parameter; and moving information elements 200 on the axis 292 in function of the display parameter to display a predetermined number of the plurality of additional information elements 342 on the axis 292.

Figure 43:
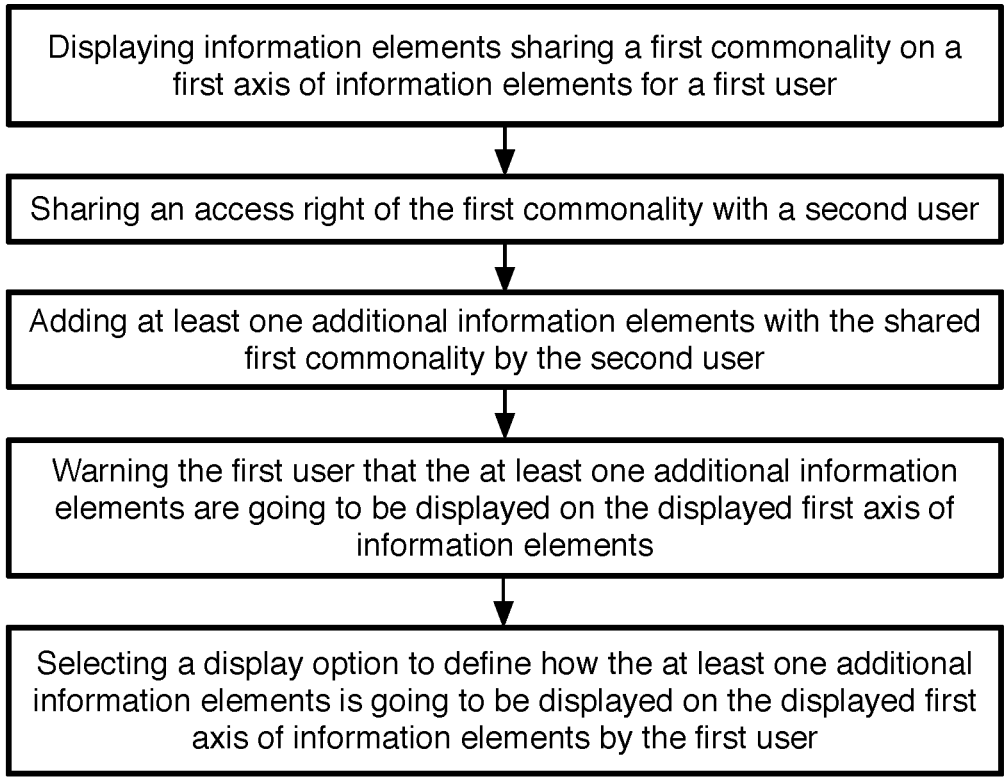
FIG. 43 is an exemplary flowchart of one of the methods based upon which several aspects of the present invention are based.

FIG. 43 presents another flowchart illustration in an exemplary fashion the method upon which one or more aspects of the present invention are based, namely—the viewer's receipt of notification and option to act based on the addition of at least one information element 342 on the axis 292 displayed on the display area 314. The flowchart consists of the following: displaying information elements 200 sharing a first commonality on a first axis 292 of information elements 200 for a first user; sharing an access right of the first commonality with a second user; adding at least one additional information element 342 with the shared first commonality by the second user; warning the first user that the at least one additional information element 342 is going to be displayed on the displayed first axis 292 of information elements; and selecting a display option to define how the at least one additional information element 342 may be displayed by the first user on the axis 292 of information elements that was displayed first.

Figure 44:
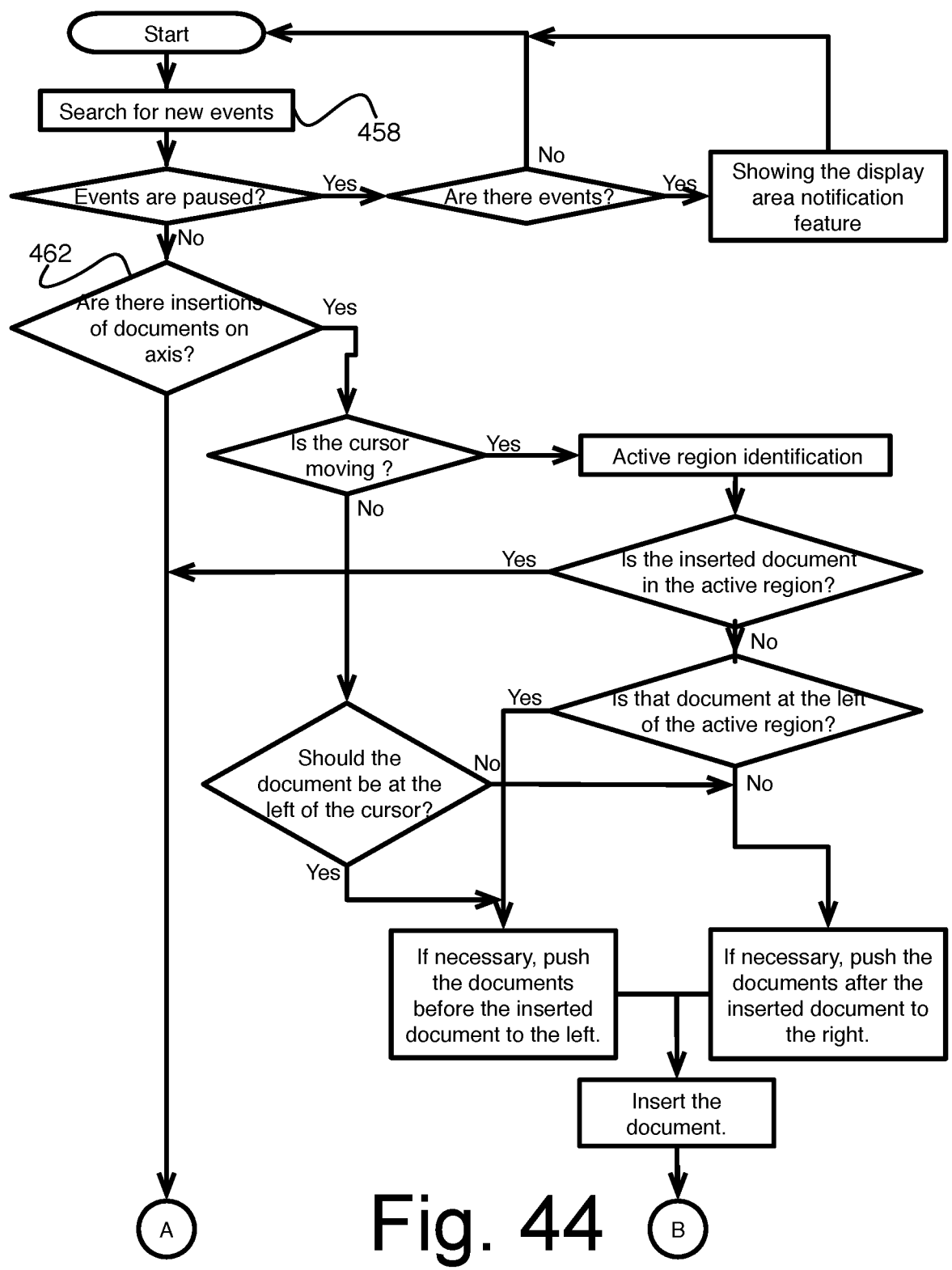
FIG. 44 is an exemplary flowchart of one of the methods based upon which several aspects of the present invention are based.
Figure 45:
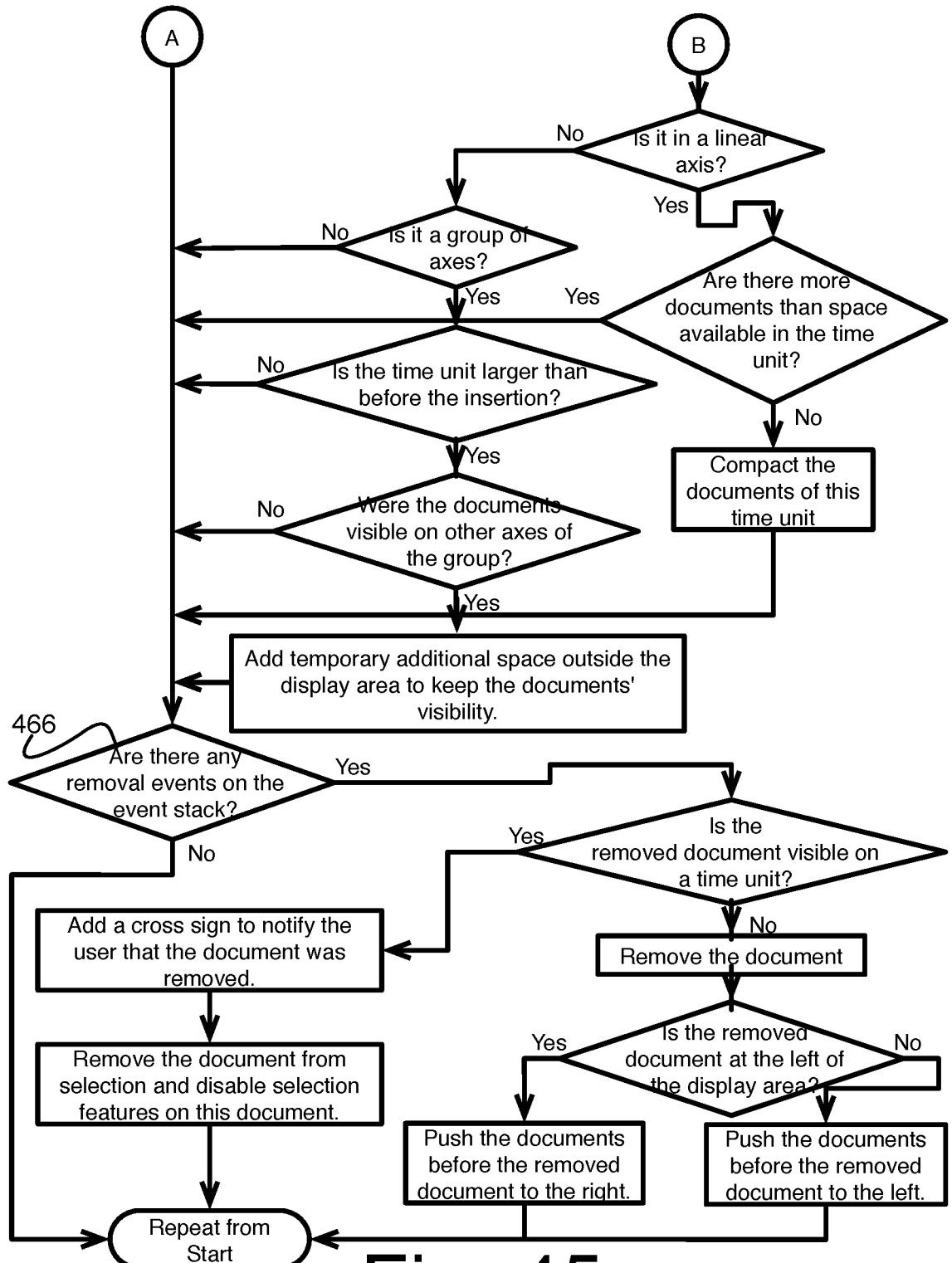
FIG. 45 is an exemplary flowchart of one of the methods based upon which several aspects of the present invention are based.

FIGS. 44-45 represent the flowchart method presenting several of the embodiments of the present invention. The flowchart starts at FIG. 44 and consists of three steps.

Steps 1, which starts at block 458, consists of searching for events in respect to the adding and/or removal of documents 342, 346 taking place on the axis 292. If such events do occur, the system shows the display area notification feature 406, listing the information pertaining to the newly added and/or removed documents 342, 346.

The second step, which starts at block 462, consists of identifying if there are any insertions of documents 342 taking place on the axis 292. If the cursor 350 is moving, the system identifies the active region 348, towards which the cursor 350 is moving. Then, if the inserted document 342 is in the active region 398, the insertion does not take place. However, if the respective document 342 is at the left of the active region 398, the system pushes the documents 200 before the inserted document 342, to the left. After pushing the documents 200 to the left or to the right of the axis 292, the document 342 is inserted on the axis 292.

If the cursor 350 is not moving, if the inserted document 342 is at the left of the cursor 350, the system pushes the documents 200 before the inserted document 342, to the left of the axis 292. If the inserted document 342 is at the right of the cursor 350, the system pushes the documents 200 after the inserted document 342, to the right of the axis 292. The document 342 is consequently inserted on the axis 292.

Once the document 342 is inserted on the axis 292, the system identifies if the inserted documents 342 was placed on a linear or non-linear axis 292. If it is a linear axis 292, the system verifies if there is sufficient space to accommodate the insertion of the document 342. If this is not the case, the system compacts the inserted documents 342 within a time unit 322.

If the inserted document 342 was not placed on a linear axis 292, and was placed within a group of axes 310, the system checks if the time unit 322 has become larger as a result of the insertion of the document 342. If this were the case, the system checks if there are documents 200 visible on the other axes 292 of the group 310. If all these conditions hold true, the system adds temporary additional space 450 outside the display area 314 in order to keep the documents 200 within the display area 314.

Step 3 identifies if there are any documents 346 to be removed from an axis 292. If this were to be the case, the system identifies if the respective documents 346 are shown on the display area 314. If the document 346 is displayed on the display 314, the system adds a cross sign 378 to identify the removed document 346 from the rest of the documents 200 displayed on the display area 314. The document 346 is removed from the number of documents 200 displayed on the display area 314 the user may have selected. The system also disables the selection features on the document 346.

If the document 346 is not within the display area 314, it is removed from the axis 292. If the removed document 346 is at the left of the display area 314, the system pushes the documents 200 before the removed document 346, to the right. If this is not the case, the system pushes the documents 200 before the removed document 346, to the left.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium having stored thereon computer-readable instructions that, when executed by a computer, cause the computer to perform operations for displaying a plurality of elements on a display, the operations comprising:
    displaying an axis of specific elements that each have an axial length of a single element along the axis of elements, wherein a collation function is associated with the axis of specific elements, the collation function including a plurality of collation units located along a time-based order on the axis of specific elements, and wherein each of the plurality of collation units is associated with respective time marks and have a corresponding location on the axis of elements;
    receiving a plurality of particular elements from a particular user transmitted through a network, each of the particular elements including time associated therewith;
    matching the time of each of the particular elements to a collation unit having a particular axial length occurring along the axis of specific elements; and
    displaying two or more of the plurality of particular elements in a stacked configuration on the axis of specific elements when the two or more of the particular elements have the same matched collation unit, wherein the matched collation unit displaying the two or more of the plurality of particular elements in the stacked configuration, within the corresponding particular axial length, has an axial length along the axis that is substantially comparable to the axial length of the single element that would be displayed along the axis of elements in the matched collation unit,
    notifying, in association with the plurality of particular elements, an identity of the particular user, in response to display of the plurality of elements; and
    displaying the two or more of the plurality of stacked particular elements in an unstacked configuration in which the particular elements are distinctly juxtaposed to one another in a substantially rectilinear and vertical orientation on the display along the axis in response to an action performed by a specific user on the display area.

2. The non-transitory computer-readable medium of claim 1, wherein the axis is scrollable with a gesture over a touch screen interface.

3. The non-transitory computer-readable medium of claim 1, wherein the display of stacked elements on the axis comprises particular elements that semi-overlap one another.

4. The non-transitory computer-readable medium of claim 1, wherein the collation function is a chronological order.

5. The non-transitory computer-readable medium of claim 1, further comprising simultaneously displaying each unstacked element from the plurality of particular stacked elements following the action performed by the specific user on the display area.

6. The non-transitory computer-readable medium of claim 1, wherein displaying each unstacked element from the plurality of elements axially elongates a collation unit associated with the collation function of the axis of elements.

7. The non-transitory computer-readable medium of claim 1, wherein at least some of the elements are user-selectable.

8. The non-transitory computer-readable medium of claim 1, wherein the plurality of particular elements is displayed on the axis of elements in the stacked configuration in order to prevent an addition of juxtaposed elements on the axis that would significantly change a layout of elements displayed on the axis.

9. The non-transitory computer-readable medium of claim 1, wherein the plurality of elements includes text files.

10. The non-transitory computer-readable medium of claim 1, wherein the displayed plurality of elements in the stacked configuration are using an axial length that is longer than the axial length of the single element that would be displayed in the matched collation unit.

11. The non-transitory computer-readable medium of claim 1, wherein the collation function includes collation units of an axial length adapted to be adjusted in accordance with a number of elements located therein.

12. The non-transitory computer-readable medium of claim 1, further comprising identifying elements added to the axis as a result of an action of the particular user.

13. The non-transitory computer-readable medium of claim 1, wherein the computer is a mobile phone.

14. The non-transitory computer-readable medium of claim 1, wherein the collation function includes collation units of non-equal axial lengths along the axis of elements.

15. The non-transitory computer-readable medium of claim 1, wherein the collation function comprises a plurality of collation units adapted to display juxtaposed elements therein, wherein the addition of elements from the particular user in the matched collation unit on the axis of elements results in stacking the elements from the particular user present in the matched collation unit.

16. The non-transitory computer-readable medium of claim 1, wherein the plurality of particular elements displayed in the stacked configuration includes an identification of the number of stacked particular elements.

17. A method comprising:
  displaying an axis of specific elements that each have an axial length of a single element along the axis of elements, wherein a collation function is associated with the axis of specific elements, the collation function including a plurality of collation units located along a time-based order on the axis of specific elements, and wherein each of the plurality of collation units is associated with respective time marks and have a corresponding location on the axis of elements;
  receiving a plurality of particular elements from a particular user transmitted through a network, each of the particular elements including time associated therewith;
  matching the time of each of the particular elements to a collation unit having a particular axial length occurring along the axis of specific elements; and
  displaying two or more of the plurality of particular elements in a stacked configuration on the axis of specific elements when the two or more of the particular elements have the same matched collation unit, wherein the matched collation unit displaying the two or more of the plurality of particular elements in the stacked configuration, within the corresponding particular axial length, has an axial length along the axis that is substantially comparable to the axial length of the single element that would be displayed in the matched collation unit,
  notifying, in association with the plurality of particular elements, an identity of the particular user, in response to display of the plurality of elements; and
  displaying the two or more of the plurality of stacked particular elements in an unstacked configuration in which the particular elements are distinctly juxtaposed to one another in a substantially rectilinear and vertical orientation on the display along the axis in response to an action performed by a specific user on the display area.

18. The non-transitory computer-readable medium of claim 17, wherein the display of stacked elements on the axis comprises particular elements that semi-overlap one another.

19. The non-transitory computer-readable medium of claim 17, further comprising simultaneously displaying each unstacked element from the plurality of particular stacked elements following the action performed by the specific user on the display area.

20. The non-transitory computer-readable medium of claim 17, wherein the plurality of particular elements displayed in the stacked configuration includes an identification of the number of stacked particular elements.

* * * * *